United States Patent
Suzuki et al.

(10) Patent No.: US 6,819,366 B2
(45) Date of Patent: Nov. 16, 2004

(54) DISPLAY DEVICE WITH CONDENSER ELEMENTS

(75) Inventors: Toshihiro Suzuki, Kawasaki (JP); Tetsuya Kobayashi, Kawasaki (JP); Takeshi Gotoh, Kawasaki (JP); Tetsuya Hamada, Kawasaki (JP); Keiji Hayashi, Kawasaki (JP); Mari Sugawara, Kawasaki (JP); Hisashi Yamaguchi, Kawasaki (JP); Junji Tomita, Kawasaki (JP); Hirokazu Aritake, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/342,036

(22) Filed: Jan. 14, 2003

(65) Prior Publication Data

US 2003/0098933 A1 May 29, 2003

Related U.S. Application Data

(62) Division of application No. 09/225,631, filed on Jan. 5, 1999, now Pat. No. 6,559,910.

(30) Foreign Application Priority Data

Jan. 9, 1998 (JP) .......................................... 10-003247

(51) Int. Cl.$^7$ .......................................... G02F 1/1335
(52) U.S. Cl. .......................................... 349/9; 349/95
(58) Field of Search .......................... 349/9, 95, 201; 359/20

(56) References Cited

U.S. PATENT DOCUMENTS

| | | | | |
|---|---|---|---|---|
| 5,633,737 A | | 5/1997 | Tanaka et al. ................. | 349/95 |
| 5,737,040 A | * | 4/1998 | Ichikawa et al. .............. | 349/9 |
| 5,852,479 A | * | 12/1998 | Ueda et al. .................... | 349/9 |
| 5,999,282 A | * | 12/1999 | Suzuki et al. ................. | 359/20 |
| 6,078,371 A | | 6/2000 | Ichikawa et al. ............. | 349/95 |
| 6,104,458 A | | 8/2000 | Fukuda ......................... | 349/95 |

FOREIGN PATENT DOCUMENTS

| | | |
|---|---|---|
| JP | 6308332 | 11/1994 |
| JP | 6317794 | 11/1994 |
| JP | 749489 | 2/1995 |
| JP | 798454 | 4/1995 |
| JP | 7181487 | 7/1995 |
| JP | 882791 | 3/1996 |
| JP | 915600 | 1/1997 |
| JP | 943594 | 2/1997 |

* cited by examiner

Primary Examiner—Toan Ton
(74) Attorney, Agent, or Firm—Greer, Burns & Crain, Ltd.

(57) ABSTRACT

The display device includes a spatial modulator having a plurality of pixels and a periodical structural body having condenser elements corresponding to the pixels of the spatial modulator. Each of the pixels of the spatial modulator includes a plurality of color dots arranged in a first direction. A length of a peripheral region of the respective pixel encircling the plurality of color dots, measured in the first direction, is longer than a length of the condenser element of the periodical structural body, measured in the first direction. In addition, combinations of the pixels in the square, delta or mosaic arrangement with the condenser elements in the square, delta or mosaic arrangement are disclosed.

3 Claims, 72 Drawing Sheets

Fig.44

| G | R | B | G | R | B | G | R |
|---|---|---|---|---|---|---|---|
| R | B | G | R | B | G | R | B |
| G | R | B | G | R | B | G | R |
| R | B | G | R | B | G | R | B |
| G | R | B | G | R | B | G | R |
| R | B | G | R | B | G | R | B |
| G | R | B | G | R | B | G | R |
| R | B | G | R | B | G | R | B |
| G | R | B | G | R | B | G | R |
| R | B | G | R | B | G | R | B |

(labels: 46, 46)

Fig.45

| G | R | B | G | R | B | G | R |
|---|---|---|---|---|---|---|---|
| R | B | G | R | B | G | R | B |
| G | R | B | G | R | B | G | R |
| R | B | G | R | B | G | R | B |
| G | R | B | G | R | B | G | R |
| R | B | G | R | B | G | R | B |
| G | R | B | G | R | B | G | R |
| R | B | G | R | B | G | R | B |
| G | R | B | G | R | B | G | R |
| R | B | G | R | B | G | R | B |

(labels: 46, 46, 46, 46)

— BLUE CUT FILTER
---- RED CUT FILTER

— YELLOW CUT FILTER
----- CIAN CUT FILTER

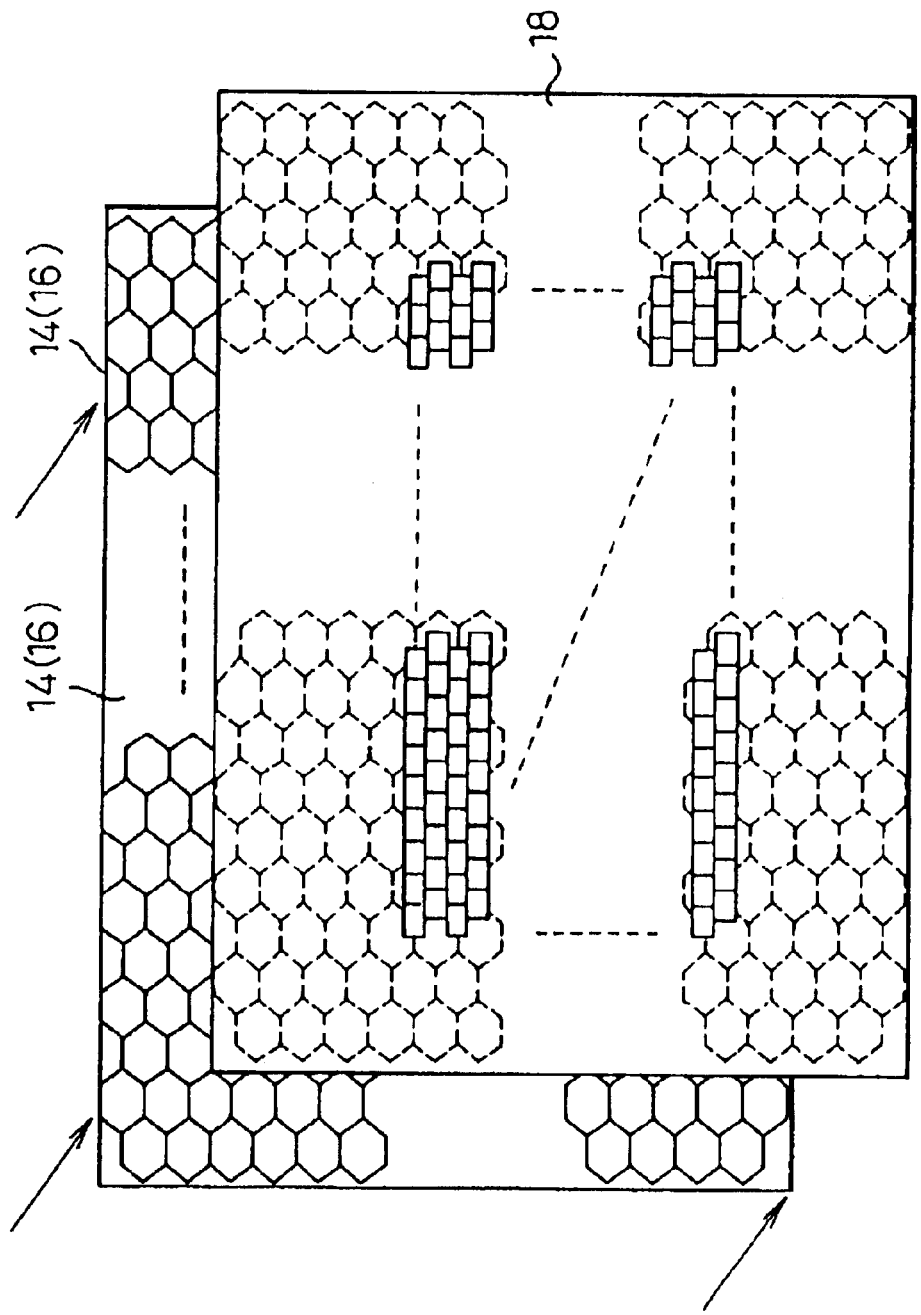

DISPLAY DEVICE WITH CONDENSER ELEMENTS

This application is a division of Ser. No. 09/225,631 filed Jan. 5, 1999, now U.S. Pat. No. 6,559,910.

BACKGROUND OF THE INVENTION

1. Field of the Invention

The present invention relates to a display device provided with a spatial modulator such as a liquid crystal panel.

2. Description or the Related Art

A display device is known which uses a liquid crystal panel having a liquid crystal layer sandwiched between a pair of substrates. The liquid crystal panel includes a color filter whereby it is possible to represent a colored display. Each of the pixels in the liquid crystal panel includes a plurality of color dots (openings), and the color filter has color portions of red, green and blue arranged in these color dots. If a color filter is used, part of light from a light source is absorbed by the color filter to result in a problem of lowering the light utilization efficiency.

For example, Japanese Unexamined Patent publication Nos. 6-317794 and 6-308332 disclose color display devices using a diffraction grating. The diffraction grating separates white light into color rays of red, green and blue oriented at predetermined angles, respectively. For guiding the separated color rays of red, green and blue to the color dots of the respective pixel, a micro lens array is provided. The micro lens array includes condenser elements disposed in correspondence to the pixels of the liquid crystal panel. Alternatively, instead of using the micro lens array, the diffraction grating itself may have a color-separation function and a condenser function (the function of a condenser element).

Since there is no absorption of light when the diffraction grating is used, unlike the color filter, the light-utilization efficiency is higher. Typically the pixel of the conventional liquid crystal panel is of a square shape wherein three color dots are arranged in series, whereby one color dot is of a rectangular shape having a ratio of the horizontal length to the vertical length of 1:3. If a circular spot of color rays condensed by the condenser element and output from the diffraction grating is incident upon the rectangular color dot, the rays are partially cut off on the shorter side of the rectangle although the rays are sufficiently incident on the longer side thereof. Accordingly, the light-utilization efficiency becomes insufficient.

It is necessary for the liquid crystal panel to include as many pixels as possible at a small pitch. The pixels are preferably arranged in various desirable patterns. For example, the three color dots of the pixel may be arranged in a row along a horizontal line, or the three color dots of the pixel may be arranged in a row along a line oblique to the horizontal line.

Generally, the arrangement of the condenser elements should be the same (congruent to) as the arrangement of the pixels. However, there are cases where the arrangement of the condenser elements cannot be the same as that of the pixels since one condenser element must cover three color dots. In the prior art, preferable arrangements of the condenser elements relative to those of the pixels have not been apparent.

If a polarizer is used in the liquid crystal panel, the light utilization efficiency is lowered. Therefore, also in this case, a display device having high light utilization efficiency is desired.

SUMMARY OF THE INVENTION

Accordingly, the object of the present invention is to provide a display device having an improved light utilization efficiency.

Another object of the present invention is to provide a display device wherein condenser elements are properly arranged in correspondence to various arrangement of pixels.

A further object of the present invention is to provide a display device having an improved light utilization efficiency while using a polarizing device.

A still further object of the present invention is to provide a display device having a reduced color irregularity while using a filter.

According to the first embodiment of the present invention, a display device comprises a spatial modulator having a plurality of pixels and a periodical structural body having condenser elements corresponding to the pixels of the spatial modulator, and wherein each of the pixels of the spatial modulator comprises a plurality of color dots arranged in a first direction, and a length of a pixel area including a peripheral region encircling the plurality of color dots, measured in the first direction is longer than a length of the condenser element of the periodical structural body measured in the first direction.

By this constitution, when a light is separated into a plurality of color rays in one plane, which are then guided to the color dots of the pixels via the condenser elements, a degree of opening of the color dots becomes greater, resulting in a display device having a higher brightness.

Preferably, a length of the color dots area of the pixel of the spatial modulator measured in the first direction is longer than a length of the color dot area measured in a direction transverse to the first direction.

Preferably, the pixels of the spatial modulator are in a delta arrangement. In this case, the condenser elements of the periodical structural body are in a delta arrangement. Two condenser elements of the periodical structural body arranged in the first direction are grouped with two pixels arranged in the direction perpendicular to the first direction. Or, the condenser elements of the periodical structural body are in a square arrangement. In this case, two condenser elements of the periodical structural body arranged in the first direction are grouped with two pixels arranged in the direction perpendicular to the first direction. The condenser elements of the periodical structural body are substantially of a square shape.

Preferably, the spatial modulator is a liquid crystal panel and the periodical structural body is a diffraction grating. Or, the spatial modulator is a liquid crystal panel and the periodical structural body is a micro lens array.

According to another aspect, the present invention provides a display device comprising a spatial modulator having a plurality of pixels and means for forming an image relating to the pixels of the spatial modulator on a plane spaced from the spatial modulator at a distance, wherein a spatial frequency of the image on the plane is smaller than a spatial frequency of the pixel of the spatial modulator. By disposing a screen on this plane, it is possible to more clearly observe an image formed thereon by the spatial modulator. This feature may be used together with the above-mentioned feature.

According to a further aspect, the present invention provides a display device comprising a spatial modulator having a plurality of pixels and a periodical structural body having condenser elements corresponding to the pixels of the spatial modulator, wherein each of the pixels of the spatial modulator comprises a plurality of color dots; the number of the condenser elements per unit volume being equal to the number of the pixels per unit volume or integer times thereof.

When the display device is structured, the pixels are arranged at a pitch in a two-dimensional manner without any gaps. If the condenser element is of the same shape (congruence) as that of the pixel, the two-dimensional arrangement is possible with no gap. Also, the condenser element may be of a similar figure to the pixel. For example, the shape of the pixel may be minimized or the shape of the condenser element may be enlarged.

An area of the pixel, however, is preferably the same as that of the condenser element. Then, there is naturally a restriction in the combination of the condenser elements with the pixels. A shape of the condenser element is preferably different from that of the pixel, because various combinations of the pixels and the condenser elements are achievable. For example, there may be a combination of pixels in a square arrangement and condenser elements in a delta arrangement; a combination of pixels in a delta arrangement and a condenser elements in a square arrangement; a combination of pixels in a delta arrangement and condenser elements in a delta arrangement; a combination of pixels in a mosaic arrangement and condenser elements in a delta arrangement; or a combination of pixels in a mosaic arrangement and condenser elements in a square arrangement.

Similar to the pixels, it is necessary to arrange the condenser elements in one plane with no gap. To satisfy this demand and achieve the above-mentioned various combinations, the condenser elements may be of a polygonal shape such as square, rectangle or hexagon. The rectangle has a ratio of a shorter length to a longer length of 1:2, and is oriented at 45 degrees relative to a vertical line. All of interior angles of the polygon are obtuse. The polygon may be a hexagon having pairs or parallel opposite sides and oriented so that a symmetrical axis thereof is oriented at 45 degrees relative to a vertical line. The symmetrical axis may extend in the vertical or horizontal direction. According to a still further aspect, the present invention provides a display device comprising a polarizing device for separating light from a light source into first and second polarized rays having mutually perpendicular oscillating planes and merging the light so that the oscillation plane of one of the first and second polarized rays becomes the same as that of the other while making a predetermined angle between each other, a spatial modulator having a plurality of pixels, a periodical structural body having condenser elements corresponding to the pixels of the spatial modulator, and wherein regarding the first and second polarized rays emerging from the polarizing device and passing through a first condenser element, the first polarized ray is made incident to a first pixel and the second polarized ray is made incident to a second pixel, and regarding the first and second polarized rays emerging from the polarizing device and passing through a second condenser element, the first polarized ray is made incident to the second pixel and the second polarized ray is made incident to a third pixel.

According to this structure, a light is not reduced to one half of a source light by a polarizer in a display device using polarized rays, unlike the prior art device. That is, a light from the light source is separated into first and second polarized rays and output so that the oscillation planes of the first and second polarized rays become the same while making a predetermined angle between each other, whereby both of the first and second polarized rays are usable (i.e., almost all the light from the light source is used). The first and second polarized rays are made incident to all the pixels, whereby even if an expected difference exists in characteristic between both the polarized rays, there is no influence on the displayed image.

According to a yet further aspect, the present invention provides a display device comprising a light source, a spatial modulator having a plurality of pixels, a periodical structural body having condenser elements corresponding to the pixels of the spatial modulator, and a filter having a red-cut function adapted for a spectrum band on longer wavelength side of a red spectrum band and a blue-cut function adapted for a spectrum band on the longer wavelength side of a blue spectrum band.

Preferably, the device further comprises a filter having a wavelength cutting function adapted for an approximately medium wavelength between the red and blue spectrum bands. Also, it further comprises a filter having a wavelength cutting function adapted for an approximately medium wavelength between the green and blue spectrum bands.

Also, a display device according to the present invention comprises a light source, a spatial modulator having a plurality of pixels and a periodical structure body having condenser elements corresponding to the pixels of the spatial modulator, each of the spatial modulator having a plurality color dots arranged in the color-separation direction, and the number of the condenser elements is more than the number of the pixels.

Preferably, the number of cells of the condenser elements (NX, NY) satisfies the following equation:

$$NX \times NY \geq (MX+2) \times (MY+2)$$

wherein MX and MY represent the numbers of pixels, each formed by a group of color dots.

BRIEF DESCRIPTION OF THE DRAWINGS

The present invention will become more apparent from the following description of the preferred embodiments, with reference to the accompanying drawings, in which:

FIG. 44 is a view of pixels in the mosaic arrangement, which is a modification of a delta arrangement;

FIG. 45 is a view of pixels in the modified delta arrangement;

FIG. 58 is a view of pixels in the modified mosaic arrangement;

FIG. 59 is a view of pixels in the modified mosaic arrangement;

FIG. 74 is a view of pixels in the modified square arrangement;

FIG. 75 is a view illustrating the combination of pixels in the square arrangement shown in FIG. 74 with condenser elements shown in FIG. 17;

FIG. 119 is a view illustrating a characteristic of a filter including the filter characteristic shown in FIGS. 116 and 117;

FIG. 120 is a view of pixels in the square arrangement and condenser elements;

FIG. 121 is a view of pixels in the delta arrangement and condenser elements;

FIG. 122 is a view of pixels in the mosaic arrangement and condenser elements;

FIG. 123 is a view of a liquid crystal panel having horizontally elongate color dots;

FIG. 124 is a view of a liquid crystal panel having vertically elongate color dots;

FIG. 125 is a view of an embodiment wherein the number of condenser elements is equal to that of pixels;

FIG. 126 is a view of an embodiment wherein the number of condenser elements is more than that of pixels; and FIG. 127 is a view of another embodiment wherein the number of condenser elements is more than that of pixels.

DESCRIPTION OF THE PREFERRED EMBODIMENTS

Basic Constitution

Figure 1:
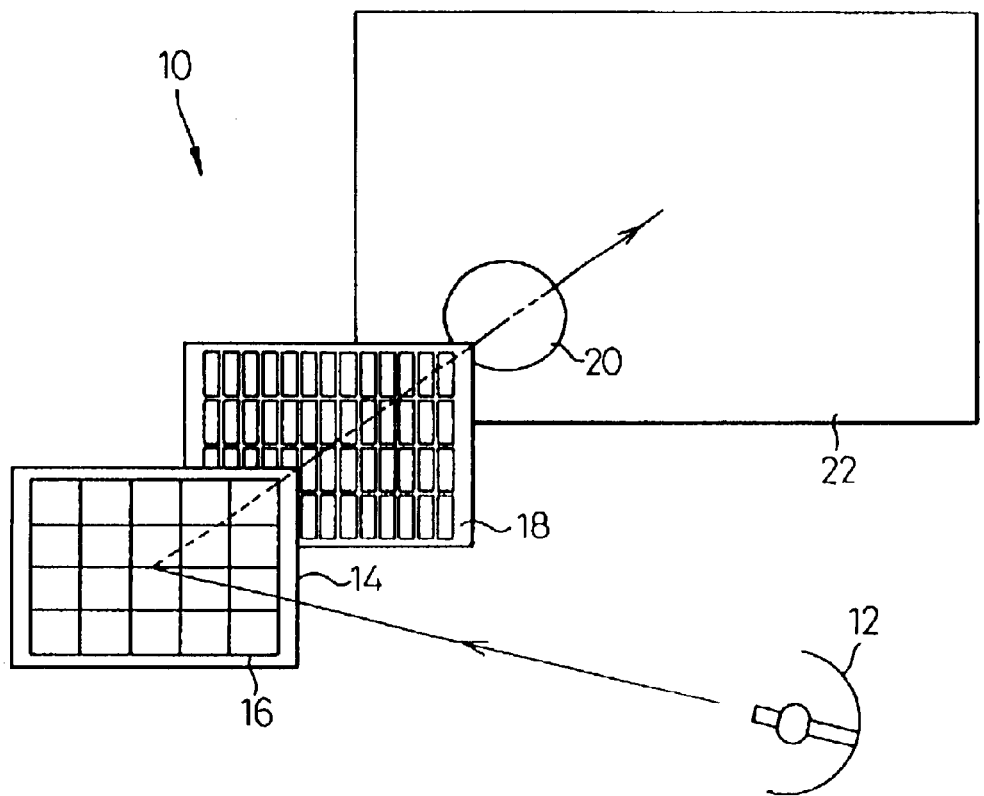
FIG. 1 is a schematic view of a display device according to the first embodiment of the present invention.

FIG. 1 schematically illustrates a projector type liquid crystal display device using a diffraction grating. The display device 10 includes a light source 12, a diffraction grating 14, condenser elements 16, a liquid crystal panel (spatial modulator) 18, a projector lens 20 and a screen 22. The light source 12 is a white light source such as a metal halide lamp, capable of irradiating possibly parallel rays obliquely onto the surface of the diffraction grating 14.

Figure 3:
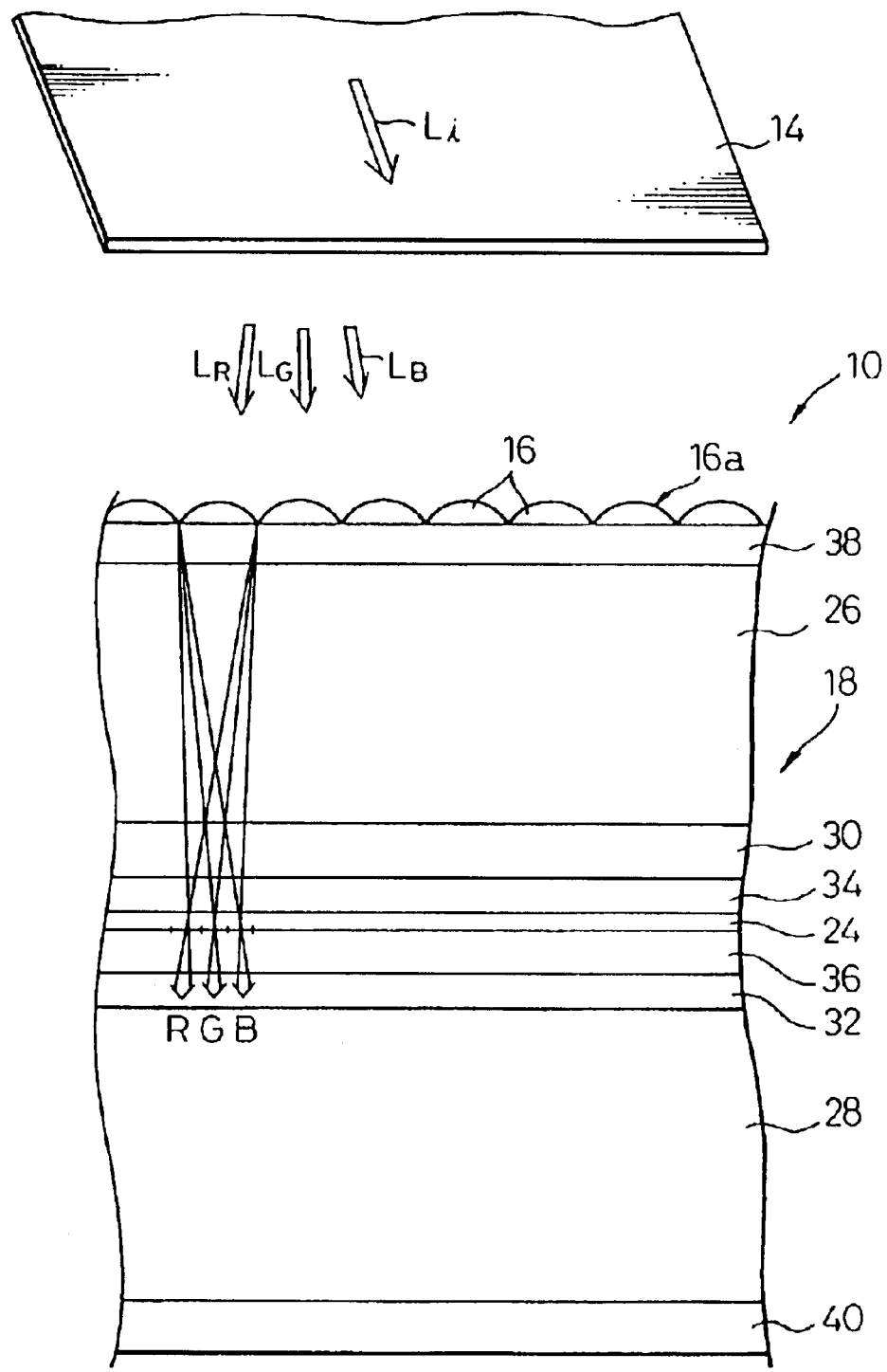
FIG. 3 is a view of a modification of the display device of FIG. 1, using a micro lens array.
Figure 4:
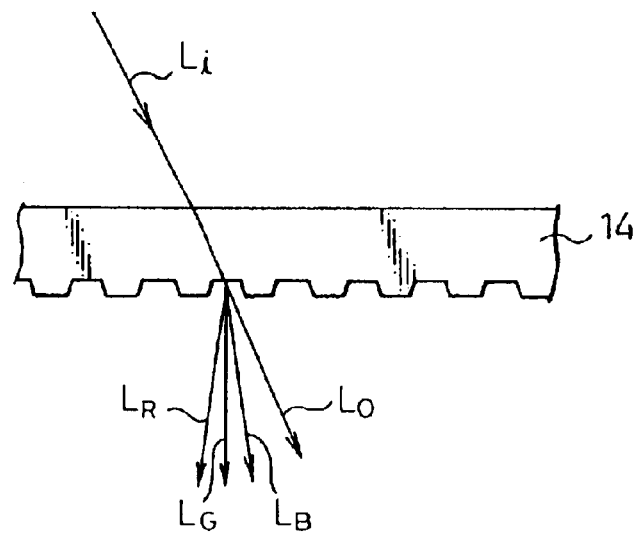
FIG. 4 is a side view of the diffraction grating in FIG. 3.
Figure 5:
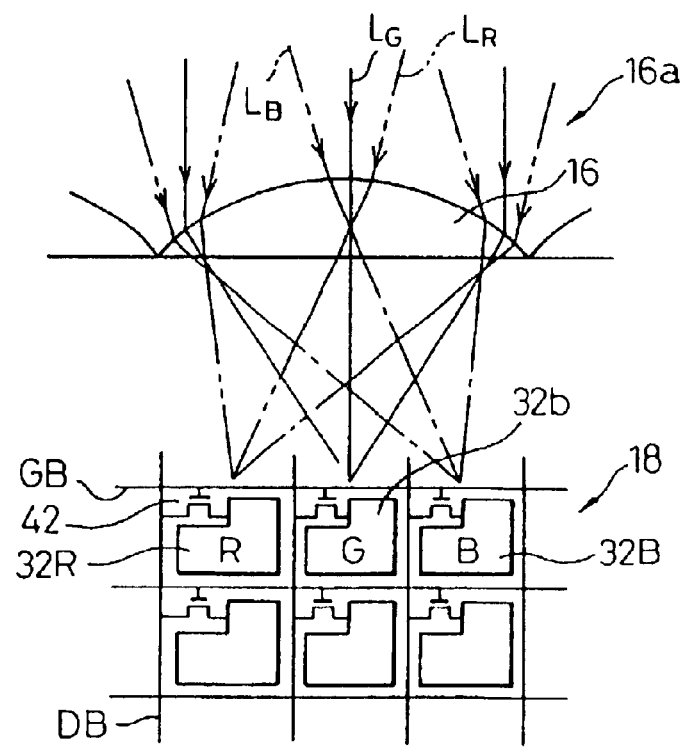
FIG. 5 is a view illustrating the relationship between the condenser elements and pixels in FIG. 3.

FIGS. 3 to 5 illustrate an example for explaining the operation of the diffraction grating 14 and the condenser elements 16, wherein the condenser elements 16 are formed separately from the diffraction grating 14. In this embodiment, the condenser elements 16 are micro lenses formed as a micro lens array 16a.

As shown in FIG. 4, the diffraction grating 14 is formed from a transparent plate having convex surfaces and concave surfaces arranged alternately at a predetermined grating pitch. It will be apparent, however, that diffraction gratings other than the illustrated one 14 may be used. For example, the diffraction grating 14 may be of a refractive index distribution type instead of one having convex surfaces and concave surfaces.

When an incident ray Li is made obliquely incident to the diffraction grating 14, first-order diffraction rays $L_R$, $L_G$ and $L_B$ are output from the diffraction grating 14 at different angles from each other based on the diffraction function of the diffraction grating 14. The first-order rays $L_R$, $L_G$ and $L_B$ are rays in red, green and blue wavelength bands, the first-order green diffraction rays $L_G$ is positioned between the first-order red diffraction ray $L_R$ and the first-order blue diffraction ray $L_B$. Further, although there are a zero-order diffraction ray, first-order diffraction rays positioned opposite to the first-order diffraction rays $L_R$, $L_G$ and $L_B$ and, second-order diffraction rays or others, they are neglected here because they are not substantially made incident to the projection lens.

The diffraction grating 14 has a color separating function in this manner.

As shown in FIG. 3, the liquid crystal panel 18 is, for example, a TN type liquid crystal panel wherein a liquid crystal layer 24 is sandwiched between a pair of transparent substrates 26, 28. The substrates 26 and 28 have transparent electrodes 30 and 32, respectively, and orientation films 34 and 36, respectively. A polarizer 38 and an analyzer 40 are disposed on either side of the substrates 26 and 28, and the diffraction grating 14 and the micro lens array 16a are arranged on the side of the polarizer 38.

One of the electrodes 30 is, for example, a common electrode, and the other electrode 32 is, for example, provided on the substrate 28 together with an active matrix shown in FIG. 5. In FIG. 5, the active matrix includes gate bus lines GB, data bus lines DB and TFTs 42. One pixel is formed from three pixel electrodes 32 (32R, 32G and 32B). The pixel electrode 32R allows a red ray to pass therethrough, the pixel electrode 32G allows a green ray to pass therethrough, and the pixel electrode 32B allows a blue ray to pass therethrough.

As shown in FIGS. 3 and 5, one lens element 16 is arranged in correspondence to one pixel consisting of three pixels electrodes 32R, 32G and 32B so that the respective color first-order diffraction rays $L_R$, $L_G$ and $L_B$ are condensed to the respective color pixel electrodes. The first-order diffraction rays $L_R$, $L_G$ and $L_B$ emerging from the diffraction grating 14 pass through the lens element 16 and are made incident to the respective pixels of the liquid crystal panel 18. At this time, the red first-order diffraction ray $L_R$ is made incident to the red pixel electrode 32R, the green first-order diffraction ray $L_G$ is made incident to the green pixel electrode 32G, and the blue first-order diffraction ray $L_B$ is made incident to the blue pixel electrode 32B. By controlling the voltage between the pixel electrodes 32R, 32G and 32B and the common electrode 30, it is controlled whether the respective color ray transmits through the respective pixel electrode 32R, 32G or 32B, or the ray is blocked by the electrode. In this way, it is possible to realize the color display on the screen 22 by projecting the transmitted color rays via the projector lens 20.

Figure 2:
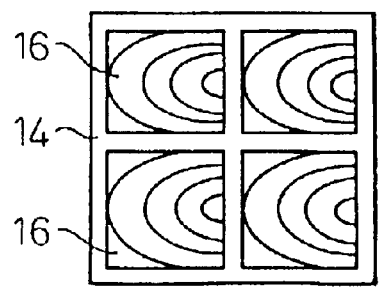
FIG. 2 is a view of condenser elements arranged in the diffraction grating of FIG. 1.

In the embodiment shown in FIGS. 1 and 2, the condenser elements 16 are integrally incorporated in the diffraction grating 14. That is, the diffraction grating 14 has the same concave surfaces and convex surfaces as those in the diffraction grating shown in FIG. 4, and the condenser elements 16 are formed at positions corresponding to the respective pixels of the diffraction grating 14 as a distribution of refractive index of a predetermined pattern to provide the same condensing function as that in the condenser elements 16 shown in FIG. 5. Accordingly, this diffraction grating 14 has the color separating function due to diffraction and the color condensing function of the condenser elements 16.

Figure 6:
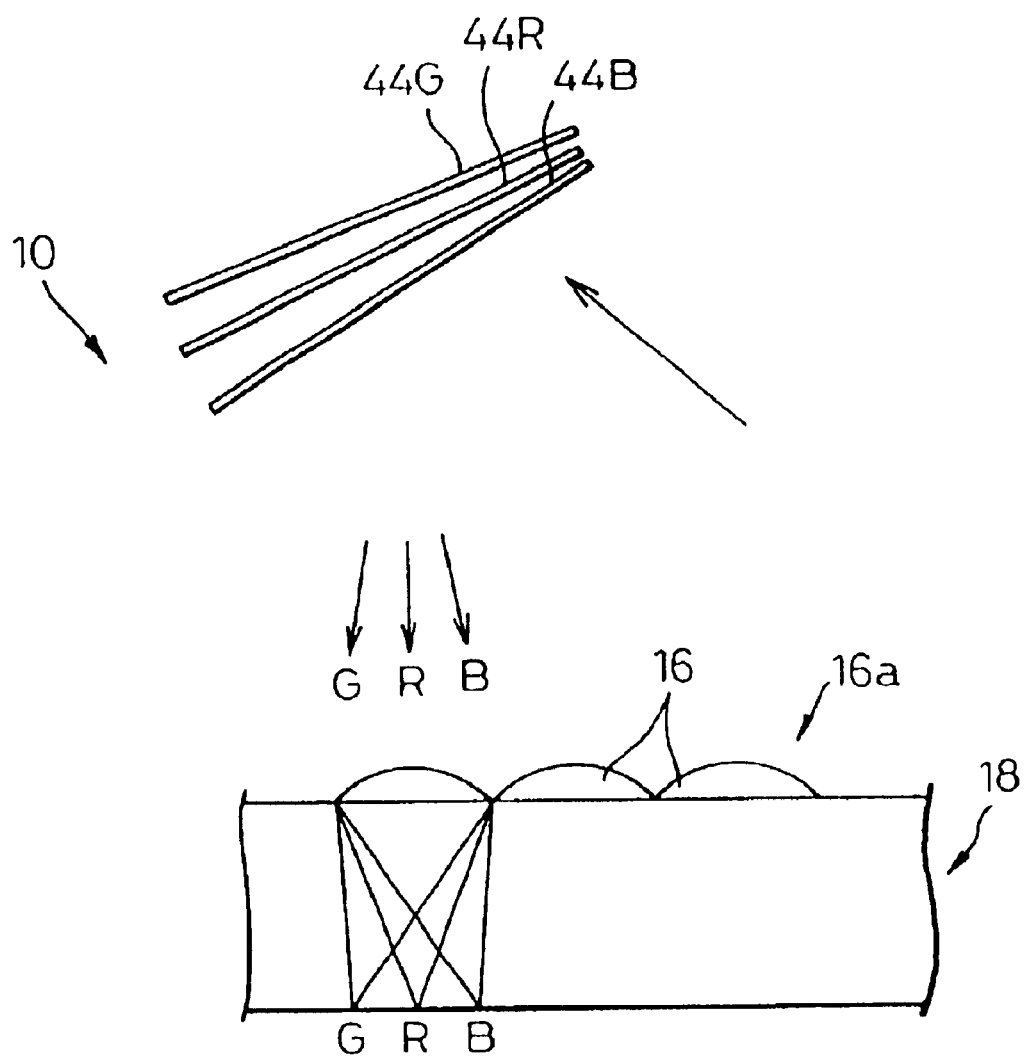
FIG. 6 is a view of a modification of the display device of FIG. 1, using dichroic mirrors.

FIG. 6 shows an embodiment wherein dichroic mirrors 44R, 44G and 44B are arranged at different angles for the purpose of color separation, instead of the diffraction grating 14. The dichroic mirror 44B reflects the blue ray but allows color rays other than blue to pass therethrough. The dichroic mirror 44R reflects the red ray but allows color rays other than red to pass therethrough. The dichroic mirror 44G reflects the green ray but allows color rays other than green to pass therethrough.

Thus, the red ray (R), the green ray (G) and the blue ray (B) are reflected by the respective dichroic mirrors 44R, 44G and 44B at different angles. Accordingly, the dichroic mirrors 44R, 44G and 44B carry out the color separation in the same manner as that in the diffraction grating 14 shown in FIGS. 3 to 5. If the condenser elements 16 of the micro lens array 16a and the liquid crystal panel 18 are arranged in the same manner as in the embodiment shown in FIGS. 3 to 5, it is possible to obtain the same operation as in the preceding embodiment.

In the explanation described hereinafter, the condenser elements 16 include all of those incorporated in the diffraction grating 14 as shown in FIGS. 1 and 2, those formed as the micro lens array 16a arranged with the diffraction grating 14 shown in FIGS. 3 to 5, and those formed as the micro lens array 16a arranged with the dichroic mirrors 44R, 44G and 44B shown in FIG. 7.

Wide Color Dot

Figure 7:
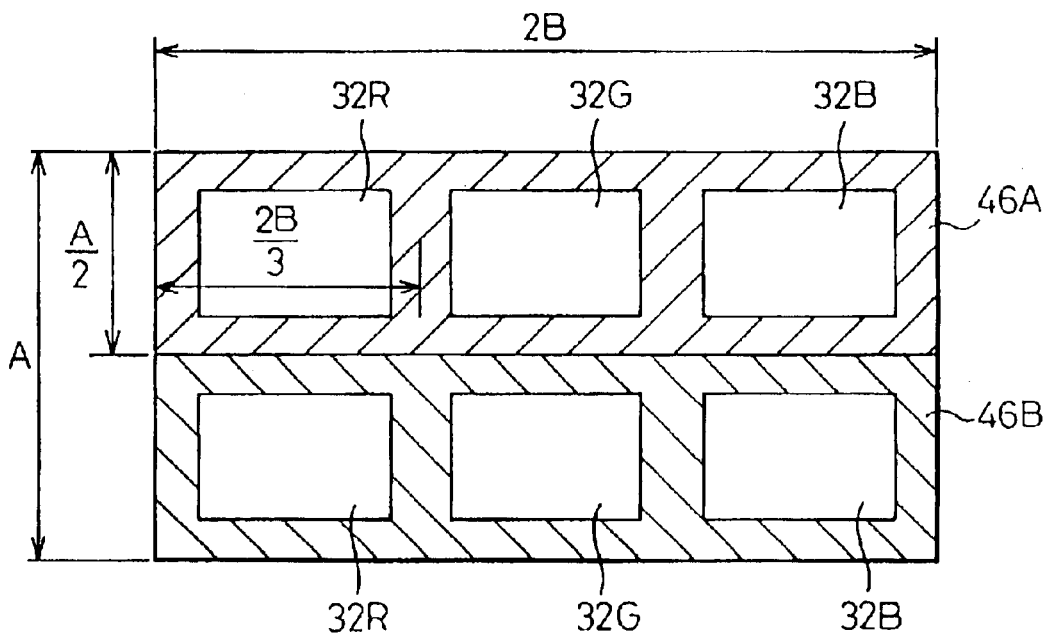
FIG. 7 is a view illustrating an example of pixels of the liquid crystal panel shown in FIGS. 1 to 6.

FIG. 7 shows two pixels 46A and 46B in the liquid crystal panel 18. The respective pixel 46A or 46B has pixel electrodes 32R, 32G and 32B arranged in a first direction (in the horizontal direction in the drawing, this being also applied to the subsequent explanation). One pixel area contains the peripheral region surrounding the pixel electrode 32R, 32G and 32B. In this example, the peripheral region is formed by a shading layer (black matrix) indicated by hatching. To clarify the pixel area of the two pixel 46A and 48B, the shading layer is indicated by hatchings in the crossing directions. Also, in the claims, the portions of the pixel electrode 32, 32G and 32B in the pixel are refereed to as color dots, and the area including the peripheral region of the color dots is referred to as a color dot area.

One pixel area is of a rectangular shape elongated in the first direction (in the horizontal direction). In the drawing, the length of the each pixel 46A or 46B in the first direction is 2B, and the length of the pixel 46A or 46B in the direction perpendicular to the first direction is A/2. If A=B, the ratio of the horizontal length of each pixel area to the vertical length thereof is 4:1. The length of the dot area including each pixel electrode 32R, 32G or 32B in the first direction is 2B/3, and the length of each dot area in the direction perpendicular to the first direction is A/2. If A=B, the ratio of the horizontal length to the vertical length of each dot area is 4:3.

Figure 8:
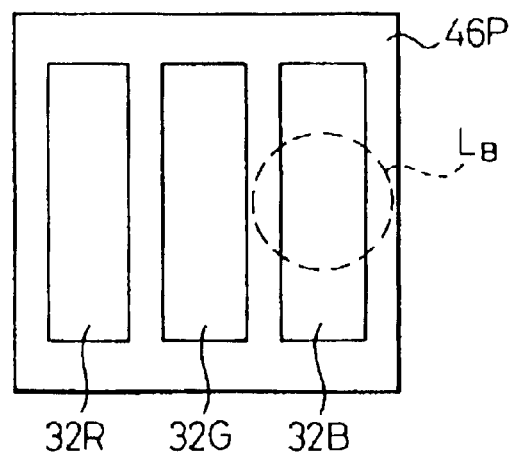
FIG. 8 is a view illustrating pixels of a prior art liquid crystal panel.

FIG. 8 illustrates a construction of the pixel electrodes 32R, 32G and 32B in the conventional one pixel 46P. The pixel 46P is of a generally square shape, and the pixel electrodes 32R, 32G and 32B are arranged in the respective color dot areas defined by dividing the pixel 46P into three equal sections. Accordingly, the pixel electrodes 32R, 32G and 32B are of a rectangular shape considerably longer in the vertical direction. Therefore, for example, if a circular spot-like first order diffraction ray $L_B$ is irradiated to the pixel electrode 32B, a portion of the circular spot-like first-order diffraction ray $L_B$ extending beyond the lateral sides of the pixel electrode 32B lowers the light utilization efficiency.

Therefore, it is possible to improve the light-utilization, by forming the shape of the pixel and the color dot as shown in FIG. 7 so that each pixel electrode 32R, 32G or 32B has a shape closer to a square, to thereby reduce a portion of a circular spot-like first order diffraction ray $L_B$ which may extend beyond the lateral sides of the pixel electrode 32B as shown in FIG. 8.

Figure 9:
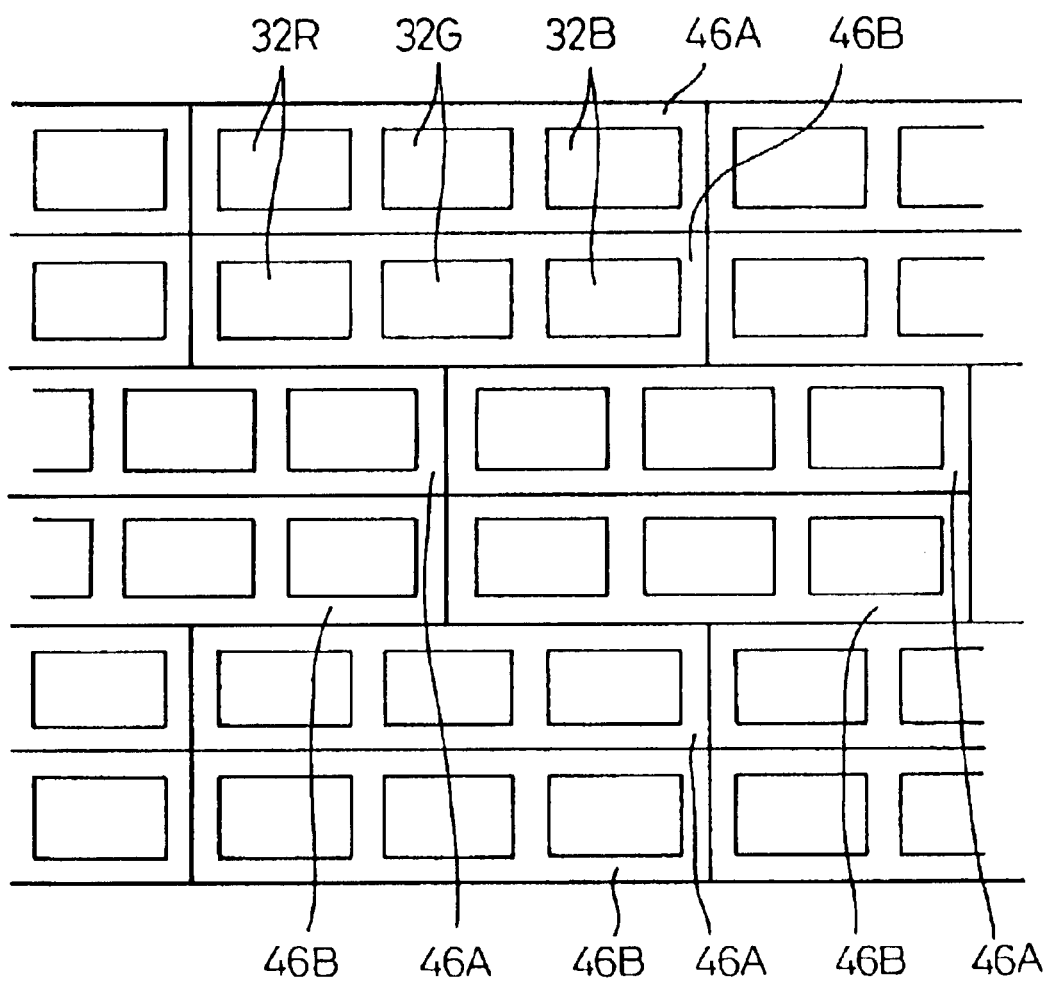
FIG. 9 is an example of a modified delta arrangement of pixels in FIG. 8.

FIG. 9 illustrates the pixels in which two pixels 46A and 46B shown in FIG. 7 constitutes one unit and those units are arranged in a delta arrangement.

Figure 10:
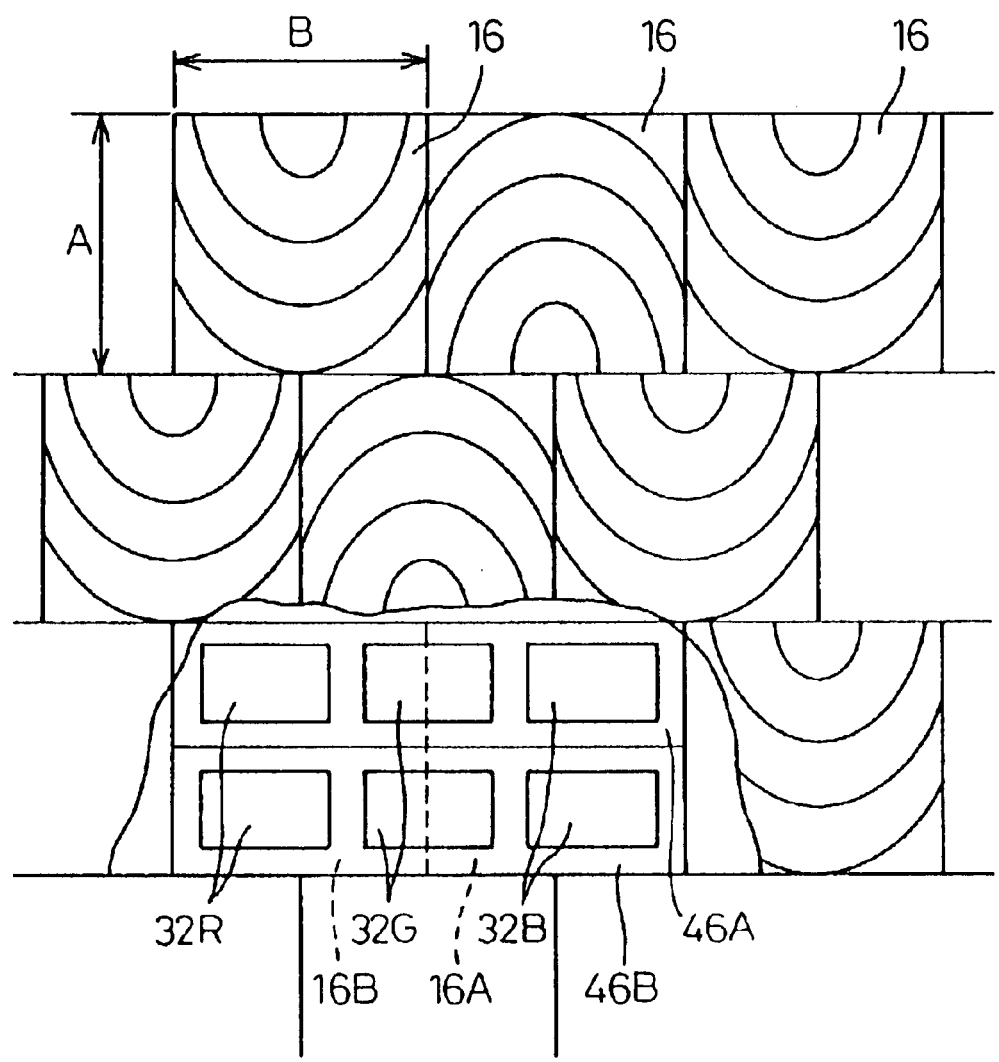
FIG. 10 is a view illustrating the relationship between pixels in the modified delta arrangement and condenser elements in the square arrangement.

FIG. 10 shows an embodiment of the combination of the liquid crystal panel 18 having the pixels 46A and 46B in the delta arrangement shown in FIG. 9 and the diffraction grating 14 having condenser elements 16 in the delta-arrangement. The condenser elements 16 are arranged in one row in the first (horizontal) direction, and regarding the direction perpendicular to the first direction, the condenser elements are shifted by one half of the pitch. Each condenser element 16 is of a rectangular shape having the ratio of the lateral length to the vertical length is B:A; preferably a square (A=B).

The arrangement is made in a two-to-two correspondence so that two pixels 46A and 46B arranged in the vertical direction correspond to two condenser elements 16 arranged in the horizontal direction. This will be apparent from the relationship between the dimensions A and 2B shown in FIG. 7 and the dimensions A and B shown in FIG. 10. More specifically, two condenser elements 16A and 16B correspond to two pixels 46A and 46B, appearing in the cut-away portion of the drawings.

The righthand condenser element 16A corresponds to the upper pixel 46A, so that the condenser element 16A allows the color rays to be condensed at three pixel electrodes 32R, 32G and 32B and 32B of the pixel 46A while the rays travel from the lower right portion to the upper left portion in FIG. 10. Similarly, the lefthand condenser element 16B corresponds to the lower pixel 46B, so that the condenser element 16B allows the color rays to be condensed at the three pixel electrodes 32R, 32G and 32B of the pixel 46B while the rays travel from the upper left portion to the lower right portion in FIG. 10. Accordingly, the distribution of refractive index of the two condenser elements 16A and 16B is formed so that the condensing directions are different from each other in the above manner, and in FIG. 10, arcuate patterns of the adjacent condenser elements 16 are formed in the opposite directions.

Figure 11:
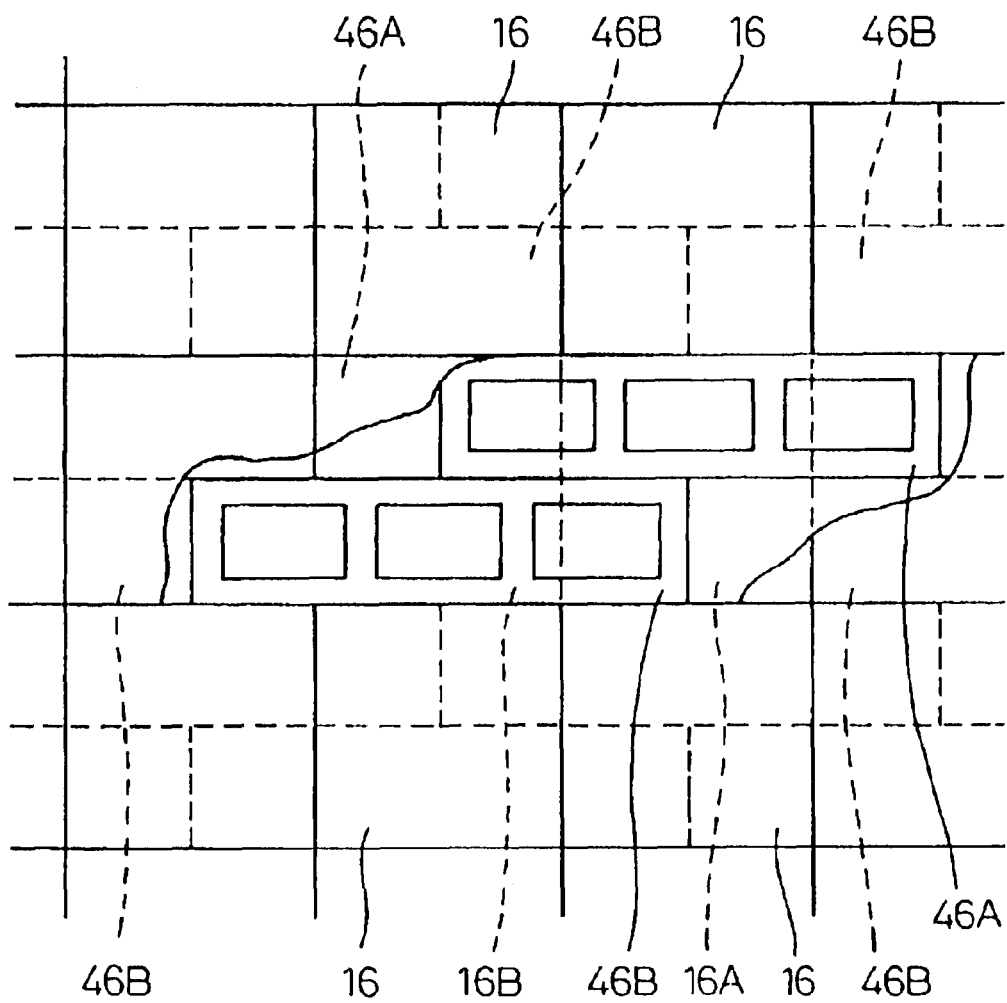
FIG. 11 is a view illustrating the relationship between pixels in the delta arrangement and condenser elements in the delta arrangement.

FIG. 11 shows an embodiment of the combination of the liquid crystal panel 18 having the pixels 46A and 46B in the simple delta arrangement and the diffraction grating 14 having the condenser elements 16 in the square arrangement. The condenser elements 16 are arranged to form a matrix in the first direction and in the direction perpendicular to the first direction. The pixels 46A and 46B are arranged so that the pixels 46A and 46B shown in FIG. 7 are laterally shifted by one half of the pitch.

The arrangement is made in a two-to-two correspondence so that the obliquely arranged two pixels 46A and 46B correspond to the laterally arranged two condenser elements 16. More specifically, two condenser elements 16A and 16B correspond to two pixels 46A and 46B, appearing in the cut-away portion in the drawings. The righthand condenser element 16A corresponds to the upper pixel 46A, so that the righthand condenser element 16B and the upper pixel 46A are arranged to form a T-shape. The condenser element 16A allows the color rays to be condensed at the three pixel electrodes 32R, 32G and 32B of the pixel 46A while the rays travel upward from the lower portion in FIG. 11. Similarly, the lefthand condenser element 16B corresponds to the lower pixel 46B, so that they are arranged to form an inverse T-shape. The condenser element 16B allows the color rays to be condensed at the three pixel electrodes 32R, 32G and 32B of the pixel 46B while the rays travel downward from the upper portion in FIG. 11. The two condenser elements 16A and 16B are adapted to have the distribution of refractive index so that the condensing directions are different from each other.

Figure 12:
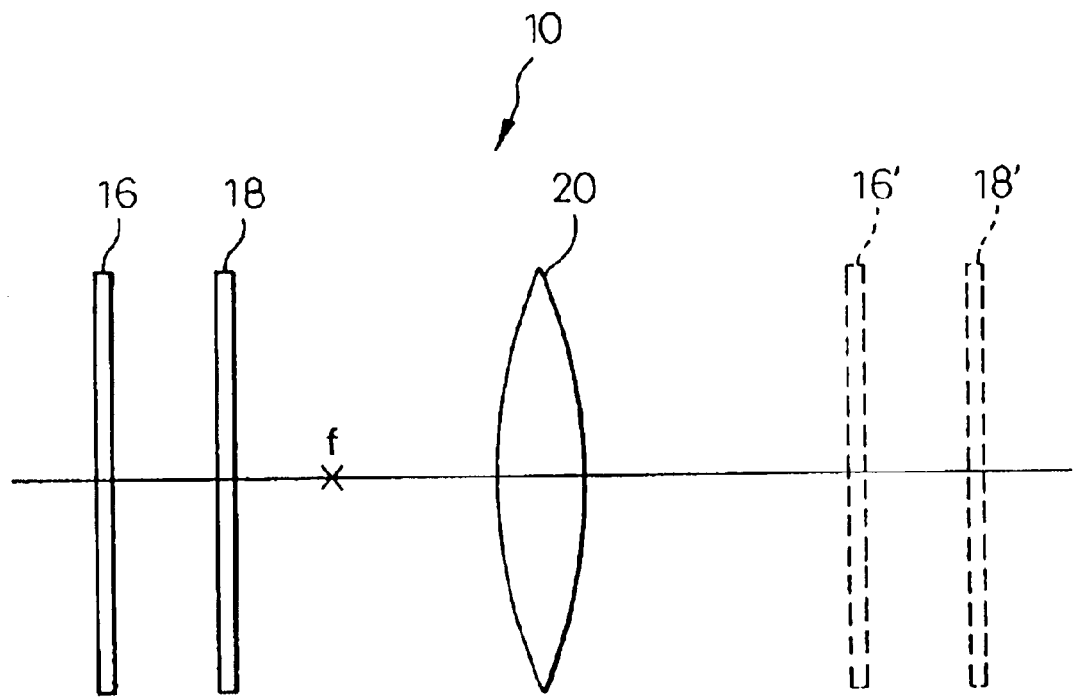
FIG. 12 is a view of an optical system designed to observe an image of condenser elements.

FIG. 12 illustrates the arrangement of the projector type display device 10 suitable for using the combination of the liquid crystal panel 18 and the condenser element 16 shown in FIGS. 10 and 11. In an optical system wherein the projector lens 20 has an appropriate focus f, an image 18' of the liquid crystal panel 18 and an image 16' of the condenser element 16 are formed on the opposite side of the liquid crystal panel 18 and the condenser element 16 with respect to the projector lens 20. If the screen 22 is disposed at a position of the image 18' of the liquid crystal panel 18, an observer can see the image 18' on the screen 22. Alternatively, if the screen 22 is disposed at a position of the image 16' of the condenser element 16, the observer can see the image 16' on the screen 22.

According to the present invention, the screen 22 is preferably disposed at the position of the image 16' of the condenser element 16 so that the observer can see the image 16' of the condenser element 18 on the screen 22. Although when the image 18' of the liquid crystal panel 18 is observed it is identical to that when the image 16' of the condenser elements 16 is observed, it is possible to see the image more clearly when the image 16' of the condenser elements 16 is observed.

The spatial frequency of the condenser elements 16 is lower than that of the color dots of the liquid crystal panel 18. According to a study by the inventors of the present invention, it has been found that the image having the lower spatial frequency is more clearly visible than that having the higher spatial frequency even if the images are similar in shape. Since the color dots of the liquid crystal panel 18 are arranged at a spatial frequency as large as three times that of the condenser elements 16, the image 16' of the condenser elements 16 is more clearly visible.

Thus, it is possible to clearly see the image 16' of the condenser elements 16 in the delta arrangement (FIG. 10) or the image 16' in the square arrangement (FIG. 11). The image in the delta arrangement is suitable for a picture, and the image of the square arrangement is suitable for a computer display. When the depth of focus of the projector lens 20 is too large, there might be a case wherein not only the image 16' of the condenser elements 16 but also the image 14' of the liquid crystal panel 18 are visible. In such a case, it is recommended that the projector lens 20 is preferably selected to have an MTF resolution of 30% or more for the condenser elements 16 having a lower spatial frequency and the MTF resolution of 20% or less for the color dot having a higher spatial frequency. The difference in MTF between the both is preferably 10% or more. Thereby, the color dots are not resolved but the pixels are resolved so that the image 16' of the condenser elements 16 (FIG. 10) is clearly visible.

This arrangement comprises a liquid crystal panel 18 having a plurality of pixels (color dots) and means for forming an image relating to the pixels of the liquid crystal panel 18 on a plane disposed at a predetermined distance from the liquid crystal panel 18, wherein the spatial frequency of the image on the plane is smaller than the spatial frequency of the color dots of the liquid crystal panel 18.

Figure 13:
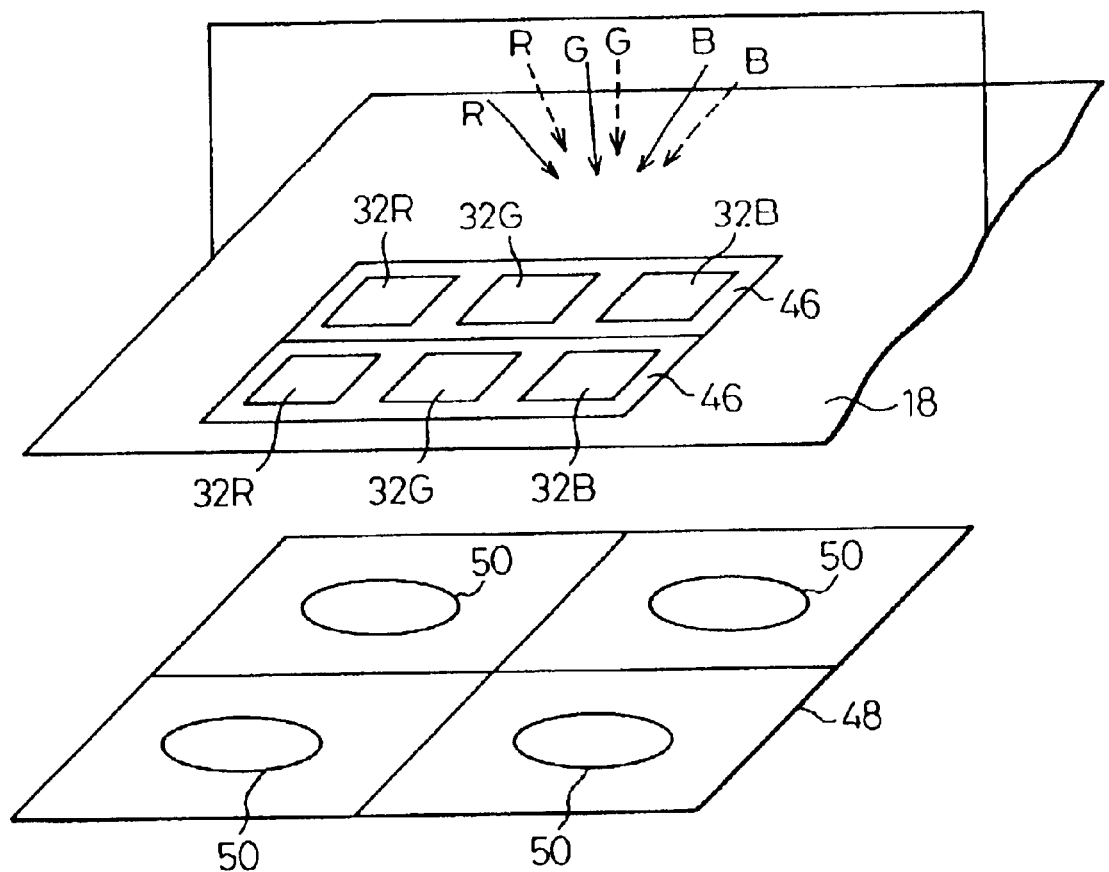
FIG. 13 is a view of an example of a direct viewing type display device.

FIG. 13 shows an embodiment wherein this principle is applied to a direct-view type display device. A liquid crystal panel 18 has a plurality of pixels 46 having color dots 32R, 32G and 32B so that images 50 corresponding to the pixels 46 of the liquid crystal panel 18 are formed on a plane 48 disposed at a predetermined distance from the liquid crystal panel 18. In this case, a diffraction grating 14 may be provided, or color filters may be applied to the color dots 32R, 32G and 32B. In the illustrated embodiment, the color filters are applied to the color dots 32R, 32G and 32B. Since there is no diffraction grating 14, a condenser element is unnecessary. However, a lens other than the condenser elements 18 may be provided.

By irradiating light to the liquid crystal panel 18, the image 50 is formed on the plane 48 by rays passing through a group of the color dots 32R, 32G and 32B. In this regard, since the spatial frequency of the image 50 on the plane 48 is smaller than the spatial frequency of the color dots 39R, 32G and 32B, the image 50 is clearly visible for the reasons described above. Since the pixels 46 are in square arrangement, the images 50 are also in the square arrangement.

Figure 14:
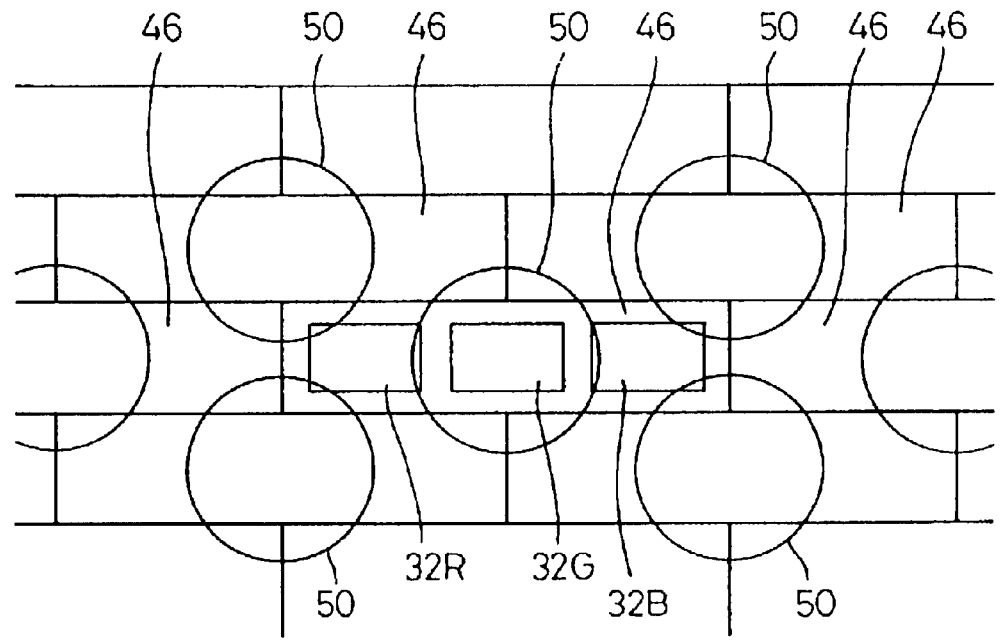
FIG. 14 is a view of another example of a direct viewing type display device.

FIG. 14 shows an embodiment of the pixels 46 in the delta arrangement, having the same structure as that shown in FIG. 13. Since the pixels 46 are in the delta arrangement, the images 50 on the plane 48 (see FIG. 13) are in the square arrangement.

Figure 15:
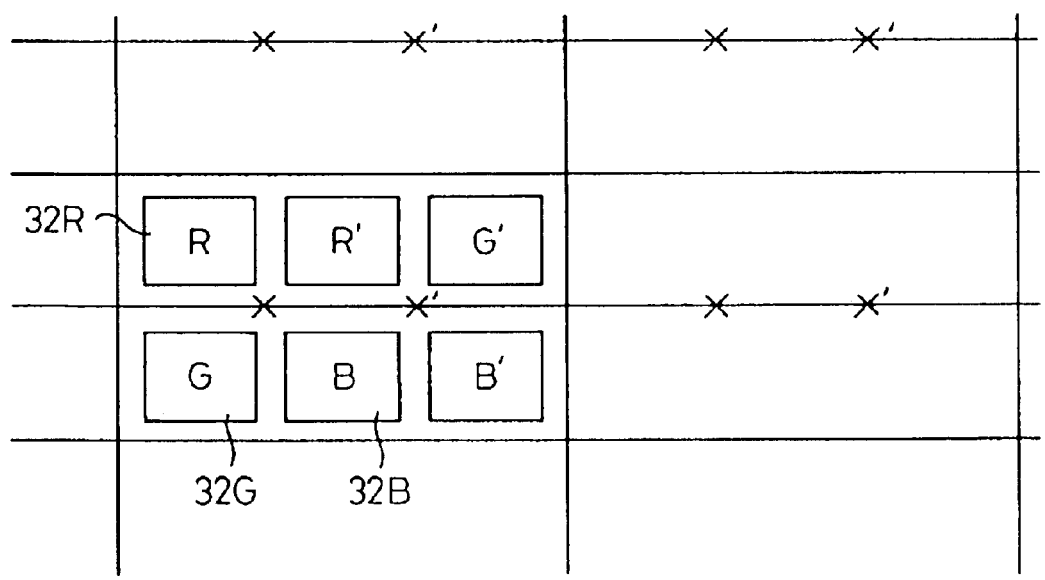
FIG. 15 is a view of a further example of a direct viewing type display device.

FIG. 15 shows a modification of the delta arrangement. The color dots 32R, 32G and 32B in one pixel are not in a linear arrangement but in a triangular arrangement so that two pixels form a rectangle. This arrangement is referred to as a mosaic arrangement. Other characteristics are the same as those of the embodiment shown in FIG. 13. The images 50 on the plane 48 (see FIG. 13) are indicated by X and X', and are in a square arrangement.

Combination of Pixels and Condenser Elements

Figure 16:
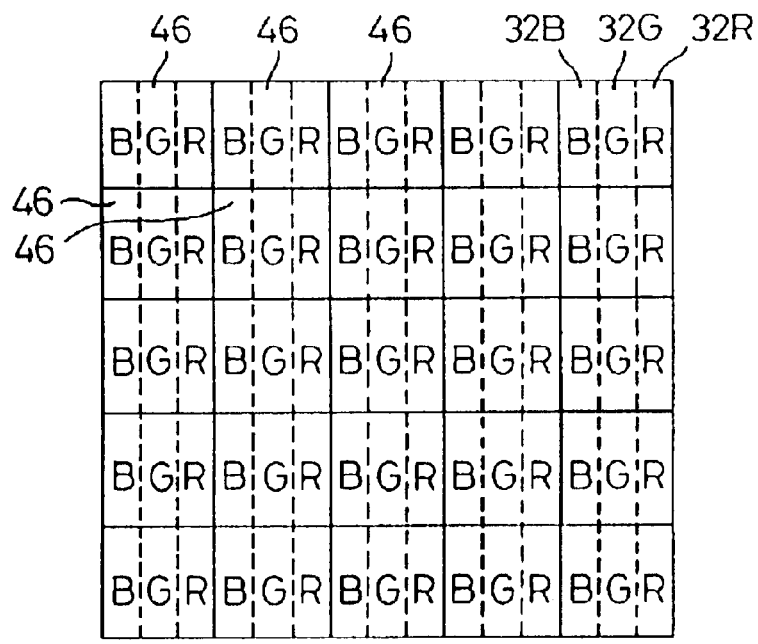
FIG. 16 is a view illustrating pixels in the square arrangement.
Figure 77:
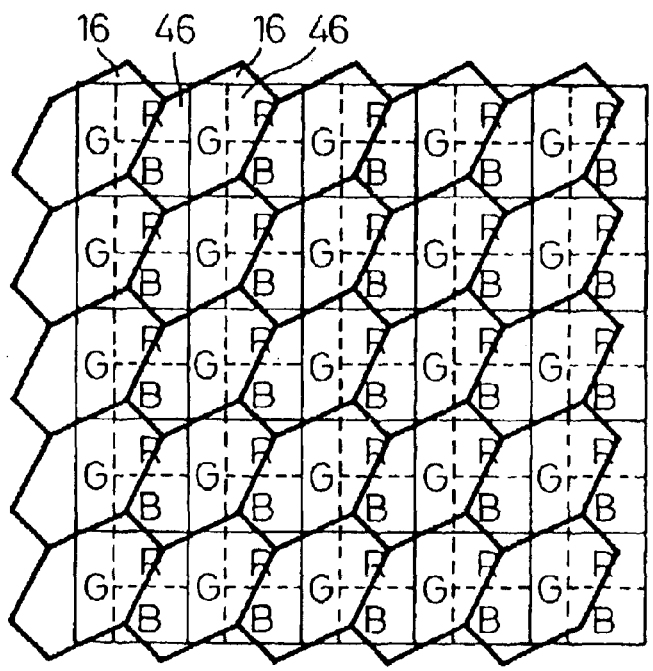
FIG. 77 is a view illustrating the combination of pixels in the square arrangement shown in FIG. 74 with the condenser elements shown in FIG. 23.

Next, examples of novel combination of pixels 46 and condenser elements 16 will be explained with reference to FIGS. 16 to 77. These examples are particularly suitable when the condenser elements 16 are integral with the diffraction grating 14 as shown in FIGS. 1 and 2. As described above, each pixel 46 of the liquid crystal panel 18 includes three color dots 32R, 32G and 32B. In FIGS. 16 to 77, the color dots 32R, 32G and 32B are simply indicated by R, G and B.

When the pixels 46 are combined with the condenser elements 16, the number of condenser elements 16 per unit volume is preferably the same as the number of pixels 46 per unit volume or integer times greater than the latter. Also, a shape of the pixel 46 is preferably the same as that of the condenser element 16 or a similar shape of the latter, because the correspondence could easily be taken between the both. However, in embodiments described hereinafter, there are many cases wherein the shape of the condenser element 16 is different from that of the pixel 46. Even in such cases, it is possible to take the correspondence of the pixel 46 to the condenser element 16.

FIG. 16 shows the pixels 46 in the square arrangement. In the square arrangement, the centers of adjacent four pixels 46 form a square. Or, it can be said that the pixels 46 in the square arrangement have a periodicity in a first direction (the horizontal direction in the drawing) and a second direction (the vertical direction in the drawing) perpendicular to the former. Or, it is also possible to represent the square arrangement by the arrangement of color dots R, G, B. That is, in FIG. 16, the color dots R, G, B have a periodicity in the first and second mutually perpendicular directions transverse, wherein three color dots R, G and B in one pixel are disposed on a straight line extending in parallel in one of the first and second directions. In FIG. 16, the three color dots R, G and B in one pixel are arranged on a horizontal line.

Figure 17:
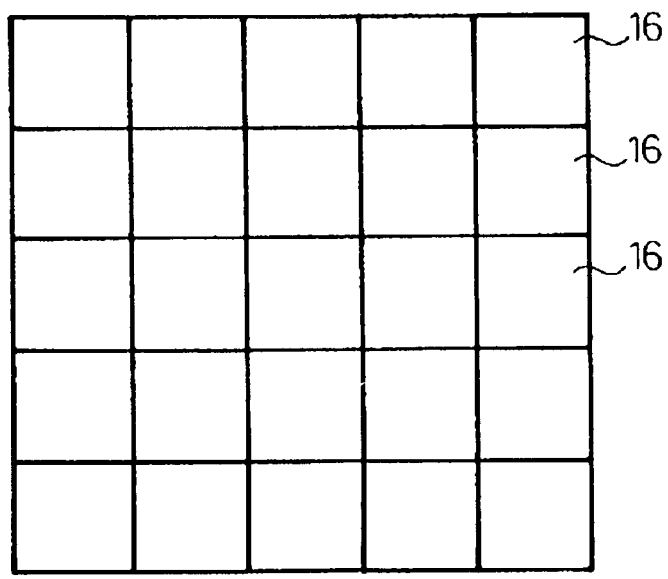
FIG. 17 is a view illustrating condenser elements in the square arrangement.

FIG. 17 shows the condenser elements 16 in the square arrangement and it can be said that the condenser elements 16 in the square arrangement have a periodicity in a first direction and in a second direction as in the pixels.

Figure 18:
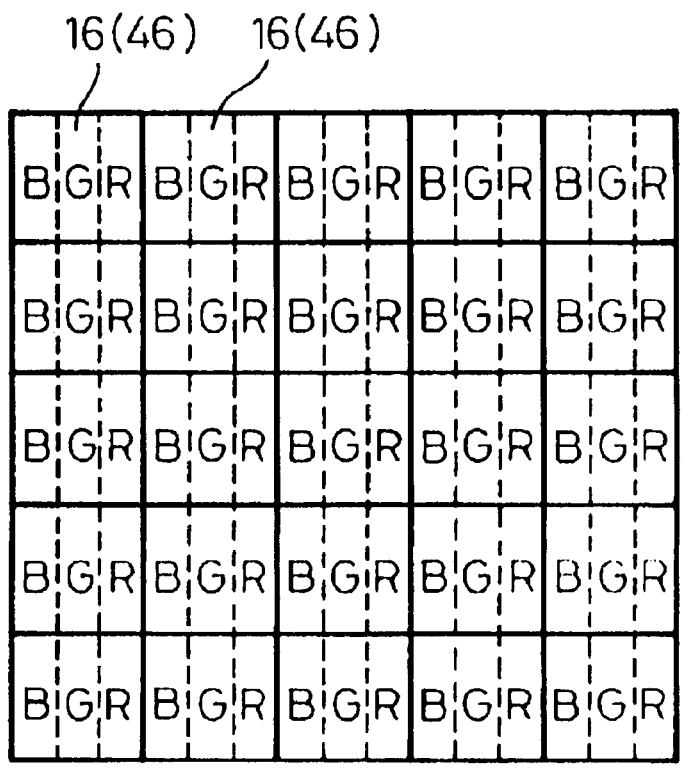
FIG. 18 is a view illustrating the combination of pixels in the square arrangement shown in FIG. 16 with condenser elements in the square arrangement shown in FIG. 17.
Figure 19:
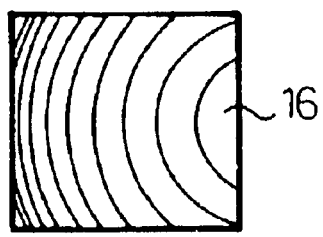
FIG. 19 is a view illustrating the feature of the condenser element in FIG. 18.

FIG. 18 shows a combination of the pixels 46 in the square arrangement shown in FIG. 16 with the condenser elements 16 in the square arrangement shown in FIG. 17. The pixels 46 are in one-to-one correspondence with the condenser elements 16. FIG. 19 represents a feature of the condenser elements 16 in this state.

Figure 20:
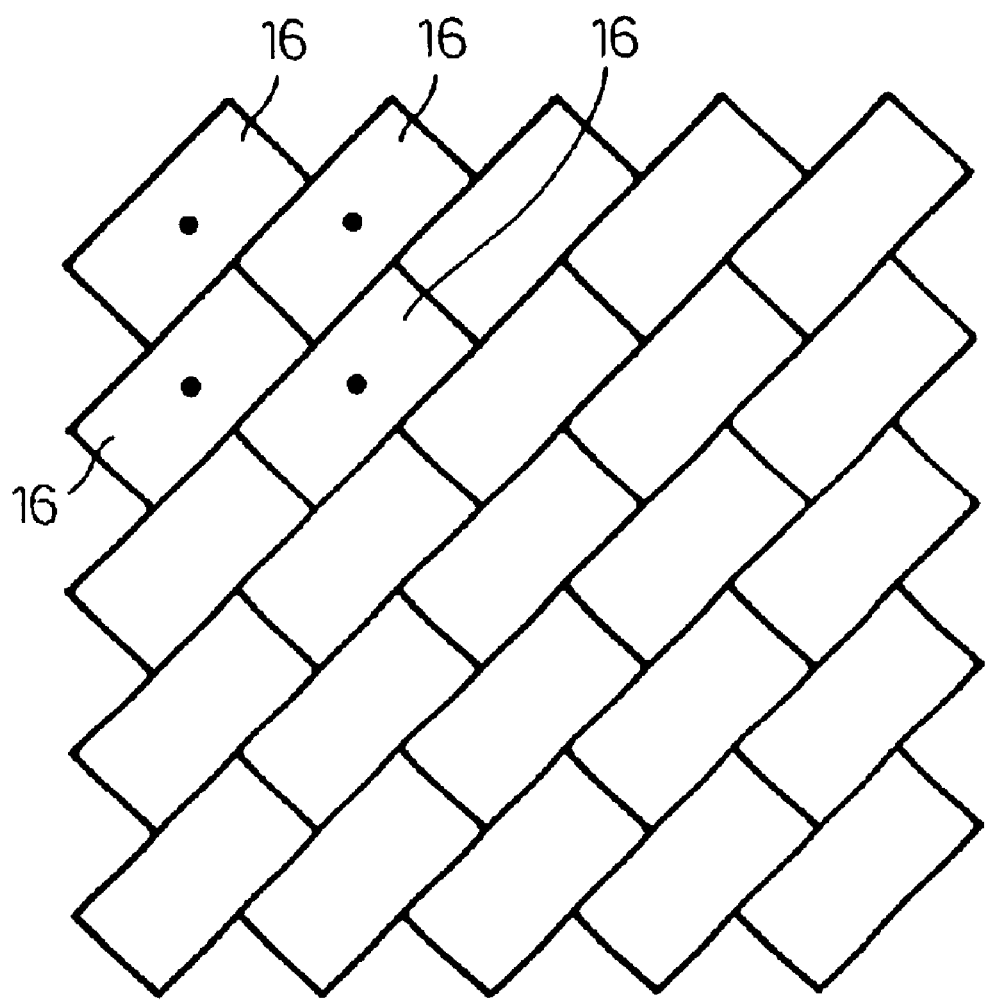
FIG. 20 is a view illustrating a modified example of condenser elements in the square arrangement.

FIG. 20 shows a modification of the condenser elements 16 in the square arrangement. Also in this case, centers of adjacent four condenser elements 16 form a square, and the condenser elements 16 have a periodicity in the first and second directions. In FIG. 20, the respective condenser element 16 is formed to be a rectangular shape having a ratio of the length of a shorter side to the length of a longer side is 1:2. The side of the rectangle obliquely extends relative to the horizontal line at angle of 45°. In other words, the condenser elements 16 are of a polygonal (rectangular) shape having a pair of parallel sides extending in a third direction different from the first and second directions.

Figure 21:
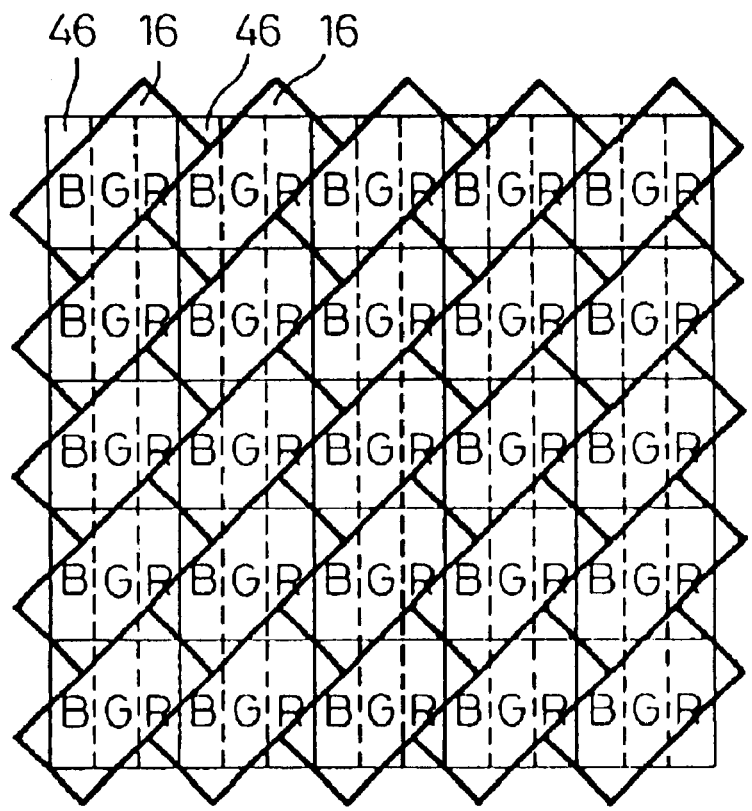
FIG. 21 is a view illustrating the combination of pixels in the square arrangement shown in FIG. 16 with condenser elements in the square arrangement shown in FIG. 20.
Figure 22:
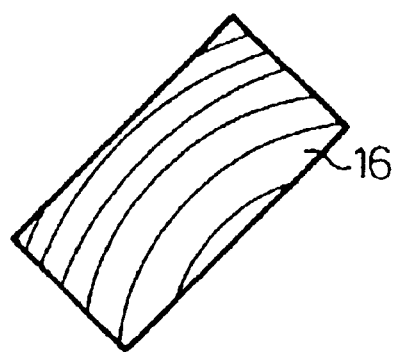
FIG. 22 is a view illustrating the feature of the condenser element in FIG. 21.

FIG. 21 shows a combination of the pixels 46 in the square arrangement shown in FIG. 16 with the condenser elements 16 in the square arrangement shown in FIG. 20. FIG. 22 shows a feature of the condenser element 16. The pixels 46 are in one-to-one correspondence with the condenser elements 16, and a period of centers of the condenser elements 16 coincides with that of the pixels 46. Since the shape of the condenser elements 16 is different from that of the pixels 46, the generation of moire, which worsens the display, is suppressed.

Also, the diameter of a light ray condensed by the condenser element 16 becomes a minimum in the long axis direction of the condenser element 16. It is possible to operate the shape of a diameter of the ray in accordance with the shape of an opening of the color dot R, G or B. In a fringe design wherein rays are incident in the short axis direction of the condenser element 16, the distribution of fringe pitch becomes less in the shape of condenser element 16 shown in FIG. 19 than in the shape of condenser element 16 shown in FIG. 22. An optimal depth of the grooves of the diffraction grating 14 varies in accordance with the fringe pitch, and since the depth of the grooves becomes constant in the diffraction grating 14 formed by the exposure, a higher diffraction efficiency is obtained when the fringe pitch distribution is less.

Figure 23:
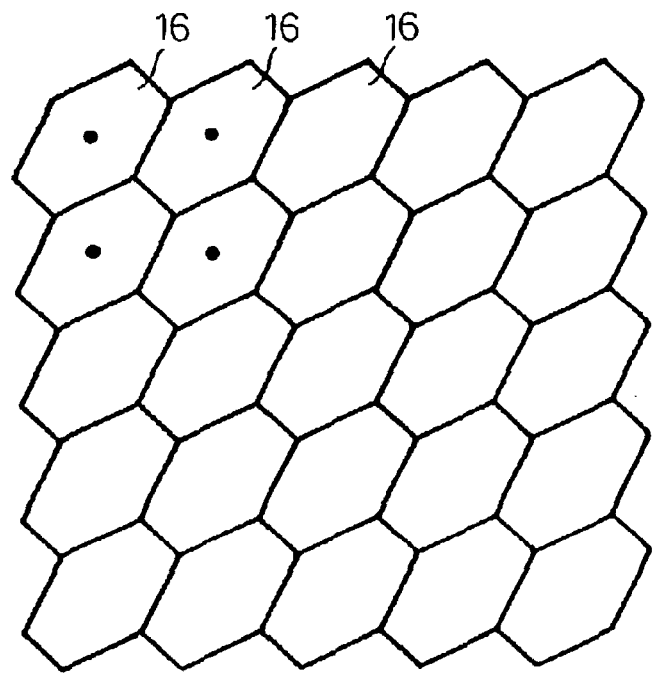
FIG. 23 is a view of a modified example of condenser elements in the square arrangement.

FIG. 23 shows a modification of the condenser elements 16 in the square arrangement. Also in this case, centers of adjacent four condenser elements 16 form a square, and the condenser element 16 has a periodicity in the first and second directions. In FIG. 23, the respective condenser element 16 is formed to be a hexagonal shape. Sides of the hexagon are not parallel to the first and second directions. In other words, the condenser element 16 is of a polygonal (hexagonal) shape having a pair of sides in parallel to a third direction different from the first and second direction, wherein an interior angle thereof is an obtuse angle.

Figure 24:
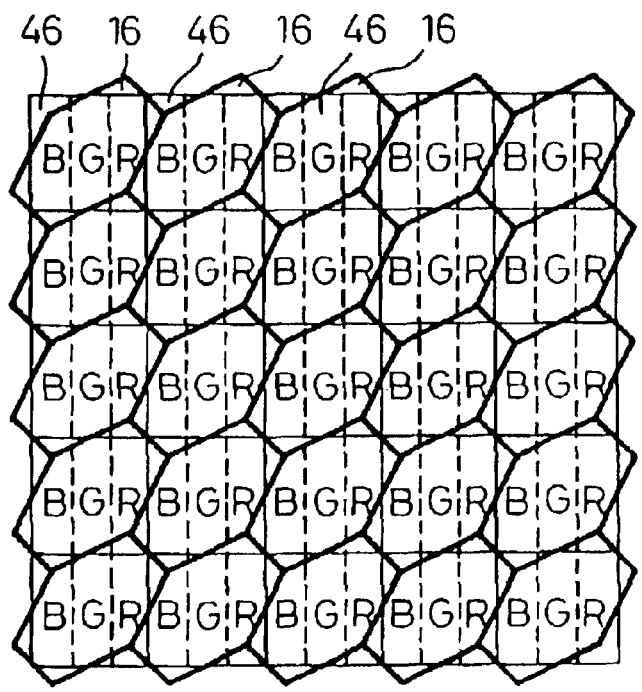
FIG. 24 is a view of illustrating the combination of pixels in the square arrangement shown in FIG. 16 with condenser elements in the square arrangement shown in FIG. 23.

FIG. 24 shows a combination of the pixels 46 in the square arrangement shown in FIG. 16 with the condenser elements 16 in the square arrangement shown in FIG. 23. The pixels 46 are in one-to-one correspondence to the condenser elements 16. Since an area of a condensed beam becomes minimum when the condenser elements 16 of the diffraction grating 14 is circular, it is possible to increase a substantial opening degree of a liquid crystal panel. Also, this serves to improve the light-utilization efficiency.

Figure 25:
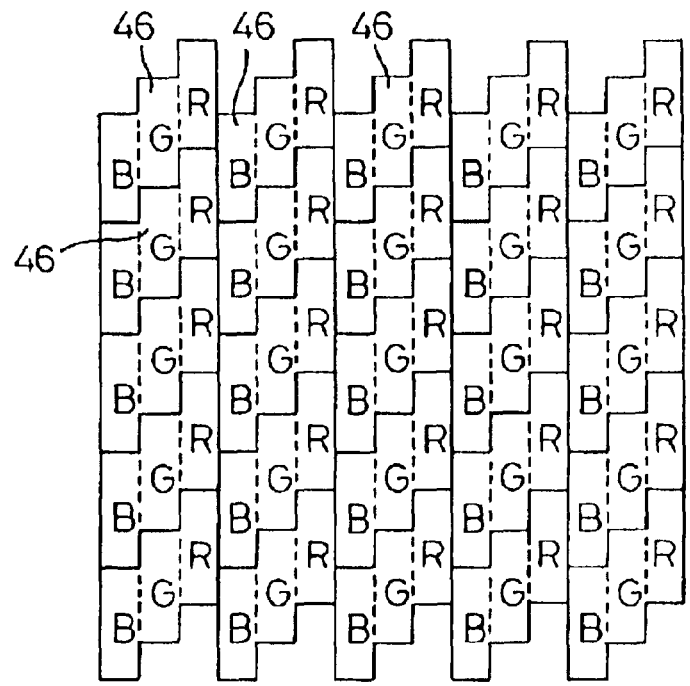
FIG. 25 is a view of a modified example of pixels in the square arrangement.

FIG. 25 shows a modification of the pixels 46 in the square arrangement. Also in this case, centers of the adjacent four pixels 46 form a square. The color dots R, G, B have a periodicity in the first and second mutually perpendicular directions. Three color dots R, G, and B in one pixel 46 is arranged on a first line making an angle to the first and second directions. In one pixel 46, three color dots R, G, and B form a step-like pattern.

Figure 26:
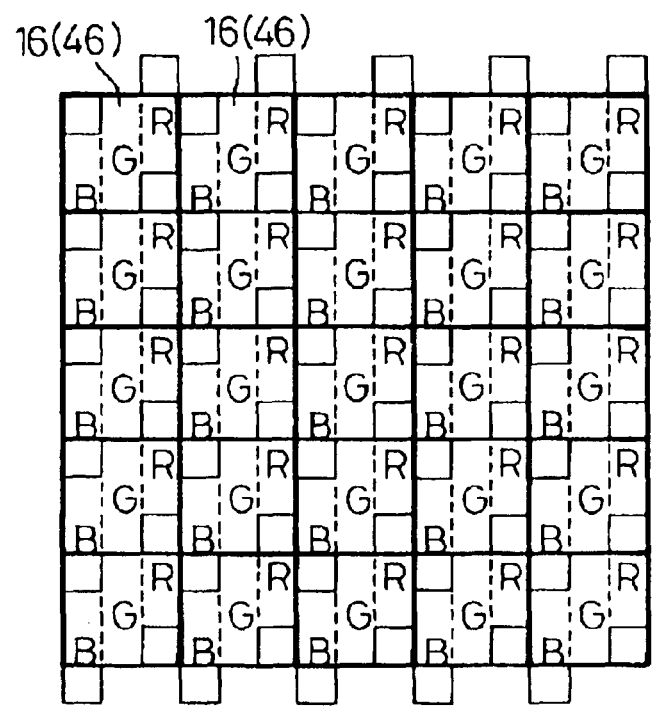
FIG. 26 is a view illustrating the combination of pixels in the square arrangement shown in FIG. 25 with condenser elements in the square arrangement shown in FIG. 17.

FIG. 26 shows a combination of the pixels 46 in the square arrangement shown in FIG. 25 with the condenser elements 16 in square arrangement shown in FIG. 17. The pixels 46 are in one-to-one correspondence to the condenser elements 16.

Figure 27:
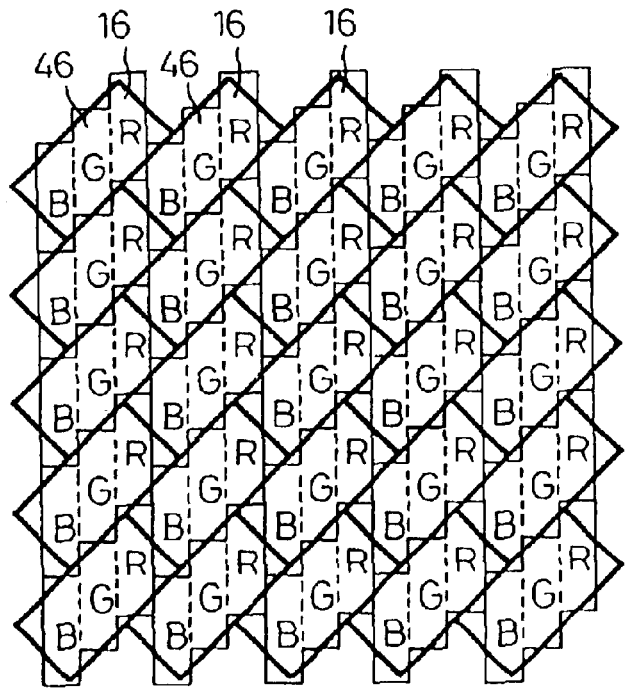
FIG. 27 is a view illustrating the combination of pixels in the square arrangement shown in FIG. 25 with condenser elements shown in FIG. 20.

FIG. 27 shows a combination of the pixels 46 in the square arrangement shown in FIG. 25 with the condenser elements 16 in the square arrangement shown in FIG. 20. The pixels 46 are in one-to-one correspondence to the condenser elements 16.

Figure 28:
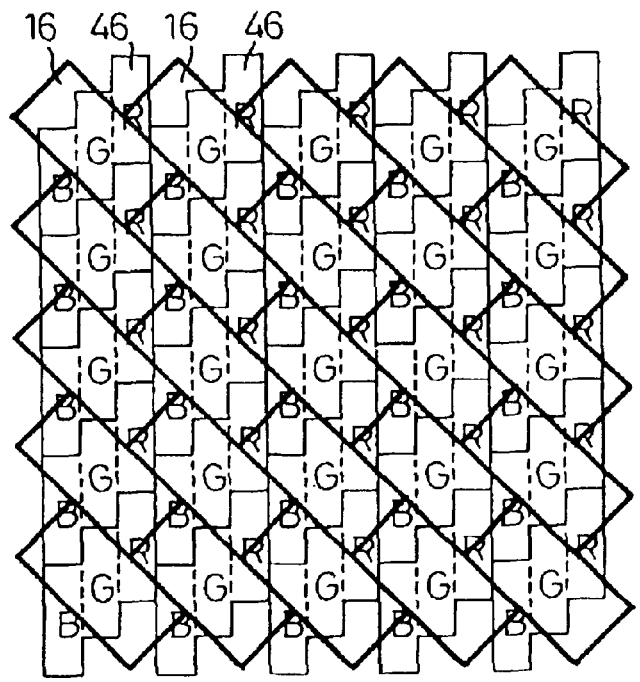
FIG. 28 is a view illustrating the combination of pixels in the square arrangement shown in FIG. 25 with condenser elements in the square arrangement shown in FIG. 20 wherein the orientation is reversed.

FIG. 28 shows a combination of the pixels 46 in the square arrangement shown in FIG. 25 with the condenser elements 16 in the square arrangement shown in FIG. 20 while reversing the orientation of the latter. The pixels 46 are in one-to-one correspondence to the condenser elements 16.

Figure 29:
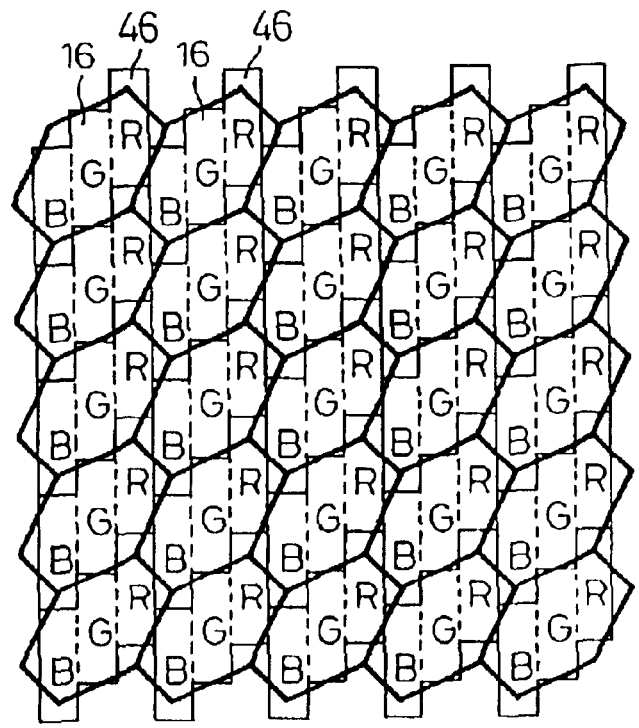
FIG. 29 is a view illustrating the combination of pixels in the square arrangement shown in FIG. 25 with condenser elements in the square arrangement shown in FIG. 23.

FIG. 29 shows a combination of the pixels 46 in the square arrangement shown in FIG. 25 with the condenser elements 16 in the square arrangement shown in FIG. 23. The pixels 46 is in one-to-one correspondence to the condenser elements 16.

Figure 30:
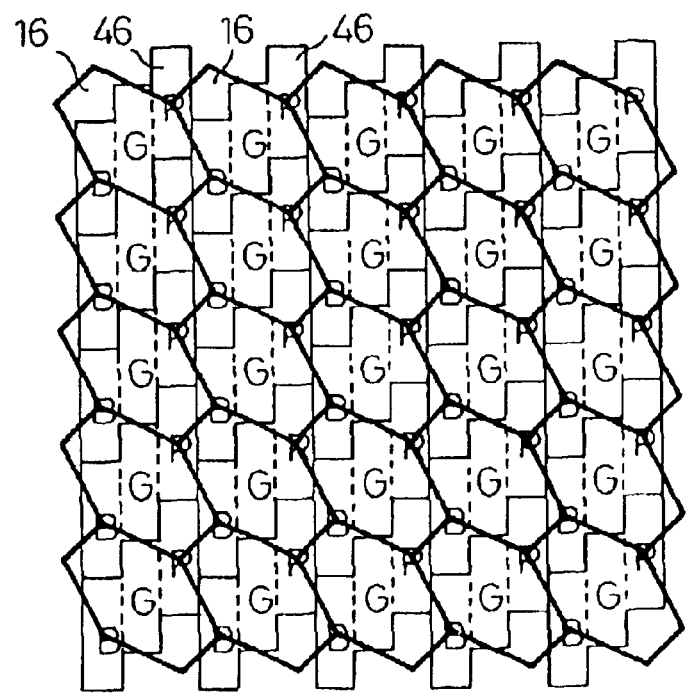
FIG. 30 is a view illustrating the combination of pixels in the square arrangement shown in FIG. 25 with condenser elements in the square arrangement shown in FIG. 23 wherein the orientation is reversed.

FIG. 30 shows a combination of the pixels 46 in the square arrangement shown in FIG. 25 with the condenser elements 16 in the square arrangement shown in FIG. 23 while reversing the orientation of the latter. The pixels 46 are in one-to-one correspondence to the condenser elements 16. In these drawings, the condenser elements 16 are represented by a thick solid line.

A light is made obliquely incident to the diffraction grating 14, and the separation of R,G and B rays occurs in a plane including an incident angle (see FIG. 4). Accordingly, if the color dots R,G, and B are shifted as shown in FIG. 25, it is possible to improve the light utilization efficiency. The embodiments shown in FIGS. 25 to 30 are suitable for receiving oblique incident rays from an upper right point to a lower left point in a 45-degree direction.

Figure 31:
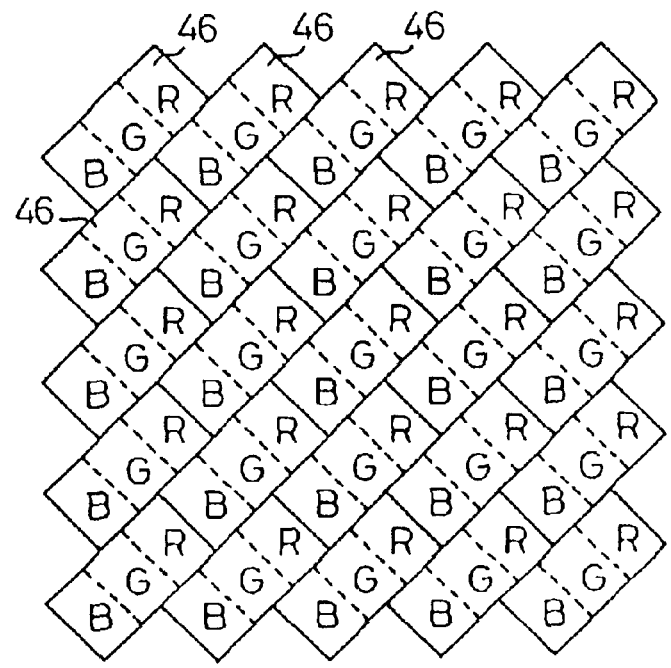
FIG. 31 is a view modified example of pixels in the square arrangement.

FIG. 31 shows an modification of the pixels 46 in the square arrangement. Also in this case, centers of the adjacent four pixels 46 form a square. The color dots R, G and B have a periodicity in the first and second mutually perpendicular directions. Three color dots R, G, and B in one pixel 46 are arranged on a first line making an angle to the first and second directions. The color dots R, G, and B form a rectangle having a longer side extending along the first line.

Figure 32:
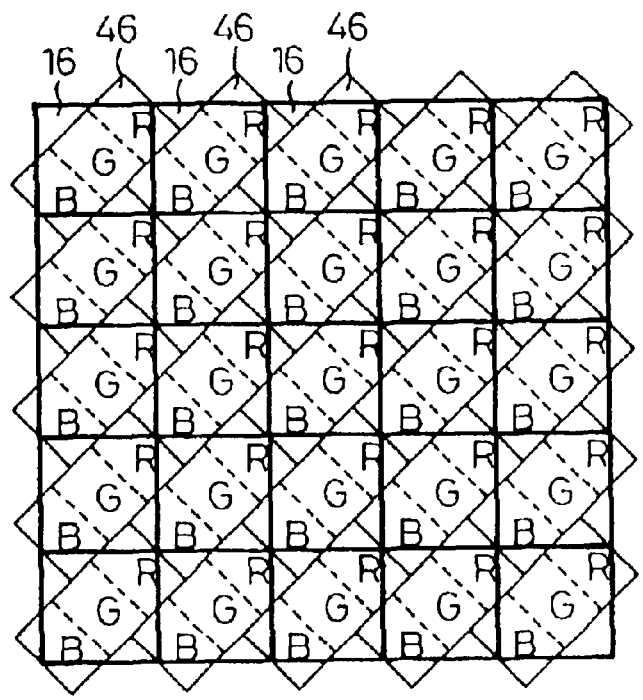
FIG. 32 is a view illustrating the combination of pixels in the square arrangement shown in FIG. 31 with condenser elements in the square arrangement shown in FIG. 17.

FIG. 32 shows a combination of the pixels 46 in the square arrangement shown in FIG. 31 with the condenser elements 16 in the square arrangement shown in FIG. 17. The pixel 46s are in one-to-one correspondence to the condenser elements 16. According to this structure, if the image of the condenser element 16, instead of that of the liquid crystal panel 18, is formed on the screen 22, it is possible to have the same display arrangement as the condenser elements 16 in the square arrangement.

Figure 33:
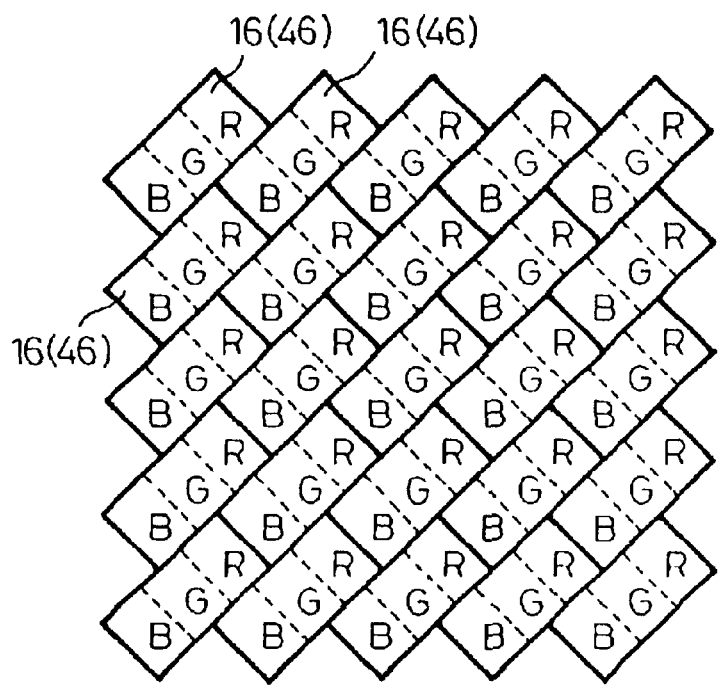
FIG. 33 is a view illustrating the combination of pixels in the square arrangement shown in FIG. 31 with condenser elements in the square arrangement shown in FIG. 20.

FIG. 33 shows a combination of the pixels 46 in the square arrangement shown in FIG. 31 with the condenser elements 16 in the square arrangement shown in FIG. 20. The pixels 46 are in one-to-one correspondence to the condenser elements 16. The condenser elements 16 have the same shape as the pixels 46.

Figure 34:
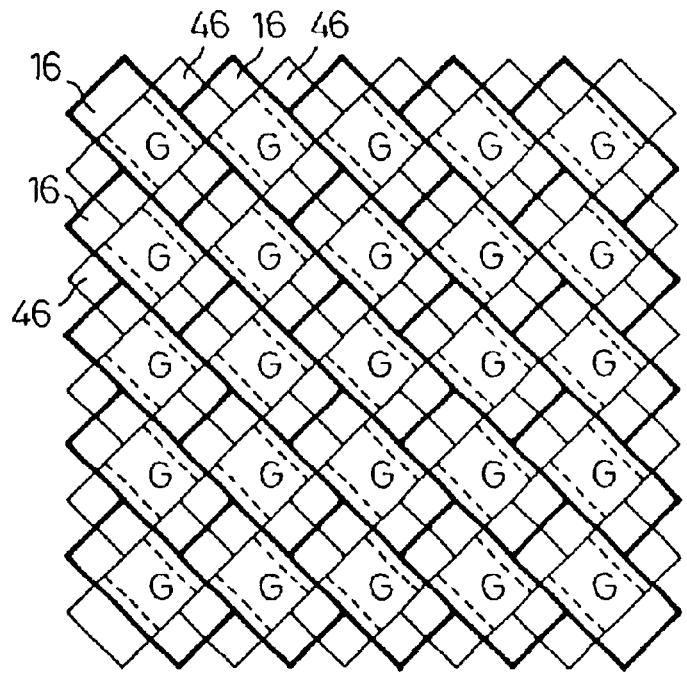
FIG. 34 is a view illustrating the combination of pixels in the square arrangement shown in FIG. 31 with condenser elements in the square arrangement shown in FIG. 20 wherein the orientation is reversed.

FIG. 34 shows a combination of the pixels 46 in the square arrangement shown in FIG. 31 with the condenser elements 16 in the square arrangement shown in FIG. 20 while reversing the orientation of the latter. The pixels 46 are in one-to-one correspondence to the condenser elements 16. The pixels 46 are mirror-symmetrical relative to the condenser elements 16.

Figure 35:
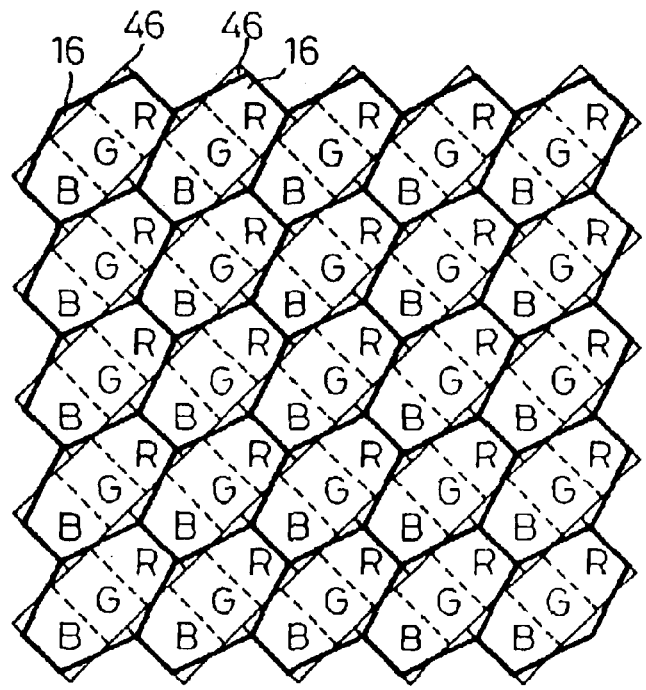
FIG. 35 is a view illustrating the combination of pixels in the square arrangement shown in FIG. 31 with condenser elements in the square arrangement shown in FIG. 23.

FIG. 35 shows a combination of the pixels 46 in the square arrangement shown in FIG. 31 with the condenser elements 16 in the square arrangement shown in FIG. 23. The pixels 46 are in one-to-one correspondence to the condenser elements 16.

Figure 36:
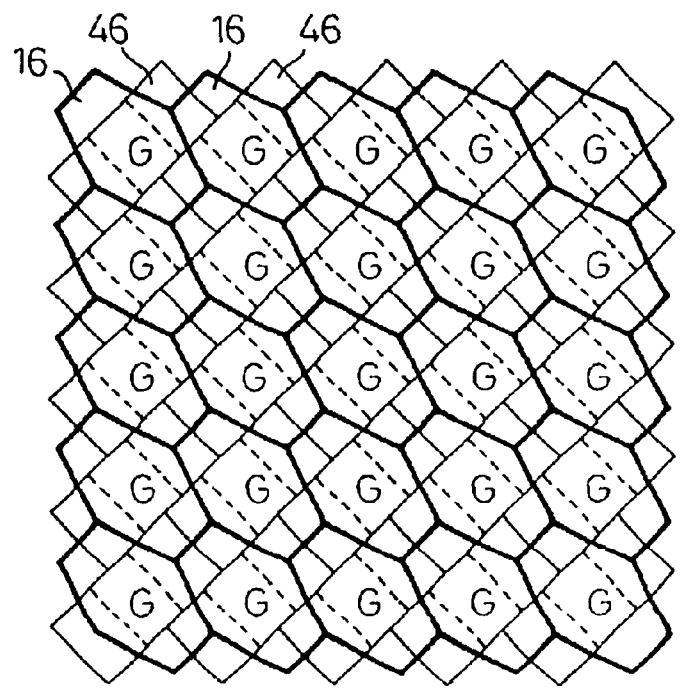
FIG. 36 is a view illustrating the combination of pixels in the square arrangement shown in FIG. 31 with condenser elements in the square arrangement shown in FIG. 23 wherein the orientation is reversed.

FIG. 36 shows a combination of the pixels 46 in the square arrangement shown in FIG. 31 with the condenser elements 16 in the square arrangement shown in FIG. 23 while reversing the orientation of the latter. The pixels 46 are in one-to-one correspondence to the condenser elements 16.

In FIGS. 31 to 36, the pixels 46 are of a rectangular shape having a ratio of the vertical side to the horizontal side of 1:2, which can be converted to a square arrangement similar to that shown in FIG. 16, having the same period in the upward/downward direction and in the leftward/rightward direction, by slanting the longer axis (shorter axis) relative to the horizontal at 45 degrees. In this arrangement, the color dot R, G and B is of a rectangular shape having a ratio of the vertical side to the horizontal side of 3:2. The color dot R, G and B are of a rectangular shape having a ratio of the vertical side to the horizontal side of 3:1 in the square arrangement shown in FIG. 16, resulting in an elongated opening which does not allow the ray condensed by the diffraction grating to efficiently pass through the same. However, this problem is solved by an arrangement to improve the light-utilization efficiency.

In FIGS. 24 and 25, since the diffraction grating elements are of a polygonal shape having an obtuse interior angle, it is possible to improve the light utilization efficiency because of the same reason as in the embodiment 2. Also, since an incident ray is input along a shorter axis of the diffraction grating elements, the fringe pitch of the diffraction grating elements becomes less to enable the dots to be positioned in the color separating direction, which enhances the light utilization efficiency.

Figure 37:
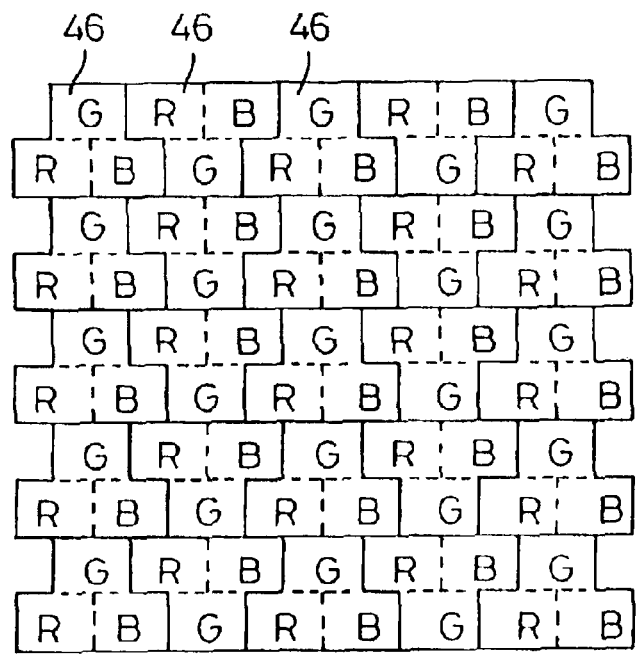
FIG. 37 is a view of pixels in the delta arrangement.

FIG. 37 shows the pixels 46 in the delta (triangle) arrangement, used as a display for a picture. That is, the pixels 46 have a periodicity in one of the first and second mutually directions (in the illustrated embodiment, in the vertical direction), wherein the pixels 46 in a (vertical) row having the periodicity has a shape reverse to that of the pixel 46 in the adjacent row. As seen in a horizontal row, color dots R, G and B in the adjacent two rows are arranged with a period thereof being shifted by ½ phase.

Figure 38:
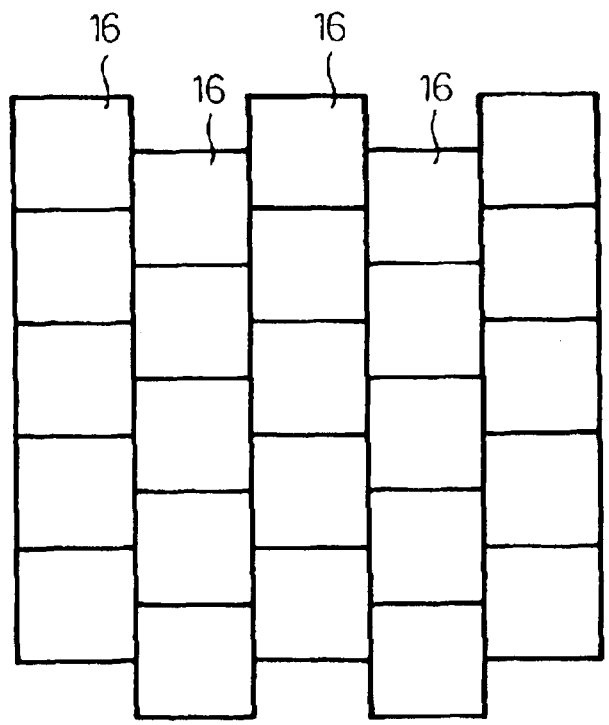
FIG. 38 is a view of condenser elements in the delta arrangement.

FIG. 38 shows the condenser elements 16 in the delta arrangement. The condenser elements 16 are in a quadrangle having two pairs of parallel sides extending in the first and second directions and have a periodicity in one of the first and second directions. The condenser elements in the adjacent two rows are arranged with a period thereof being shifted by a ½ phase.

Figure 39:
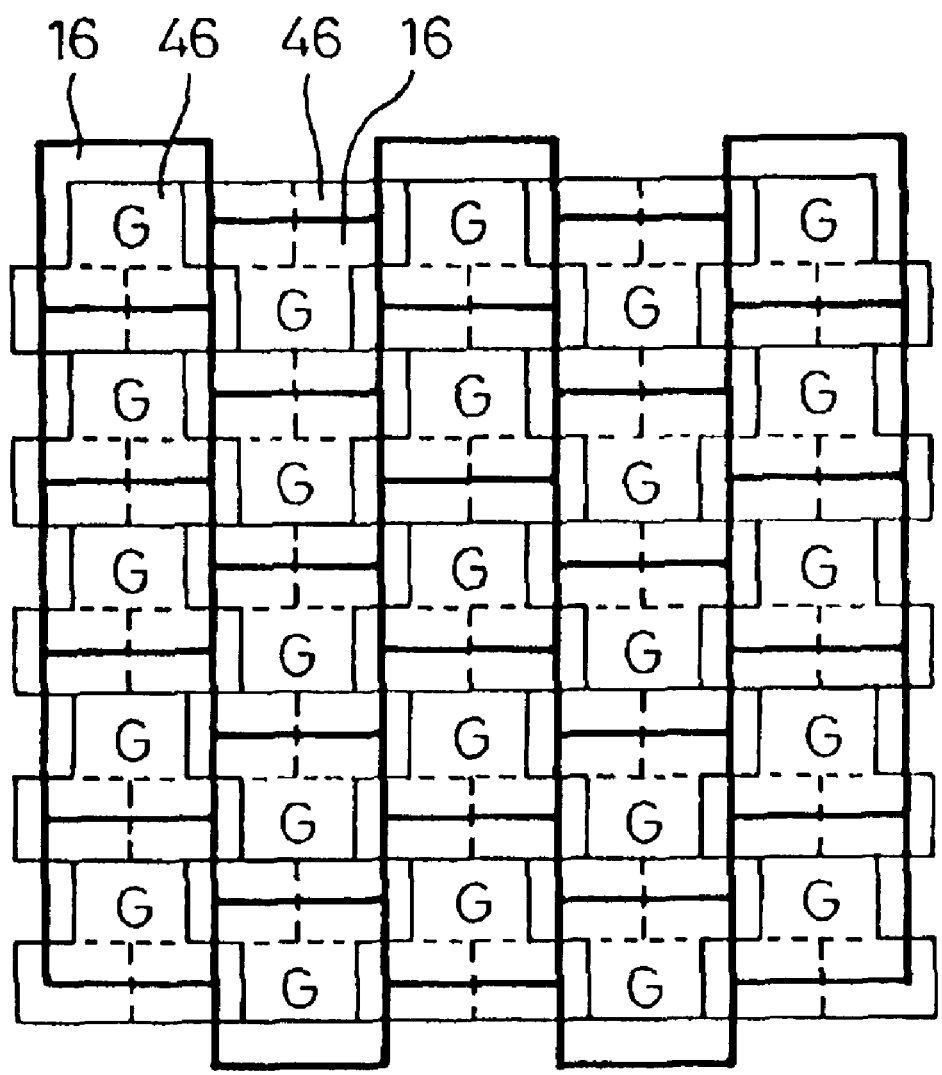
FIG. 39 is a view illustrating the combination of pixels in the delta arrangement shown in FIG. 37 with condenser elements in the delta arrangement shown in FIG. 38.

FIG. 39 shows a combination of the pixels 46 in the delta arrangement shown in FIG. 37 and the condenser elements in the delta arrangement shown in FIG. 38. In this structure, one condenser element 16 condenses rays into the color dot G of the pixel 46 overlaid thereon, into the color dot R of the pixel 46 located on one side of the former pixel 46, and into the color dot B of the pixel 46 located on the other side thereof. That is, the pixel behaves as a horizontally elongated rectangular pixel (see FIG. 7), whereby a fringe of the diffraction grating 14 for carrying out the color separation and the condensation on this pixel 46 becomes less than the distribution of the fringe in the tetragonal arrangement shown in FIG. 18. Therefore, as described above, it is possible to obtain a high diffraction efficiency. The pixels 46 in the delta arrangement are usually of a convex shape, but may be driven as a pixel arranged in a horizontal row.

Figure 40:
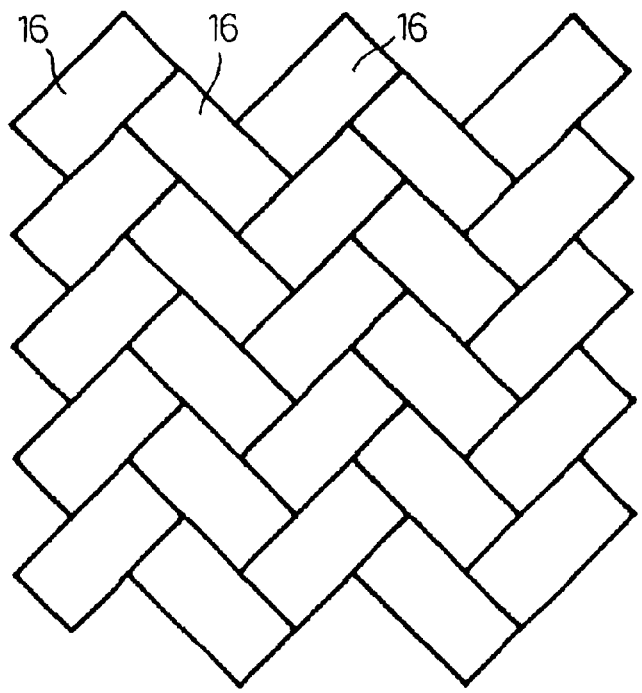
FIG. 40 is a view of condenser elements in the modified delta arrangement.

FIG. 40 shows a modification of the condenser elements 16 in the delta arrangement. The condenser elements 16 are of a quadrangle having a pair of parallel longer sides extending in third and fourth directions different from the first and second directions, and has a periodicity in one of the first and second directions so that a shorter side of the condenser element in one of the adjacent two rows abuts to a longer side of the condenser element in the other row. The orientations of the condenser elements are alternate in the adjacent rows with a period being shifted at ½ phase.

Figure 41:
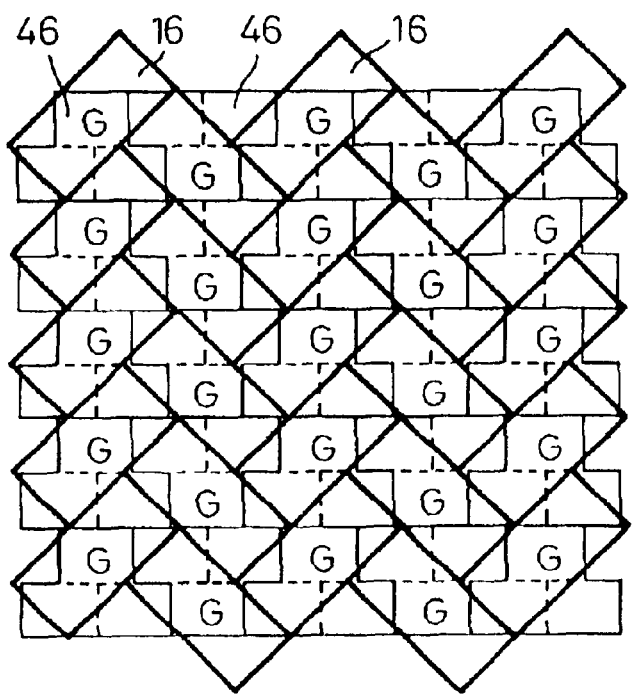
FIG. 41 is a view illustrating the combination of pixels in the delta arrangement shown in FIG. 37 with condenser elements in the delta arrangement shown in FIG. 40.

FIG. 41 shows a combination of the pixels 46 in the delta arrangement shown in FIG. 37 and the condenser elements 16 in the delta arrangement shown in FIG. 40.

Figure 42:
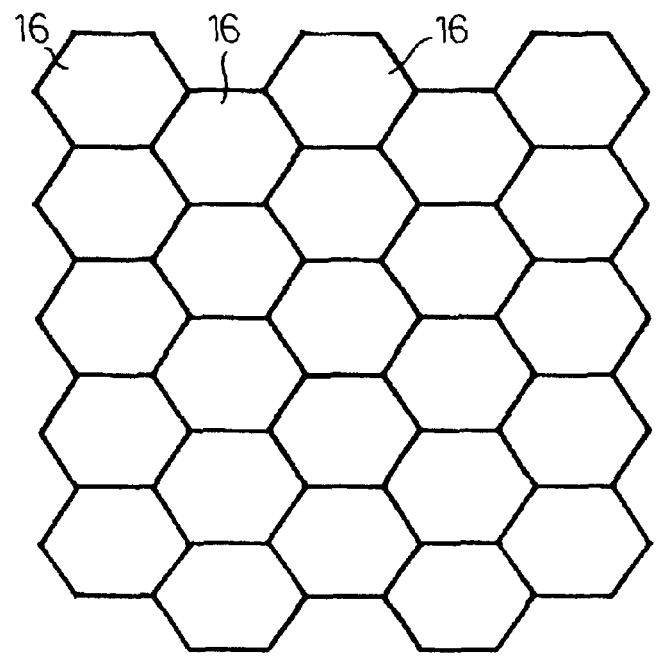
FIG. 42 is a view of condenser elements in the modified delta arrangement.

FIG. 42 shows a modification of the condenser elements 16 in the delta arrangement. The condenser elements 16 are of a polygonal shape (hexagon) including a pair of parallel sides extending in a third direction different from the first and second directions, and has a periodicity in one of the first and second directions, and the period is shifted at ½ phase between the adjacent two rows of the condenser elements.

Figure 43:
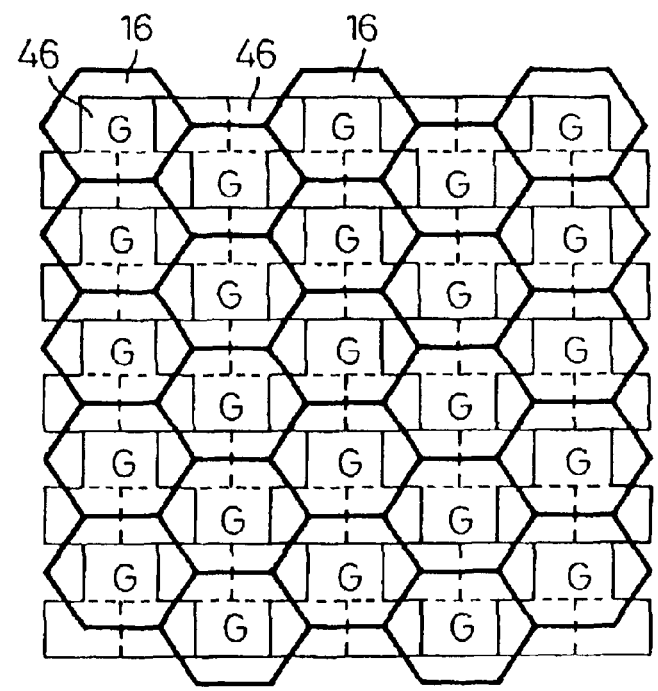
FIG. 43 is a view illustrating the combination of pixels in the delta arrangement shown in FIG. 37 with condenser elements in the delta arrangement shown in FIG. 42.

FIG. 43 shows a combination of the pixels 46 in the delta arrangement shown in FIG. 37 and the condenser elements 16 in the delta arrangement shown in FIG. 42. The operation of the structures shown in FIGS. 41 and 43 is the same as that of the structure shown in FIG. 39.

FIG. 44 shows the pixels 46 in the mosaic arrangement which is one of the modifications of the delta arrangement. Color dots R, G and B are arranged in a mosaic manner. The pixel 46 includes the color dots R, G and B arranged to form an L-shape so that the color dots R and B occupy corner positions of the L-shape. The pixels 46 have a periodicity in the vertical direction. In the adjacent horizontal two rows, the color dots R, G and B are arranged with a period being shifted at a ⅓ phase, and in the subsequent adjacent horizontal two rows, the color dots R, G, B are arranged with a period being shifted at a −⅓ phase. For example, a series of color dots G, R and B in the uppermost row is shifted leftward by one color dot in a first lower row and rightward by one color dot in a second lower row. One color dot corresponds to a ⅓ phase difference.

FIG. 45 shows a modification of the pixels 46 in the mosaic arrangement. The color dots R, G and B are arranged in a mosaic manner. The pixels 46 are of rectangular shape and includes color dots R, G and B arranged in series. The arrangement of the color dots R, G and B is the same as that of the color dots R, G and B shown in FIG. 44.

Figure 46:
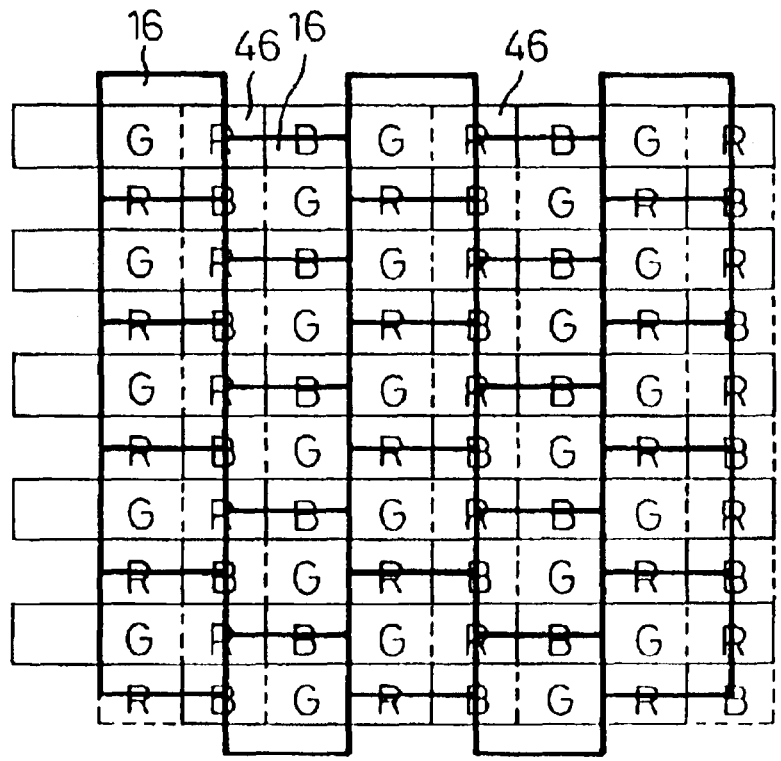
FIG. 46 is a view illustrating the combination of pixels in the mosaic arrangement shown in FIG. 45 with condenser elements in the delta arrangement shown in FIG. 38.
Figure 47:
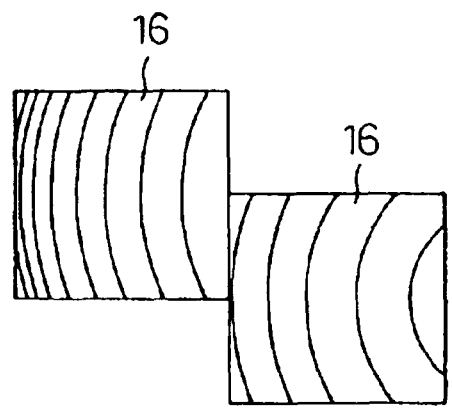
FIG. 47 is a view illustrating the feature of the condenser element used in FIG. 46.

FIG. 46 shows a combination of the pixels 46 in the mosaic arrangement shown in FIG. 45 and the condenser elements 16 in the delta arrangement shown in FIG. 38. In the structure shown in FIG. 46, two kinds of condenser elements 16 (having different fringe shapes of two kinds of pitches) are used, which are capable of condensing rays at different positions as shown in FIG. 47.

Figure 48:
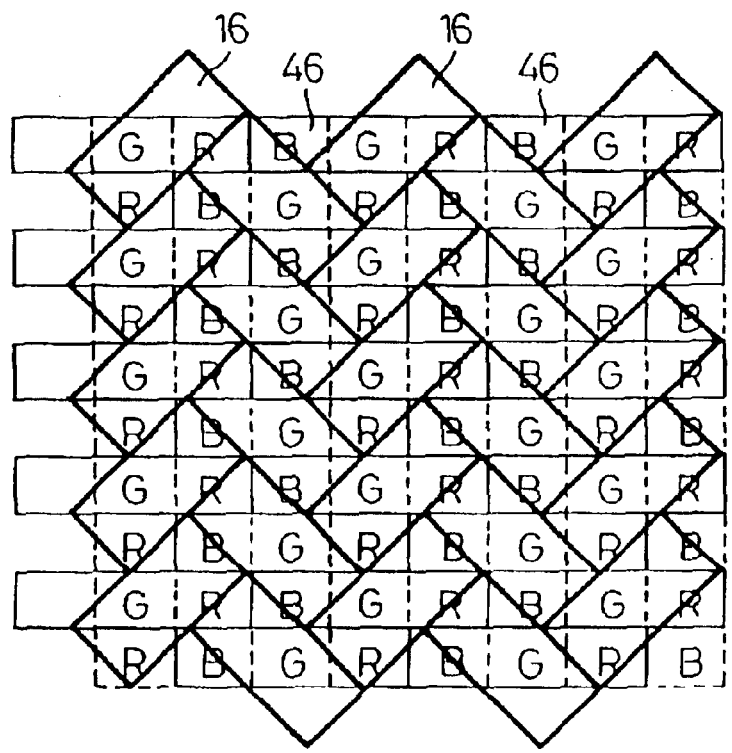
FIG. 48 is a view illustrating the combination of pixels in the mosaic arrangement shown in FIG. 45 with condenser elements in the delta arrangement shown in FIG. 40.
Figure 49:
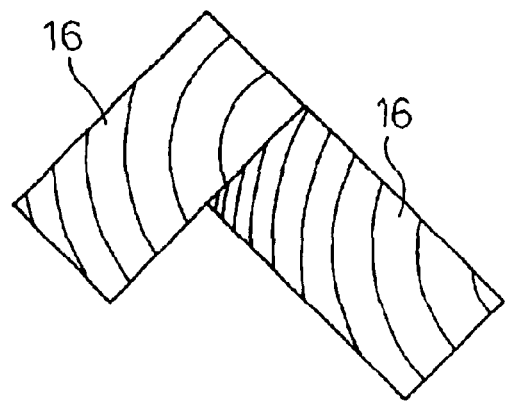
FIG. 49 is a view illustrating the feature of the condenser element used in FIG. 48.

FIG. 48 shows a combination of the pixels 46 in the mosaic arrangement shown in FIG. 45 and the condenser elements 16 in the delta arrangement shown in FIG. 40. In the structure shown in FIG. 48, two kinds of condenser elements 16 are used, which are capable of condensing rays at different positions as shown in FIG. 49.

Figure 50:
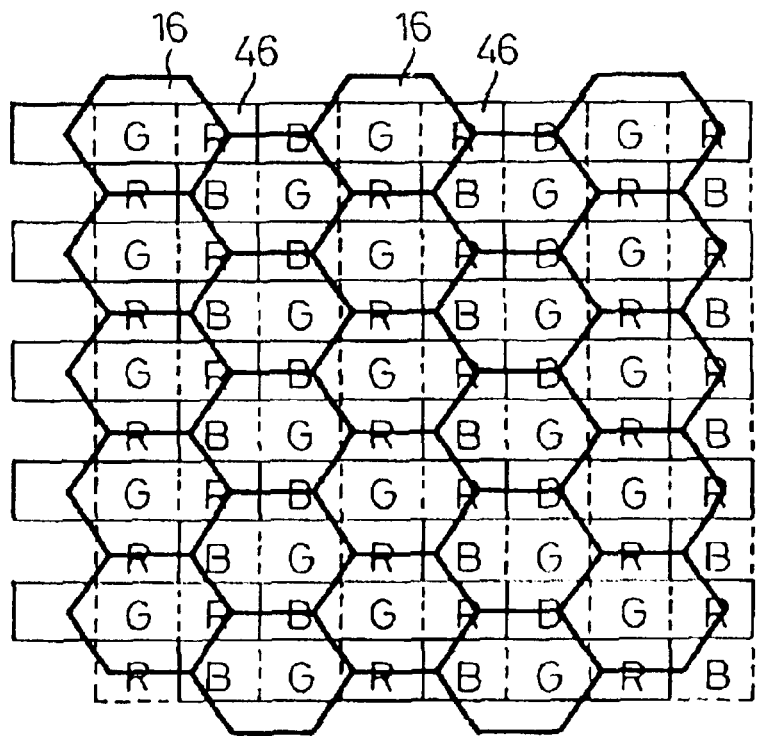
FIG. 50 is a view illustrating the combination of pixels in the mosaic arrangement shown in FIG. 45 with condenser elements in the delta arrangement shown in FIG. 42.
Figure 51:
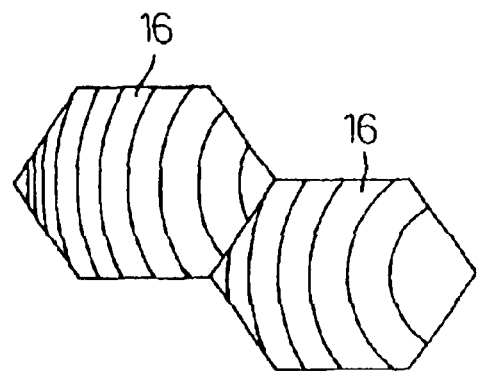
FIG. 51 is a view illustrating the feature of the condenser element used in FIG. 50.

FIG. 50 shows a combination of the pixels 46 in the mosaic arrangement shown in FIG. 45 and the condenser elements 16 in the delta arrangement shown in FIG. 42. In the structure shown in FIG. 50, two kinds of condenser elements 16 are used, which are capable of condensing rays at different positions as shown in FIG. 51. According to these arrangement of the condenser elements, it is possible to provide a display suitable for a picture by observing an image on the condenser elements, similar to the delta arrangement, although the pixels 46 are arranged in a mosaic manner.

Figures 52, 53:
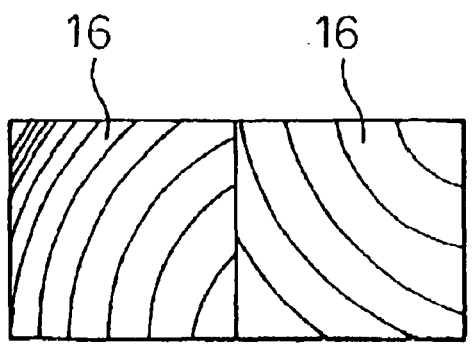
FIG. 52 is a view illustrating the combination of pixels in the mosaic arrangement shown in FIG. 45 with condenser elements in the square arrangement shown in FIG. 17.
FIG. 53 is a view illustrating the feature of the condenser element used in FIG. 52.

FIG. 52 shows a combination of the pixels 46 in the mosaic arrangement shown in FIG. 45 and the condenser elements 16 in the delta arrangement shown in FIG. 17. In the structure shown in FIG. 52, two kinds of condenser elements 16 are used which are capable of condensing rays at different positions as shown in FIG. 53. Shapes of two kinds of fringes are designed so that the diffracted rays are output in the different directions as seen upward and downward. These condenser elements 16 are arranged in a square manner, and it is possible to provide a display suitable for a text (characters), although the pixels 46 are arranged in a mosaic manner.

Figure 54:
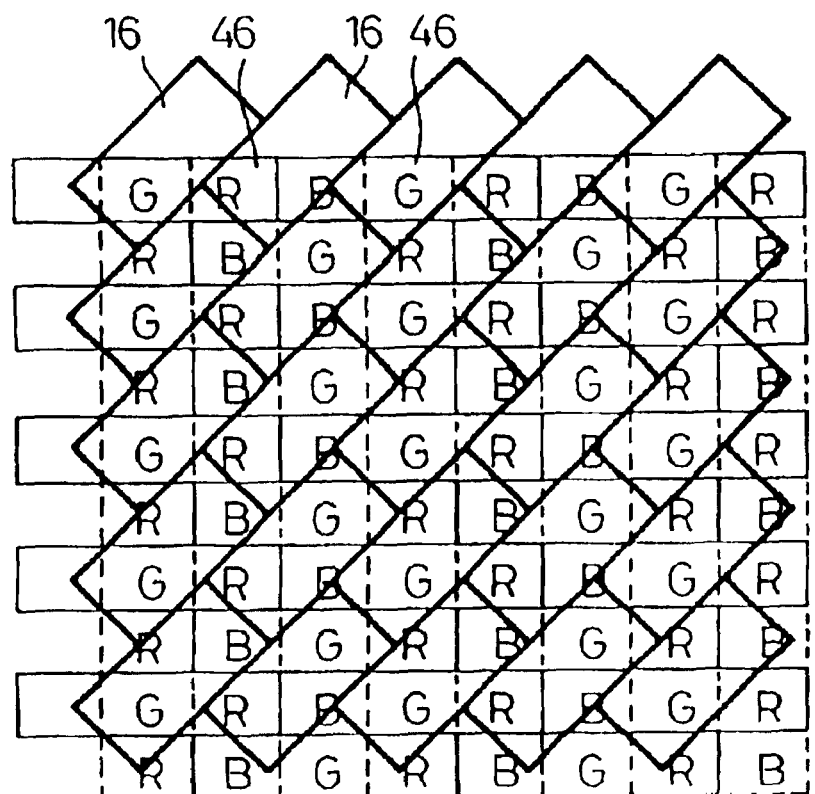
FIG. 54 is a view illustrating combination of pixels in the mosaic arrangement shown in FIG. 45 with condenser elements in the square arrangement shown in FIG. 20.
Figure 55:
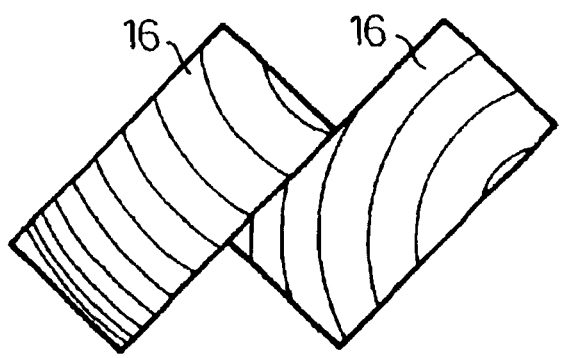
FIG. 55 is a view illustrating the feature of the condenser element used in FIG. 54.

FIG. 54 shows a combination of the pixels 46 in the mosaic arrangement shown in FIG. 45 and the condenser elements 16 in the square arrangement shown in FIG. 20. In the structure shown in FIG. 54, two kinds of condenser elements 16 are used, which are capable of condensing rays at different positions as shown in FIG. 55.

Figure 56:
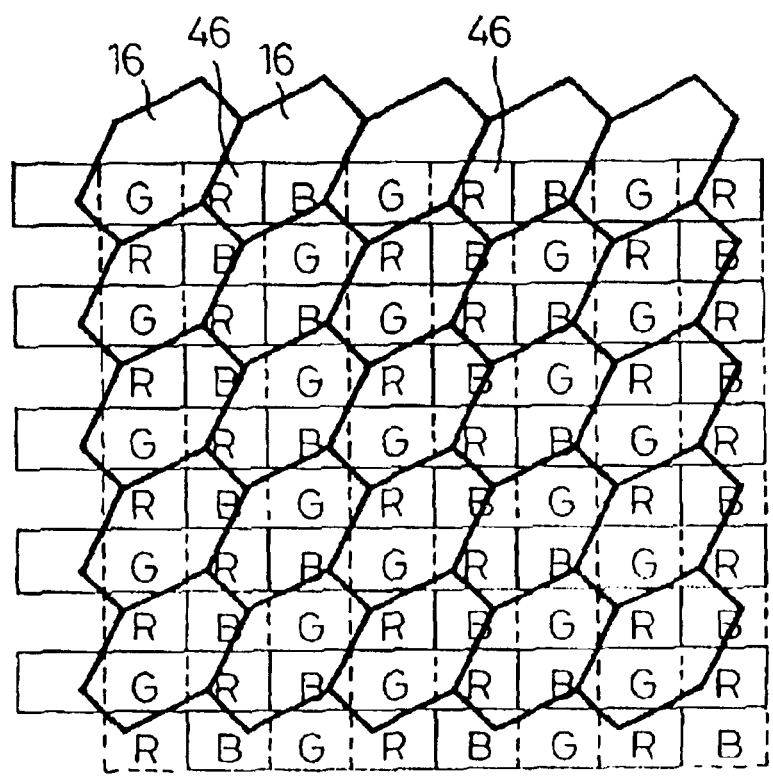
FIG. 56 is a view illustrating the combination of pixels in the mosaic arrangement shown in FIG. 45 with condenser elements in the square arrangement shown in FIG. 23.
Figure 57:
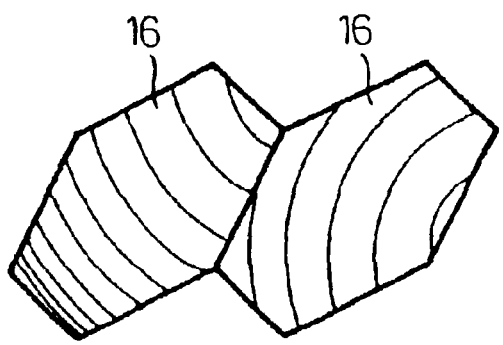
FIG. 57 is a view illustrating the feature of the condenser element used in FIG. 54.

FIG. 56 shows a combination of the pixels 46 in the mosaic arrangement shown in FIG. 45 and the condenser elements 16 in the square arrangement shown in FIG. 23. In the structure shown in FIG. 56, two kinds of condenser elements 16 are used, which are capable of condensing rays at different positions as shown in FIG. 57.

Figures 58, 59:
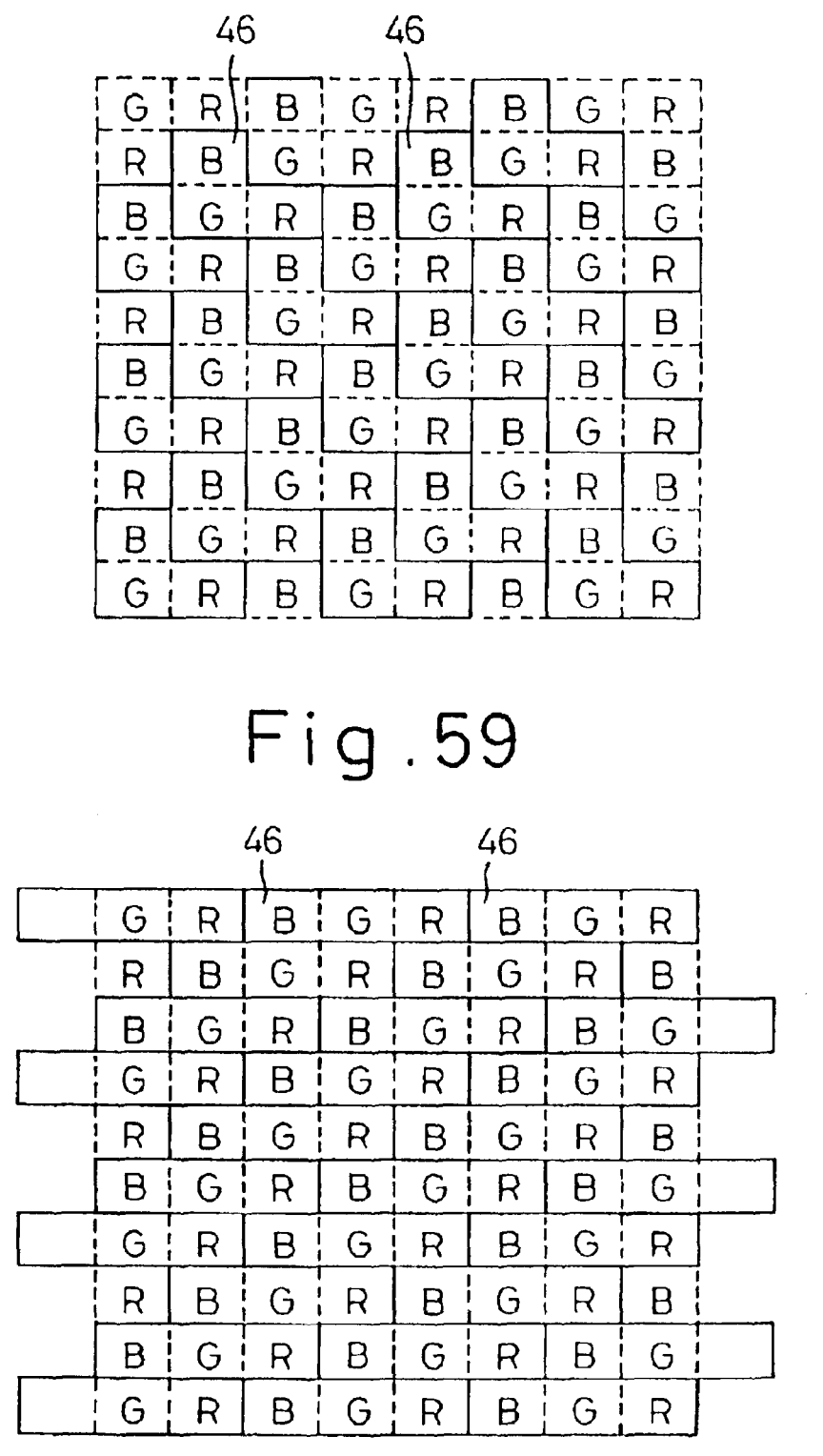

FIGS. 58 and 59 show modifications of the pixels 46 in the mosaic arrangements shown in FIGS. 44 and 45, respectively. While the pixels 46 have a periodicity at every two rows of the color dots in the embodiments shown in FIGS. 44 and 45, the pixels 46 have the periodicity at every three rows of the color dots in this embodiment. Also in this embodiment, the same color dots are repeated at every three rows as seen in the vertical direction. Although the arrangement of the color dots are the same both in FIGS. 58 and 59, the color dots in one pixel is of an L-shape in FIG. 58 and of a rectangular shape in FIG. 59. In this case, in the adjacent two rows, the color dots are arranged with a period being shifted at ⅓ phase, and in the subsequent adjacent two rows, the color dots are arranged with a period being shifted at ⅓ phase. For example, while the blue color dot B becomes zigzag going downward in FIGS. 44 and 45, it is oriented in a predetermined oblique direction going downward in FIGS. 58 and 59.

Figures 60, 61:
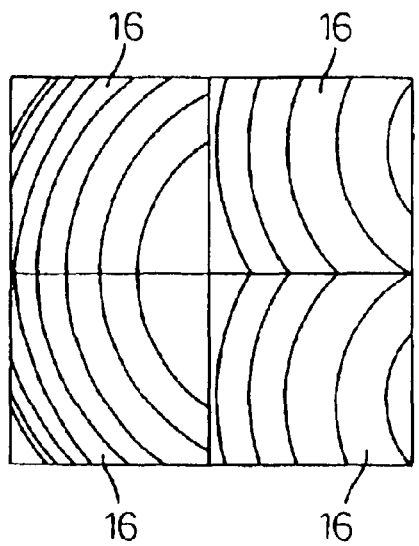
FIG. 60 is a view illustrating the combination of pixels in the mosaic arrangement shown in FIG. 59 with condenser elements in the square arrangement shown in FIG. 17.
FIG. 61 is a view illustrating the feature of the condenser element used in FIG. 60.

FIG. 60 shows a combination of the pixels 46 in the mosaic arrangement shown in FIG. 59 and the condenser elements 16 in the square arrangement shown in FIG. 17. In the structure shown in FIG. 60, four kinds of condenser elements 16 are used, which are capable of collecting rays at different positions as shown in FIG. 61.

Figure 62:
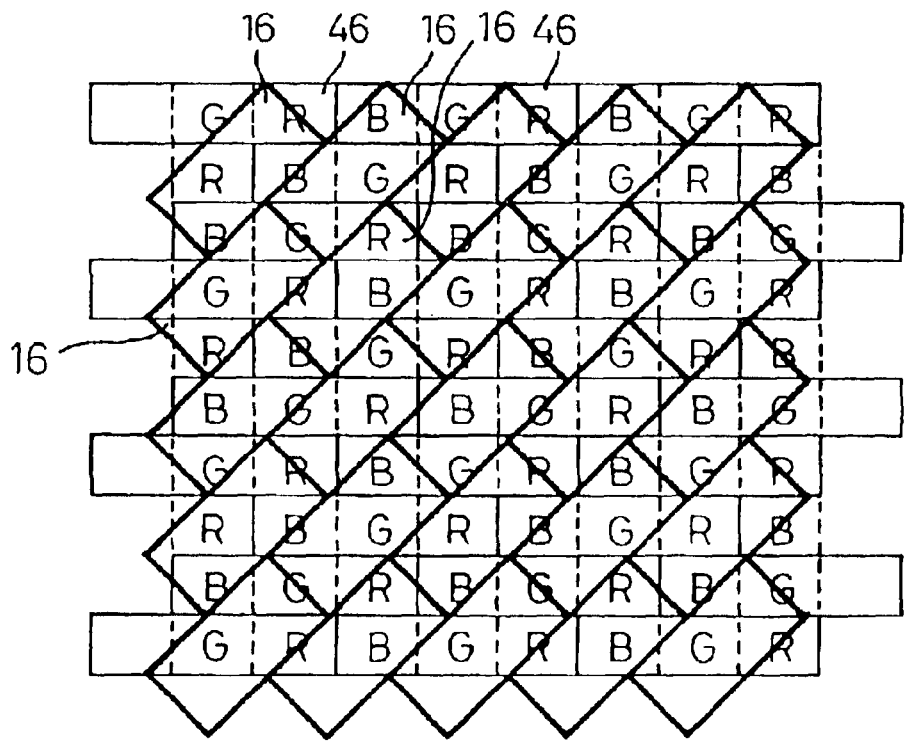
FIG. 62 is a view illustrating the combination of pixels in the mosaic arrangement shown in FIG. 59 with condenser elements in the square arrangement shown in FIG. 20.
Figure 63:
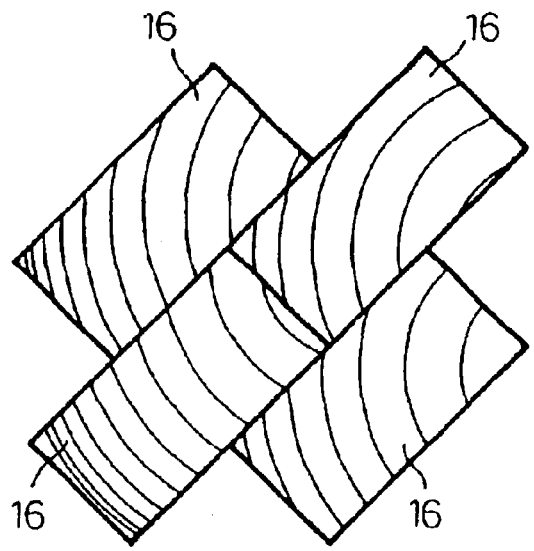
FIG. 63 is a view illustrating the feature of the condenser element used in FIG. 62.

FIG. 62 shows a combination of the pixels 46 in the mosaic arrangement shown in FIG. 59 and the condenser elements 16 in the square arrangement shown in FIG. 20. In the structure shown in FIG. 62, four kinds of condenser elements 16 are used, which are capable of collecting rays at different positions as shown in FIG. 63.

Figure 64:
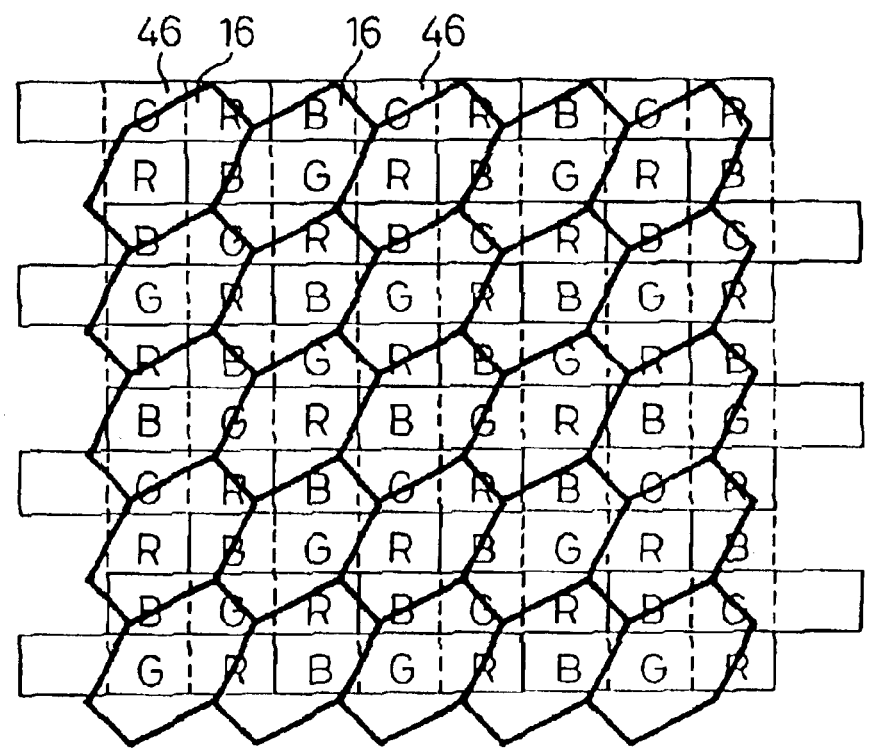
FIG. 64 is a view illustrating the combination of pixels in the mosaic arrangement shown in FIG. 59 with condenser elements in the square arrangement shown in FIG. 23.
Figure 65:
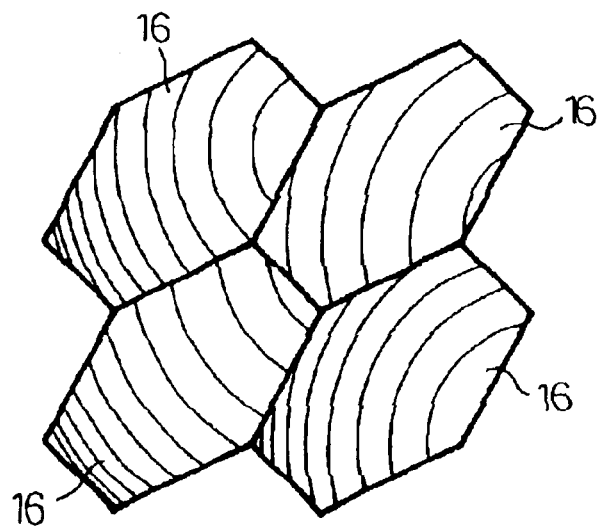
FIG. 65 is a view illustrating the feature of the condenser element used in FIG. 64.

FIG. 64 shows a combination of the pixels 46 in the mosaic arrangement shown in FIG. 59 and the condenser elements 16 in the square arrangement shown in FIG. 23. In the structure shown in FIG. 64, four kinds of condenser elements 16 are used which are capable of collecting rays at different positions as shown in FIG. 65.

Figure 66:
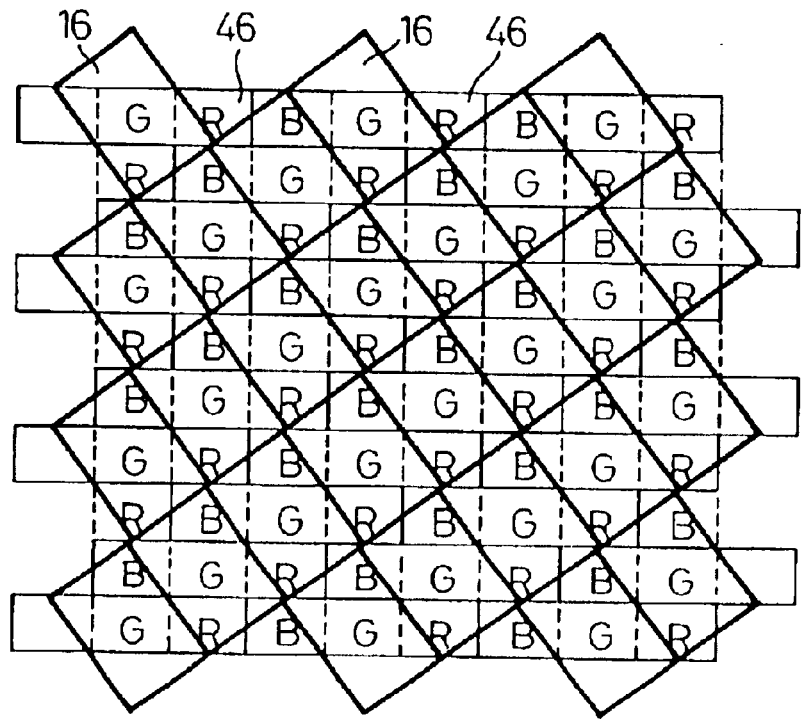
FIG. 66 is a view illustrating the combination of pixels in the mosaic arrangement shown in FIG. 59 with rectangular condenser elements in the delta arrangement wherein the orientation is reversed.

FIG. 66 shows a combination of the pixels 46 in the mosaic arrangement shown in FIG. 59 and rectangular condenser elements 16 which are equivalent to the delta arrangement.

Figure 67:
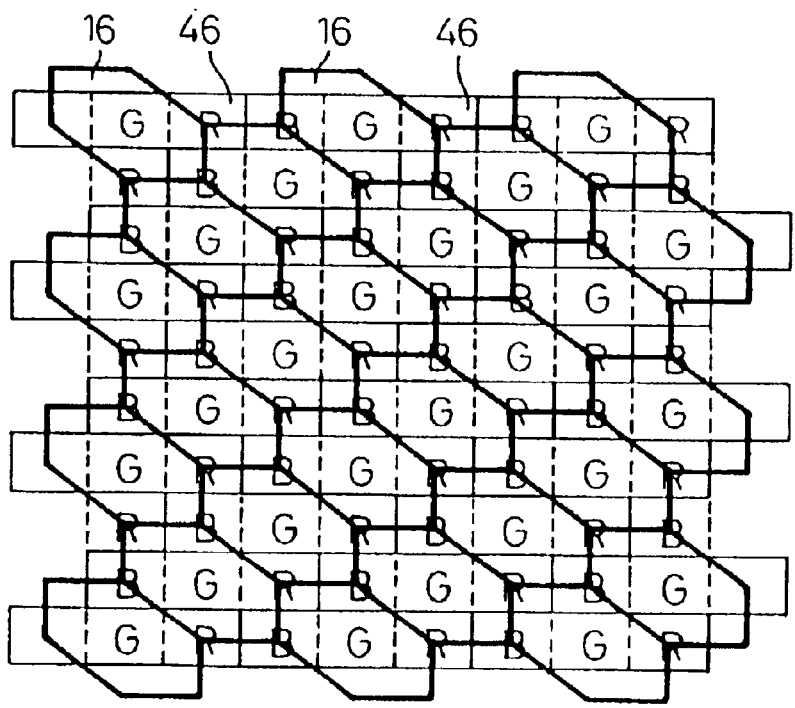
FIG. 67 is a view illustrating the combination of pixels in the mosaic arrangement shown in FIG. 59 with hexagonal condenser elements in the delta arrangement wherein the orientation is reversed.

FIG. 67 shows a combination of the pixels 46 in the mosaic arrangement shown in FIG. 59 and hexagonal condenser elements 16 which are equivalent to the delta arrangement but reversely oriented. In FIGS. 66 and 67, condenser elements 16 of one kind of fringe shape are used.

Figure 71:
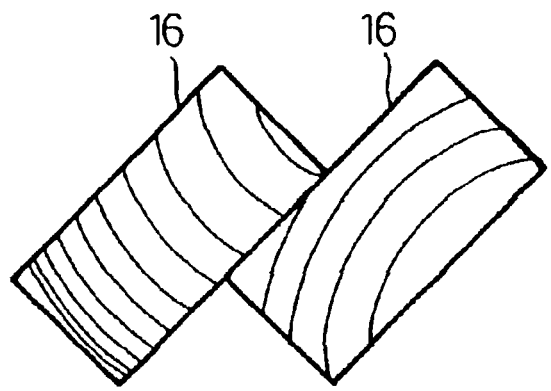
FIG. 71 is a view illustrating the feature of the condenser element used in FIG. 70.
Figure 72:
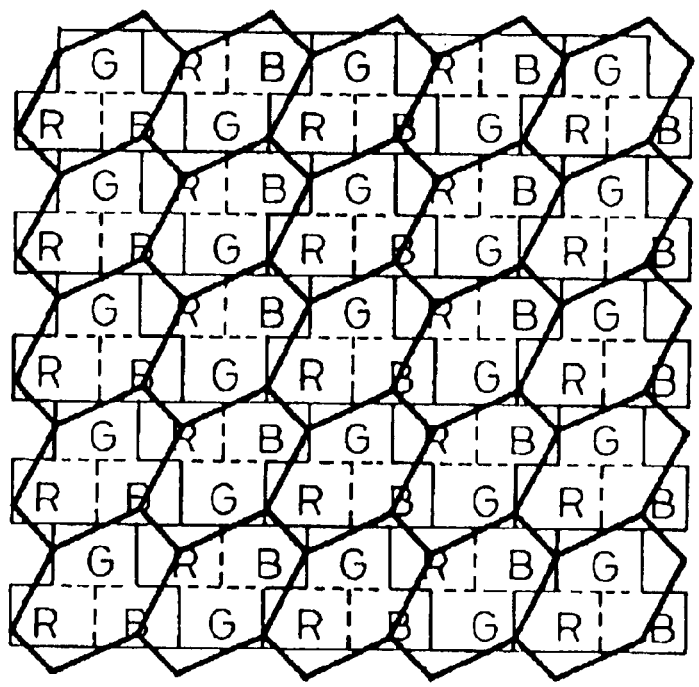
FIG. 72 is a view illustrating the combination of pixels in the delta arrangement shown in FIG. 37 with condenser elements in the square arrangement shown in FIG. 23.
Figure 73:
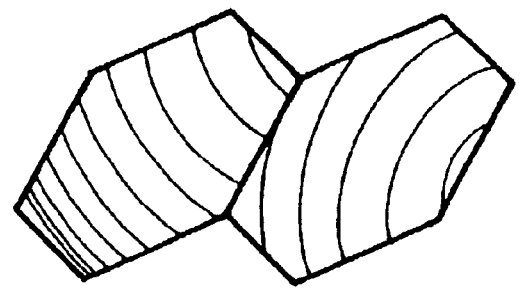
FIG. 73 is a view illustrating the feature of the condenser element used in FIG. 72.

FIGS. 68 to 73 show combinations of the pixels 46 in the delta arrangement shown in FIG. 73 and the condenser elements 16 in the square arrangement respectively.

Figure 68:
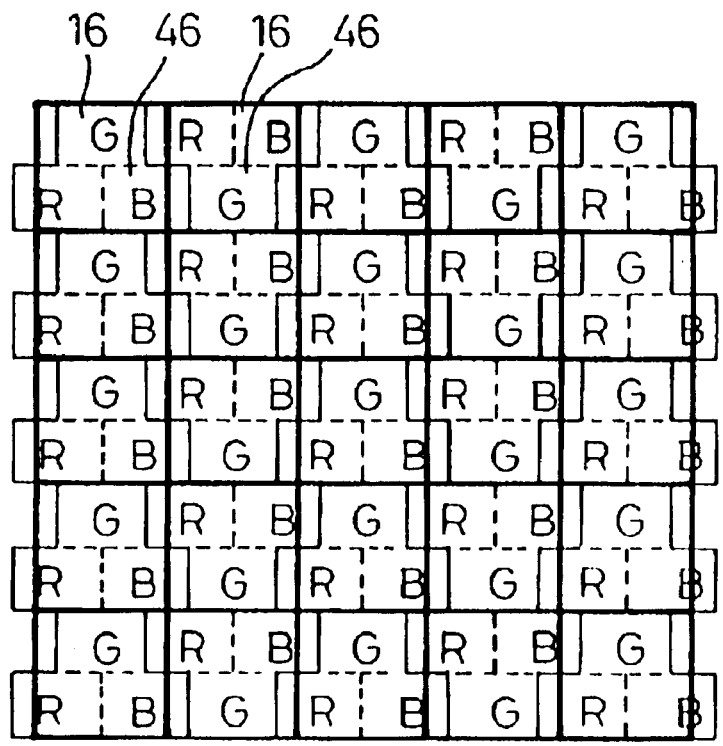
FIG. 68 is a view illustrating the combination of pixels in the delta arrangement shown in FIG. 37 with condenser elements in the square arrangement shown in FIG. 17.
Figure 69:
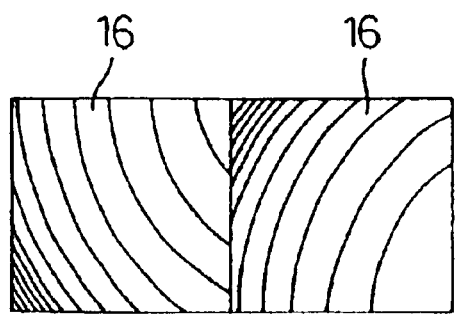
FIG. 69 is a view illustrating the feature of the condenser element used in FIG. 68.

FIG. 68 shows a combination of the pixels 46 in the delta arrangement shown in FIG. 37 and the condenser elements 16 in the square arrangement shown in FIG. 17. In the structure shown in FIG. 68, two kinds of condenser elements 16 are used, which are capable of collecting rays at different positions as shown in FIG. 69.

Figure 70:
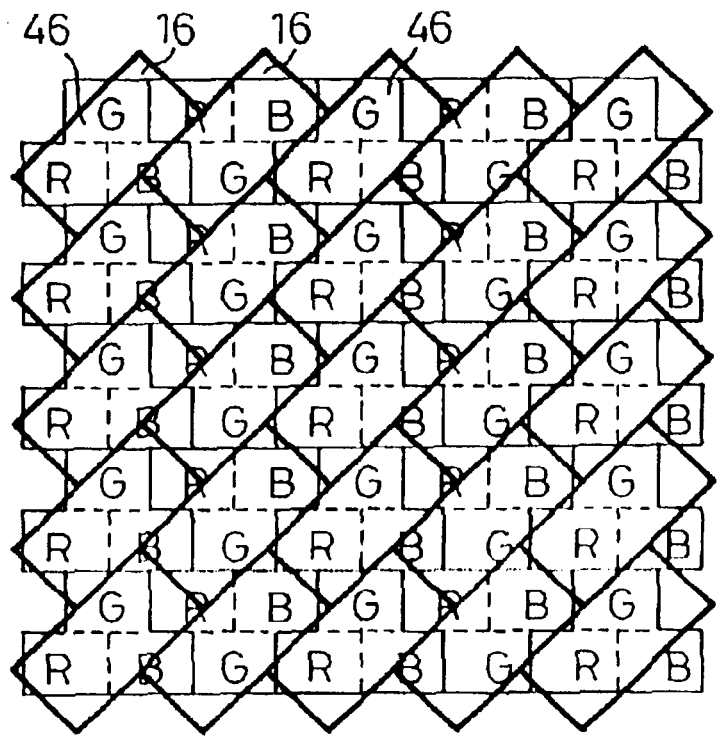
FIG. 70 is a view illustrating the combination of pixels in the delta arrangement shown in FIG. 37 with condenser elements in the square arrangement shown in FIG. 20.

FIG. 70 shows a combination of the pixels 46 in the delta arrangement shown in FIG. 37 and the condenser elements 16 in the square arrangement shown in FIG. 20. In the structure shown in FIG. 70, two kinds of condenser elements 16 are used, which are capable of collecting rays at different positions as shown in FIG. 71.

FIG. 72 shows a combination of the pixels 46 in the delta arrangement shown in FIG. 37 and the condenser elements 16 in the square arrangement shown in FIG. 23. In the structure shown in FIG. 72, two kinds of condenser elements 16 are used, which are capable of collecting rays at different positions as shown in FIG. 73. Also in these embodiments, it is possible to obtain a display suitable for a computer by projecting an image of the tetragonal arrangement of the condenser elements 16 on a screen.

Figures 74, 75:
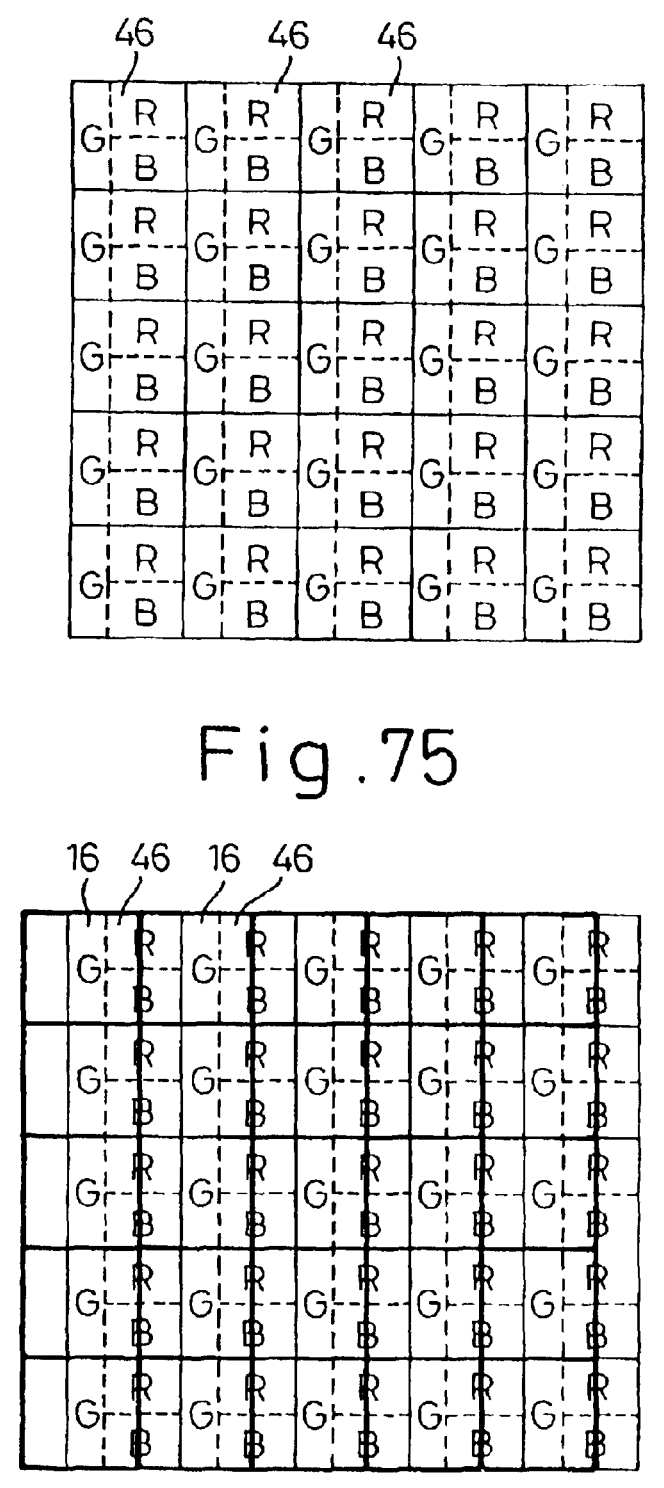

FIG. 74 shows a modification of the pixels 46 in the square arrangement. According to the conventional pixel structure, there is a tendency in that the display of green becomes brighter due to characteristics of the spectra-diffraction efficiency of the diffraction grating 14 relative to wavelength, the characteristics of the optical arrangement or an influence caused by unnecessary rays of a short or a long wavelength. To solve such a problem, the green color dot G is of an elongate shape, and the red and blue color dots have a small ratio of a lateral length to a vertical length so that the collected beam easily passes therethrough.

Figure 76:
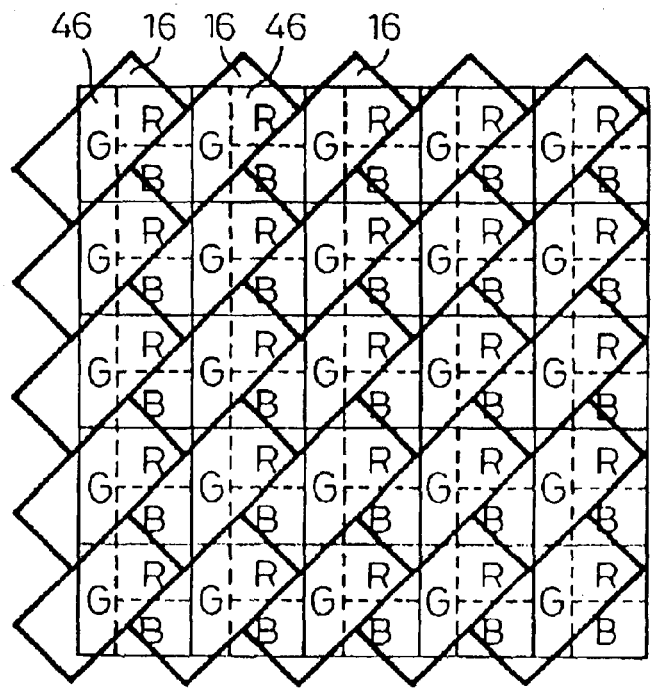
FIG. 76 is a view illustrating the combination of pixels in the square arrangement shown in FIG. 74 with the condenser elements shown in FIG. 20.

FIGS. 75, 76 and 77 show combinations of these pixels 46 with the condenser elements 16 shown in FIGS. 17, 20 and 23, respectively. By these methods, the display of red and blue is brighter so that the balance between red, green and blue becomes better. Since the color dots are not adjacent to each other in the spectral directions of red, green and blue, the influence of unnecessary short and long wavelength rays becomes a minimum to improve the color purity.

In the pixel 46 of FIGS. 68 and 69, the ratio of the horizontal length to the vertical length is preferably 6:2 in the green color dot G; 3:4 in the red color dot R; and 3:4 in the blue color dot B. Or, contrarily, the ratio of the horizontal length to the vertical length may be 2:6 in the green color dot G; 4:3 in the red color dot R; and 4:3 in the blue color dot B.

Separation and Mixing of Polarized Light

An embodiment wherein a polarizing device is used will be described below with reference to FIGS. 78 to 110.

Figure 78:
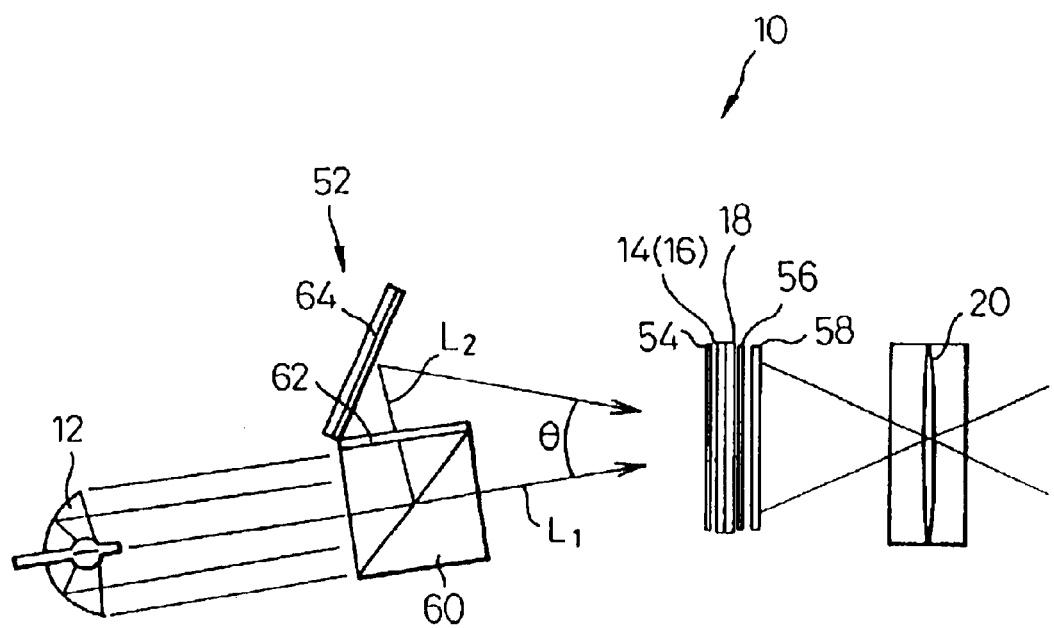
FIG. 78 is a view of a display device according to the third embodiment of the present invention, including a polarizing device.

A display device 10 shown in FIG. 78 comprises a light source 12, a polarizing device 52, a polarizer 54, a diffraction grating 14 including condenser elements 16, a liquid crystal panel 18, an analyzer 56, a field lens 58 and a projector lens 20. The field lens 58 may be provided in the preceding embodiments.

The polarizing device 52 includes a polarized beam splitter 60 for separating a light coming from the light source 12 into first and second polarized rays $L_1$ and $L_2$. In this case, the first polarized ray $L_1$ passes straight through the polarized beam splitter 60, while the second polarized ray $L_2$ is reflected by the polarized beam splitter 60. The polarizing device 52 further includes a ½ wavelength plate 62 and a mirror 64. When the second polarized ray $L_2$ passes through the ½ wavelength plate 62, a vibrating plane of the second polarized ray $L_2$ becomes generally the same as that of the first polarized ray $L_1$. The second polarized ray $L_2$ is reflected by the mirror 64. Thus, the first and second polarized rays $L_1$ and $L_2$ travel to the polarizer 54 while making an angle θ between them. Since the first and second polarized rays $L_1$ and $L_2$ are linearly polarized rays, the polarizer 54 may be omitted. The polarizer 54 is provided for shaping the first and second polarized rays $L_1$ and $L_2$.

The basic operation of the diffraction grating 14 including the condenser elements 16 is to carry out the color separation by the diffraction and to allow the rays to be condensed at the pixels 46 of the liquid crystal panel 18, a previously described. The analyzer 58 is the same as the analyzer 40 shown in FIG. 3.

Figure 79:
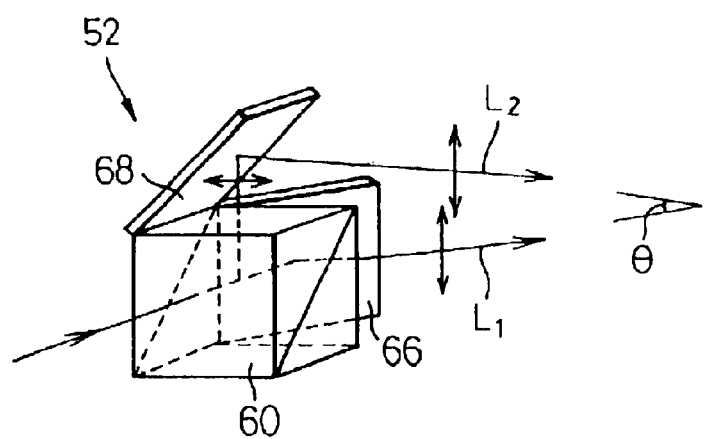
FIG. 79 is a view of an example of the polarizing device in FIG. 78.

FIG. 79 shows a modification of the polarizing device 52. This polarizing device 52 comprises a polarized beam splitter 60 and reflector mirrors 66 and 68. A light coming from the light source 12 which is a randomly polarized ray is separated into first and second polarized rays $L_1$ and $L_2$ by the polarized beam splitter 60, which are bent by the reflector mirrors 66 and 68 in the direction normal to a plane defined by an incident ray, a transmitted ray and a reflected ray, so that the vibrating planes of rays $L_1$ and $L_2$ are the same and angle θ is formed between them. The angle θ is adjustable by the mirror angle (this is also true in FIG. 78).

This polarizing device 52 does not use the ½ wavelength plate 62 shown in FIG. 78. The effect of the wavelength plate generally relies on wavelength, wherein at a certain wavelength, it is capable of converting the orientation of a linear polarized ray but forms an oval polarized ray at other wavelengths, causing a loss. Since no wavelength plate is used in the polarizing device 52, there is no loss due to the polarization direction and the wavelength to improve the light utilization efficiency. Also, this polarizing device 52 has features in that light paths of the first and second polarized rays $L_1$ and $L_2$ are identical to each other and an aberration due to optical elements is hardly generated. The angle θ is decided by a size of the pixels 46, a distance between the condenser elements 16 and the liquid crystal panel 18 and the arrangement of the pixels 46.

Figure 80:
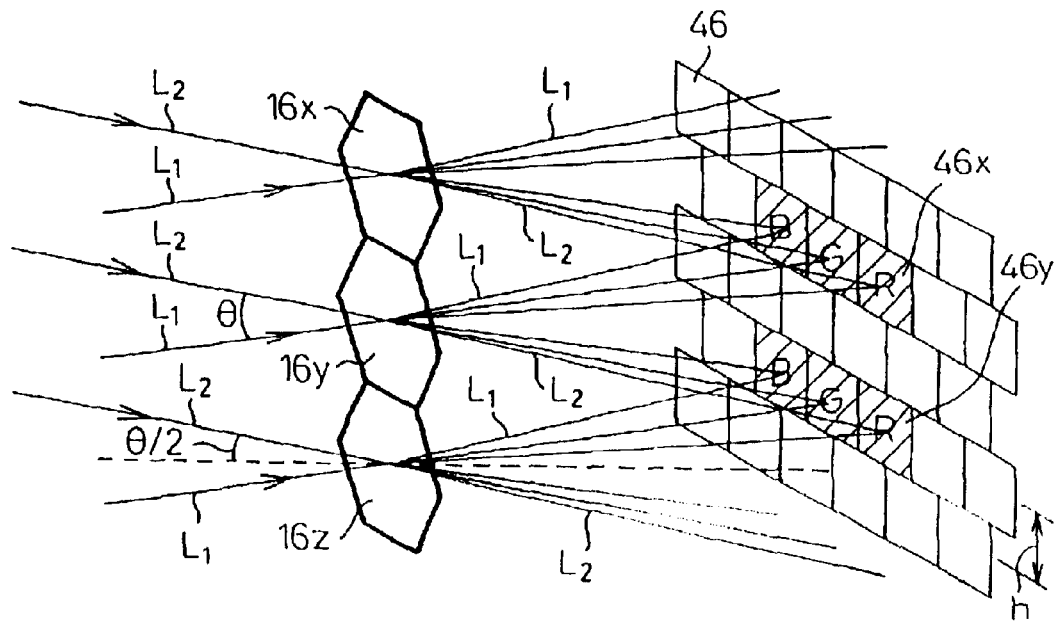
FIG. 80 is a view illustrating that rays passing through the polarizing device in FIG. 78 are incident to the pixels via the condenser elements.
Figure 81:
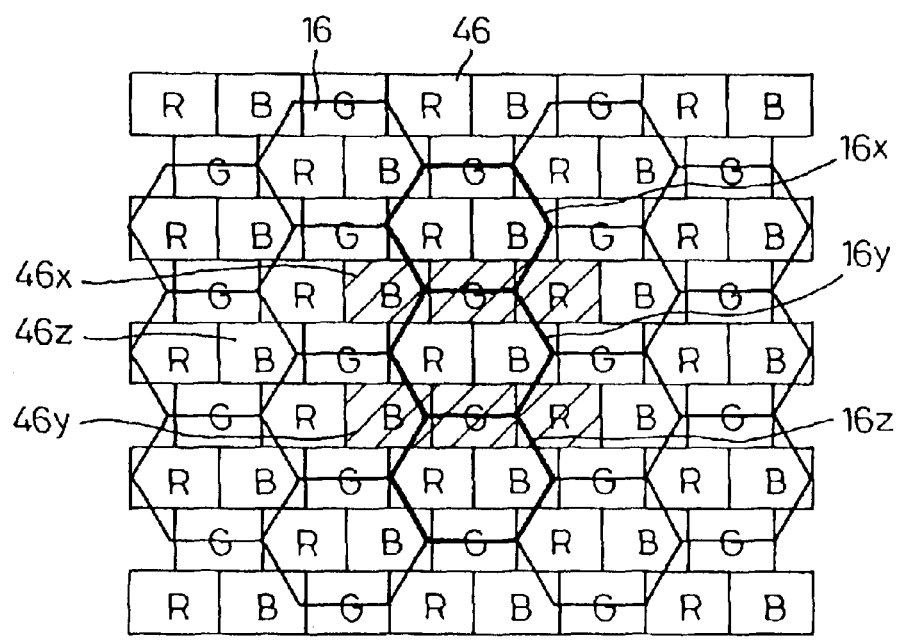
FIG. 81 is a view of the arrangement of pixels used with the structure shown in FIG. 80.

FIGS. 80 and 81 show an arrangement similar to that comprising the combination of the pixels 46 in the delta arrangement and the condenser elements 16 in the delta arrangement shown in FIG. 43. In FIG. 43, a center of the condenser element 16 has been located on the color dot G. There is no such a relationship in this embodiment.

In FIG. 81, a vertical row of condenser elements 16 are represented by 16x, 16y and 16z, and two groups of color dots B, G and R (indicated by hatching) by pixels 46x, 46y and 46z. Another pixel 46z is interposed between two pixels 46x and 46y. In this embodiment, the pixels 46x and 46y in every two rows are noted. Also in FIG. 80, similar condenser elements 16x, 16y and 16z and two groups of pixels 46x and 46y are shown.

As shown in FIG. 80, the first and second polarized rays $L_1$ and $L_2$ making the angle θ pass through the condenser element 16 and are made incident to the pixels 46x and 46y. More specifically, the first polarized ray $L_1$ passing through the upper condenser element 16x is made incident to a separate pixel disposed above the pixel 46x, and the second polarized ray $L_2$ passing through the upper condenser element 16x is made incident to the pixel 46x. The first polarized ray $L_1$ passing through the middle condenser element 16y is made incident to the pixel 46x, and the second polarized ray $L_2$ passing through the middle condenser element 16y is made incident to the pixel 46y. The first polarized ray $L_2$, passing through the lower condenser element 16z is made incident to the pixel 46y, and the second polarized ray $L_2$ passing through the lower condenser element 16z is made incident to a further pixel disposed beneath the pixel 46y.

A distance between the upper condenser element 16x and the pixel 46x is equal to that between the middle condenser element 16y and the pixel 46y. Also, an incident angle of the second polarized ray $L_2$ made incident from the upper condenser element 16x to the pixel 46x is equal to an incident angle of the first polarized ray $L_1$ made incident from the middle condenser element 16y to the pixel 46x.

As shown in FIG. 81, there are separate condenser elements adjacent to the condenser elements 16x, 16y and 16z located at ½ phase difference. These condenser elements correspondingly act on the pixel 46z disposed between the pixels 46x and 46y and pixels disposed above and beneath the pixels 46x and 46y.

According to this structure, in the display device using polarized rays, the light is not reduced to one half of the light of the light source 12 by the polarizer, as in the prior art. That is, the light from the light source is all utilized as first and second polarized rays $L_1$ and $L_2$. The first and second polarized rays $L_1$ and $L_2$ are made incident to the respective pixels. Even though there might be a difference in light intensity between the first and second polarized rays due to the characteristic of the polarized beam splitter or the reflector mirror, no unevenness in brightness occurs because the brightness of the displayed image is a sum of the first and second polarized rays. Thereby, the polarization light loss becomes small to realize a brighter display, compared with the prior art display.

In FIG. 80, assuming that a pixel pitch (dot pitch) is "h", a distance between centers of two groups of pixels to which rays are made incident from one condenser element is "d", a distance between the liquid crystal panel 18 and the condenser elements 16 is "t", and a refractive index of a medium which exists between the liquid crystal panel 18 and the condenser elements 16 is "n", θ is represented by the following equations (wherein θ' is an angle in the medium):

$$\sin(\theta/2) = n \times \sin(\theta'/2) \tag{1}$$

$$\tan(\theta'/2) = d/2/t \tag{2}$$

$$d = 2h \tag{3}$$

By deleting θ' from these equations, θ satisfies the following relationship.

$$\sin(\theta/2) = \sqrt{(n^2 d^{2/(4t^2+d^2)})} \tag{4}$$

$$\sin(\theta/2) = \sqrt{(n^{2h^{2/(t^2+h^2)}})} \tag{5}$$

For example, if the pixel pitch is 50 μm, the distance between the condenser elements and the panel is 1.1 mm, and the refractive index of the medium is 1.5, θ equals to 7.8°.

Figure 82:
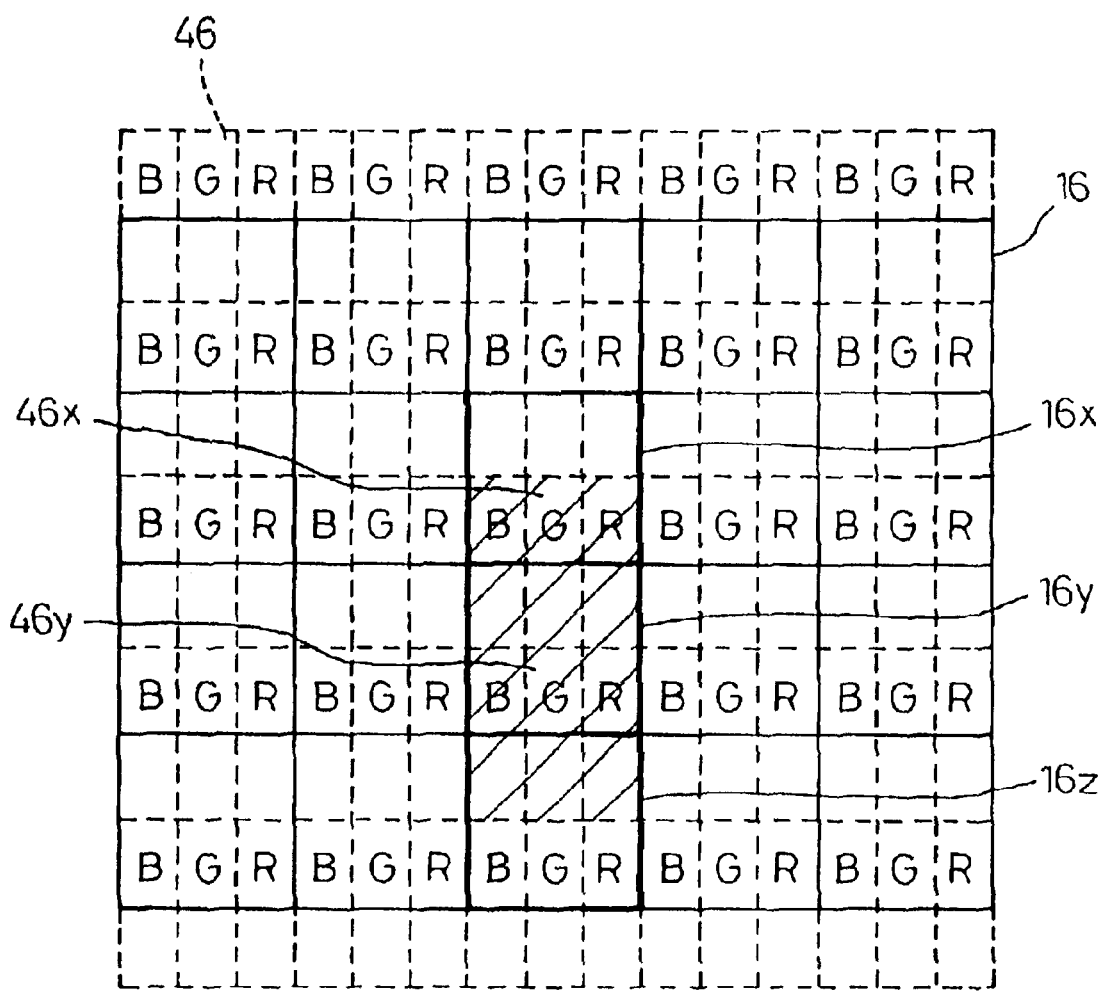
FIG. 82 is a view of an example of the pixel arrangement and that of condenser elements used in the device shown in FIG. 78.
Figure 83:
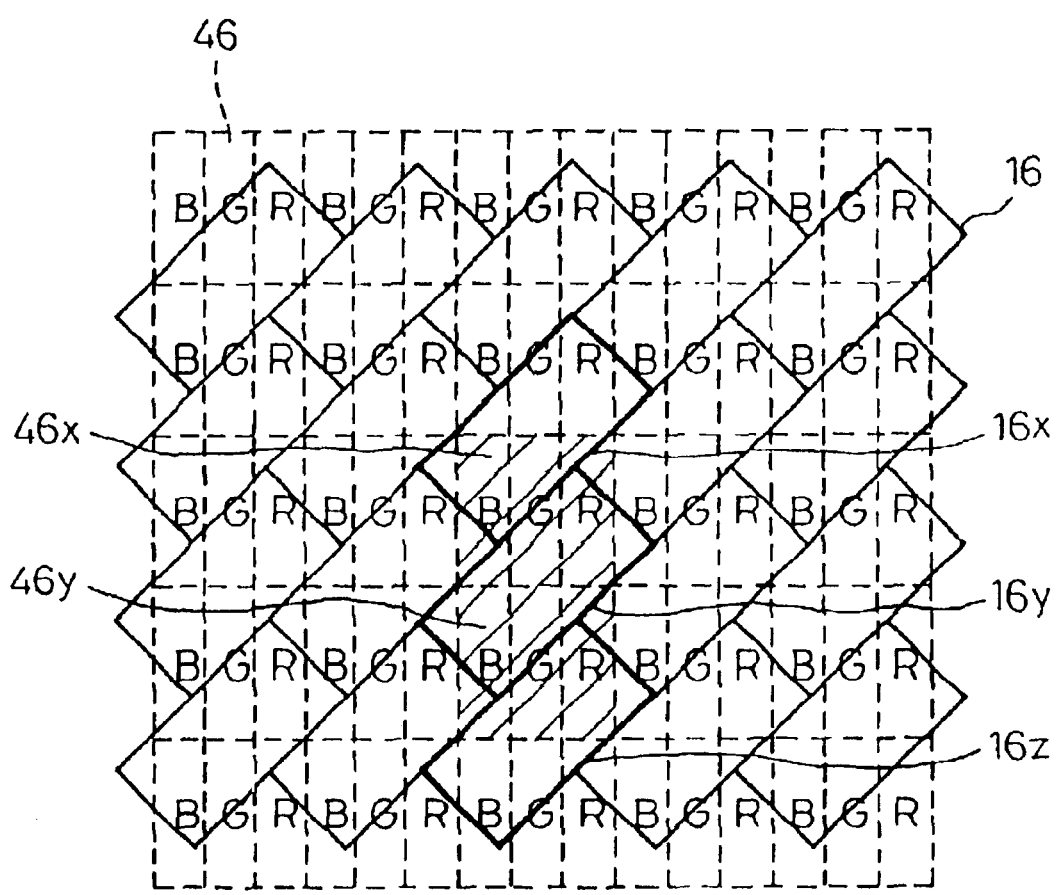
FIG. 83 is a view of another example of the pixel arrangement and that of condenser elements used in the device shown in FIG. 78.
Figure 84:
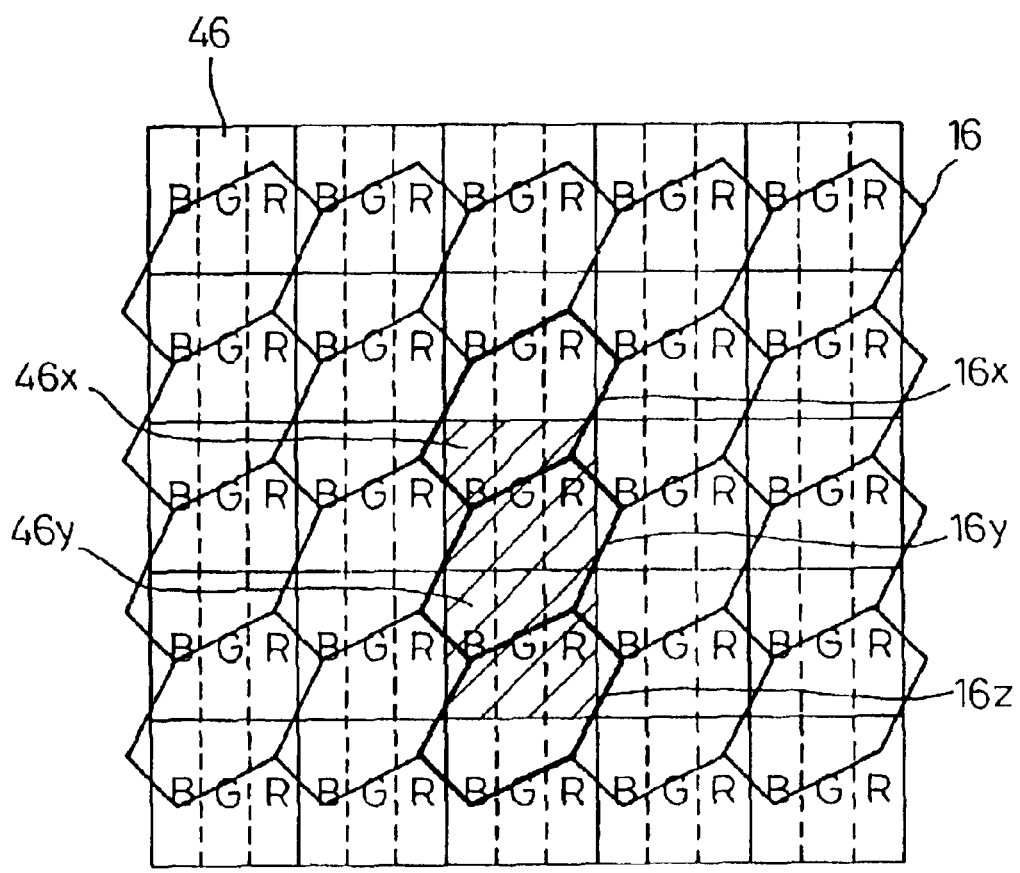
FIG. 84 is a view of a further example of the pixel arrangement and that of condenser elements used in the device shown in FIG. 78.

FIGS. 82, 83 and 84 show embodiments wherein the pixels are arranged in the square arrangement. In FIG. 82, the condenser elements 16 are of a tetragonal shape (square in the drawing) having parallel sides in the horizontal direction and the vertical direction. A center of the condenser element 16 is at a position between the adjacent pixels 46x and 46y at a position equally distant from centers of the pixels 46x and 46y. The upper condenser element 16x outputs a first polarized ray L₁ to the upper pixel 46x and a second polarized ray L₂ to the pixel 46y. The lower condenser element 16z outputs a first polarized ray L₁ to the pixel 46y and a second polarized ray L₂ to a pixel disposed beneath the pixel 46y. Accordingly, in this case, the rays are output to the successive pixels, not to every alternate pixels as in the embodiments shown in FIGS. 80 and 81. Since two light beams are combined to each other, each of the pixels becomes brighter.

FIG. 83 is an embodiment wherein the condenser elements 16 are of a tetragonal shape (rectangle in the drawing) having parallel sides in the direction different from the horizontal and vertical directions. A center of the condenser element 16y is at a position between the adjacent pixels 46x and 46y and equally distant from centers of the pixels 46x and 46y. The condenser element 16y outputs the first and second polarized rays L₁ and L₂ to the pixels 46x and 46y. The condenser element 16x outputs one of the first and second polarized rays L₁ and L₂ to the pixel 46x, and the condenser element 16z outputs the other of the first and second polarized rays L₁ and L₂ to the pixel 47y. Since two light beams are combined to each other, each of the pixels becomes brighter.

FIG. 84 is an embodiment wherein the condenser elements 16 are of a hexagonal shape wherein all interior angles are obtuse and the opposed ones are equal to each other. A center of the condenser element 16 is at a position between the adjacent pixels 46 and equally distant from centers or the pixels. The condenser element 16y outputs the first and second polarized rays L₁ and L₂ to the pixels 46x and 46y. The condenser element 16x outputs the first and second polarized rays L₁, L₂ to the one pixel 46x, while the condenser element 16z outputs the first and second polarized rays L₁ and L₂ to the other pixel 47y. Since two light beams are combined to each other, each of the pixels becomes brighter.

An angle θ between the first and second polarized rays L₁, L₂ in this arrangement is calculated as follows since two groups of pixels are adjacent:

Assuming that a pixel pitch is h; a distance between centers of two groups of pixels 46 upon which rays are incident from one condenser element 16 is d; a distance between the liquid crystal panel 18 and the condenser element 16 is t; and a refractive index of a medium (diffraction grating) between the liquid crystal panel 18 and the condenser element 16 is n, θ is determined by the following equations.

$$\sin(\theta/2) = n \times \sin(\theta'/2) \tag{1}$$

$$\tan(\theta/2) = d/2/t \tag{2}$$

$$d = h \tag{6}$$

If θ' is deleted from these equations, θ satisfies the following relationship.

$$\sin(\theta/2) = \sqrt{(n^2 d^{2/(4t^2+d^2)})} \tag{4}$$

$$\sin(\theta/2) = \sqrt{(n^{2h^{2/(4t^2+h^2)}})} \tag{7}$$

For example, assuming that the pixel pitch is 50 μm, the distance between panels is 1.1 mm and the refractive index of the medium is 1.5, θ becomes 3.9°.

Figure 85:
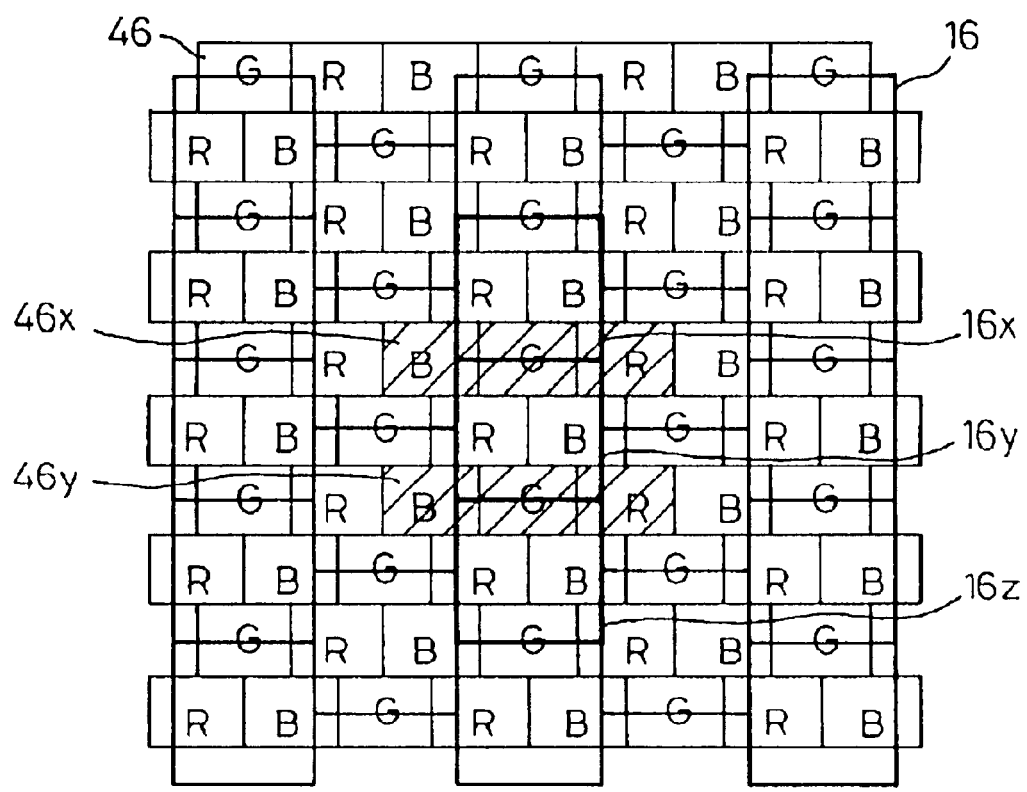
FIG. 85 is a view of a further example of the pixel arrangement and that of condenser elements used in the device shown in FIG. 78.
Figure 86:
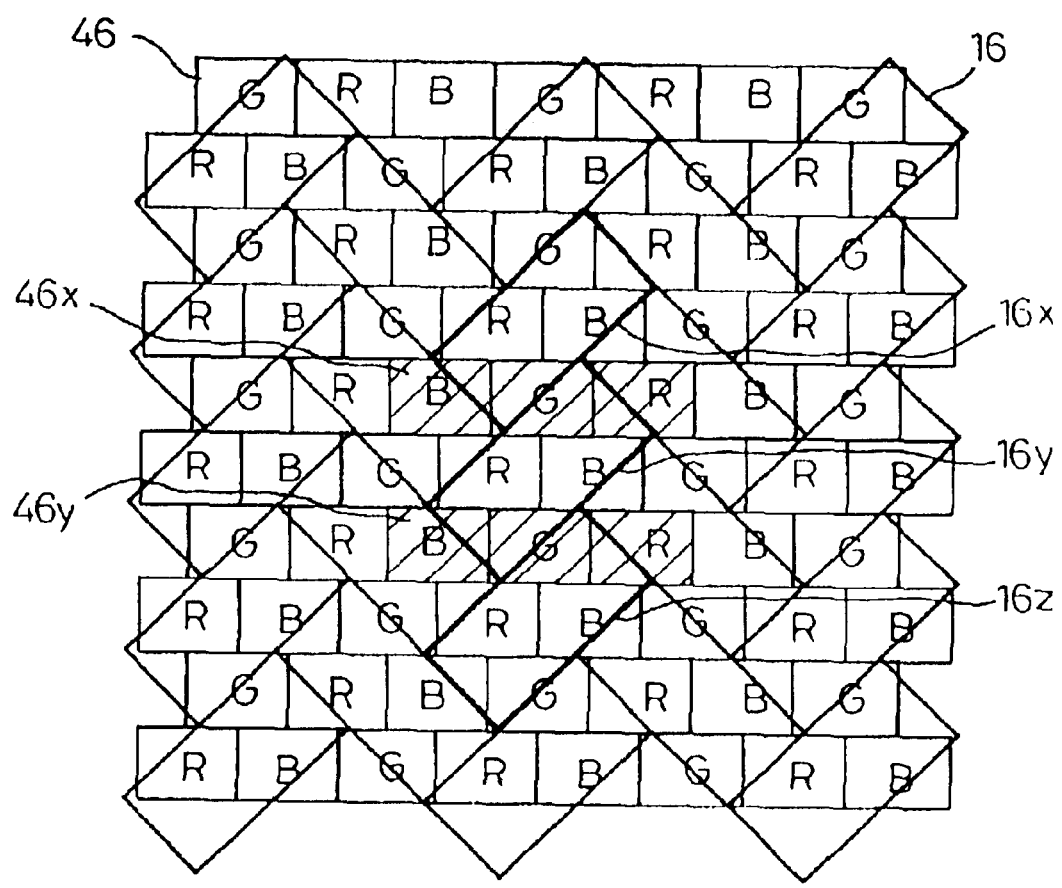
FIG. 86 is a view of a still further example of the pixel arrangement and that of condenser elements used in the device shown in FIG. 78.

FIGS. 85 and 86 show the pixels in the delta arrangement in the liquid crystal panel, similar to FIG. 81. FIG. 81 shows an embodiment of the condenser elements 16 of a hexagonal shape wherein all of interior angles are obtuse and the opposite angles are equal to each other.

FIG. 85 shows an embodiment of the condenser elements 16 of a tetragonal shape (square in the drawing) having parallel sides extending in the horizontal and vertical directions.

FIG. 86 shows another embodiment of the condenser element 16 of a tetragonal shape (rectangle in the drawing) having parallel sides extending in directions different from the horizontal and vertical directions.

While the condenser element 16 outputs the first and second polarized rays L₁ and L₂ to pixels 46x and 46y, respectively, in FIGS. 81, 85 and 86, the pixels 46x and 46y corresponding to one condenser element 16y are arranged with one group (row) of pixels being interposed therebetween. A center of the condenser element 16 is located between these two groups of pixels at a position equally distant from the centers of pixels. Since two light beams are combined to each other, each of the pixels becomes brighter.

In FIGS. 81 to 86, the diffraction grating has a function for separating the white light with respect to the wavelength. Since the wavelength separation is carried out in a plane including an incident ray axis and a diffracted ray axis, rays from the light source 12 are obliquely incident in a righthand direction (due to R, B) in FIGS. 81 to 86, wherein two rays are made incident to the diffraction grating at angles of ±θ/2 relative to the horizontal axis.

FIGS. 87 to 91 show modifications of the pixels in the square arrangement in the liquid crystal panel wherein the color dots R, G and B in the pixel in square arrangement are parallelly shifted.

Figure 87:
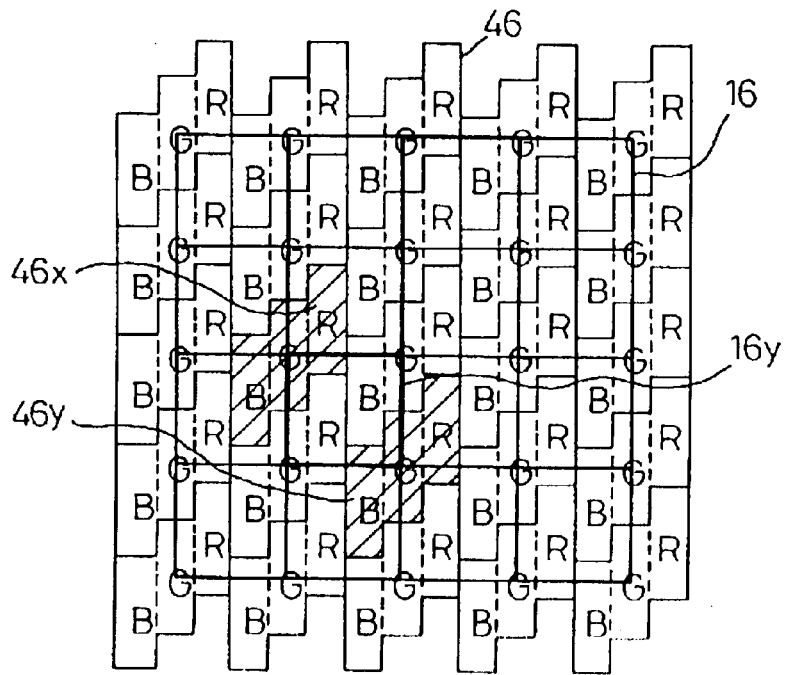
FIG. 87 is a view of another example of the pixel arrangement and that of condenser elements used in the device shown in FIG. 78.
Figure 88:
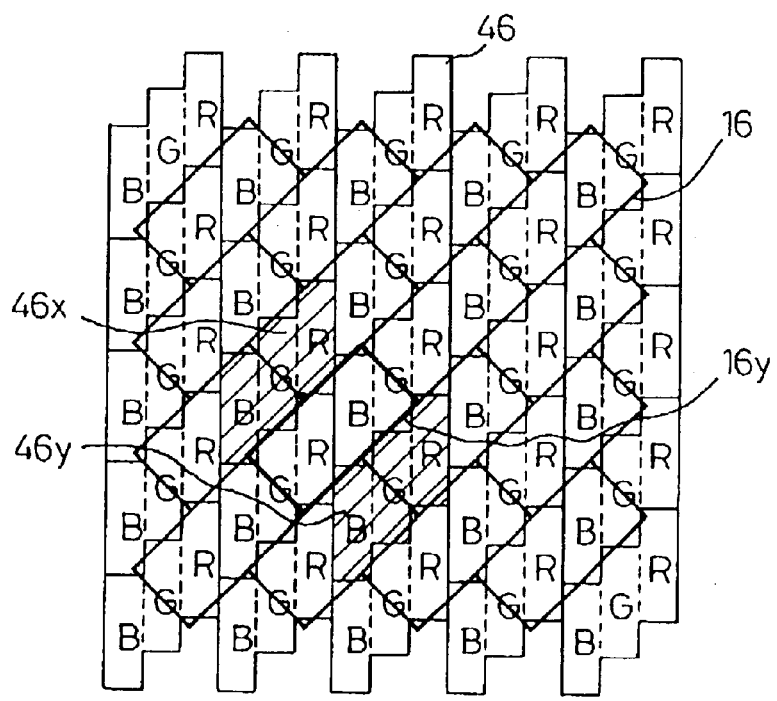
FIG. 88 is a view of a further example of the pixel arrangement and that of condenser elements used in the device shown in FIG. 78.
Figure 89:
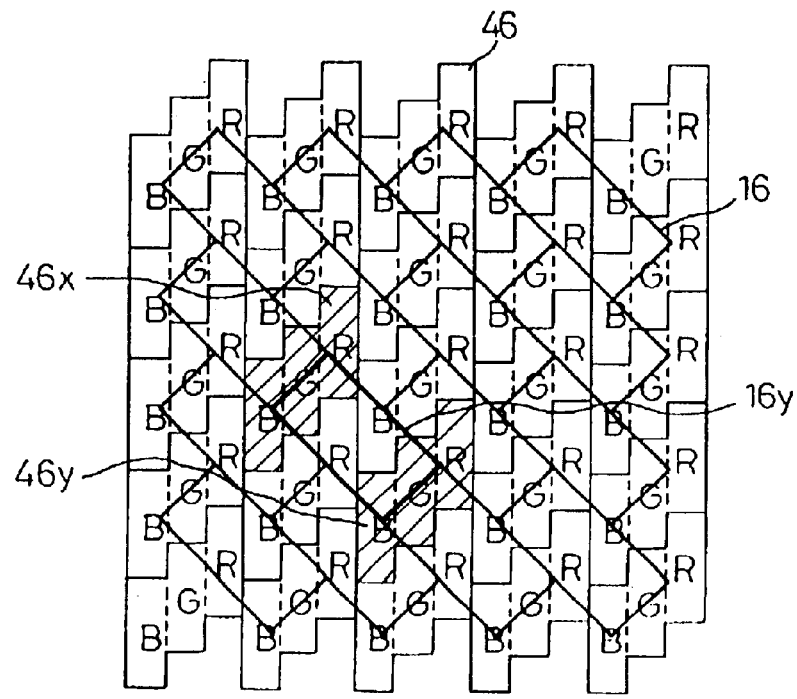
FIG. 89 is a view of a further more example of the pixel arrangement and that of condenser elements used in the device shown in FIG. 78.

FIG. 87 is an embodiment wherein the condenser elements 16 are of a tetragonal shape (square in the drawing) having parallel sides extending in the horizontal and vertical directions. FIGS. 88 and 89 are embodiments wherein the unit diffraction grating is of a tetragonal shape (rectangle in the drawing) having parallel sides extending in directions different from the horizontal and vertical directions. In FIG. 88, the longer axis direction of the tetragonal shape coincides with the orientation or R, G and B. In FIG. 89, the shorter axis direction of the tetragonal shape coincides with the orientation of R, G and B.

Figure 90:
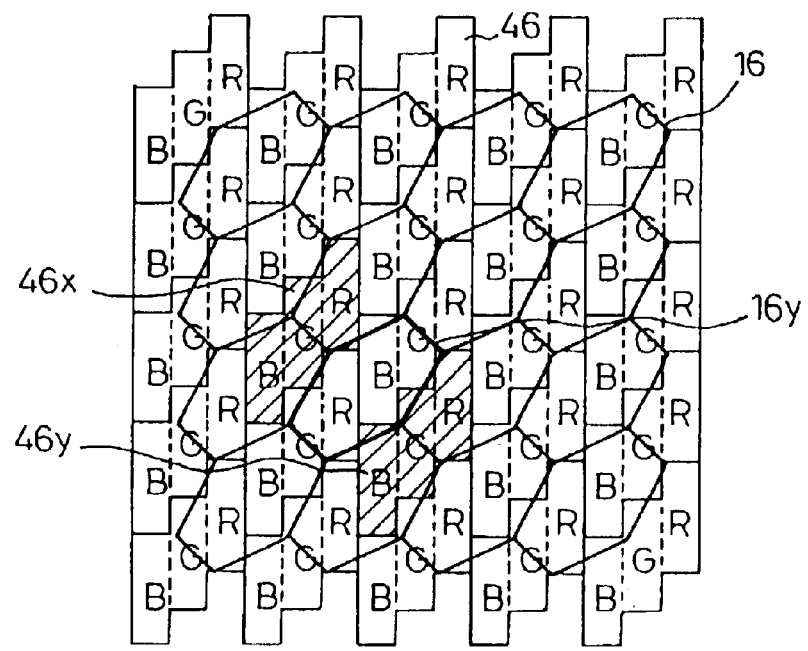
FIG. 90 is a view of a still further example of the pixel arrangement and that of condenser elements used in the device shown in FIG. 78.
Figure 91:
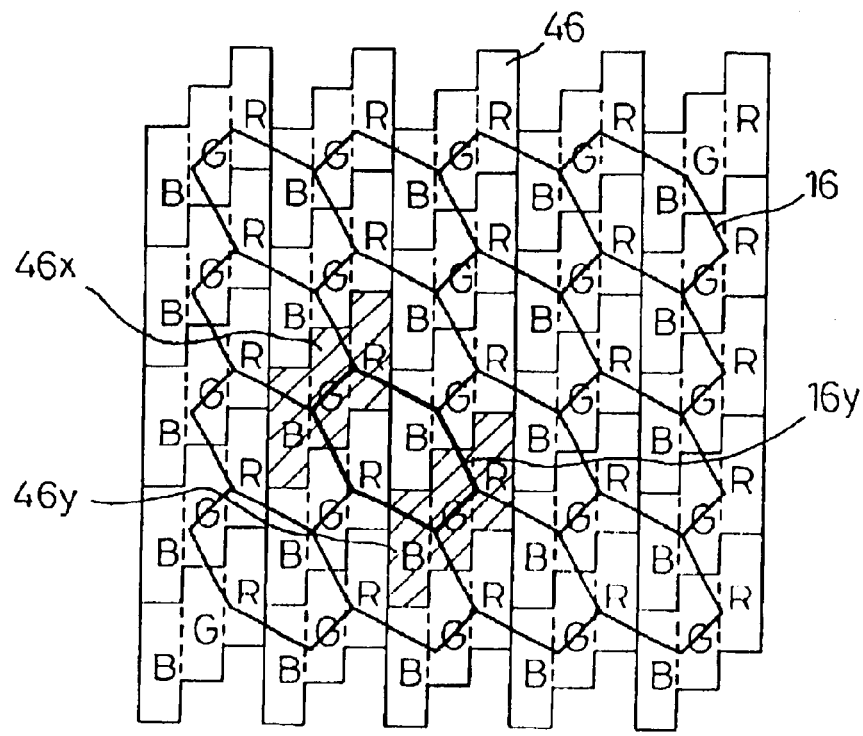
FIG. 91 is a view of another example of the pixel arrangement and that of condenser elements used in the device shown in FIG. 78.

FIGS. 90 and 91 are embodiments wherein the condenser elements 16 are of a hexagonal shape wherein all interior angles are obtuse and the opposed ones are equal to each other. In FIG. 90, the longer axis direction of the hexagonal shape coincides with the orientation of R, G and B. In FIG. 91, the shorter axis direction of the hexagonal shape coincides with the orientation of R, G and B.

While the condenser element 16y outputs the first and second polarized rays $L_1$ and $L_2$ to pixels 46x and 46y, respectively, in FIGS. 77 to 91, the pixels 46x and 46y corresponding to one condenser element 16y are arranged with one group (oblique row) of pixels being interposed therebetween. A center of the condenser element is located between these two groups of pixels 46x, 46y at a position equally distant from the centers of pixels. Since two light beams are combined with each other, each of the RGB pixels becomes brighter.

In FIGS. 87 to 91, rays from the light source are made obliquely incident in an upper righthand direction (due to R, B) in FIGS. 81 to 86, wherein two rays are made incident to the diffraction grating at angles of $\pm\theta/2$ relative to the horizontal axis.

FIGS. 92 to 96 show the pixels in the modified tetragonal arrangement in the liquid crystal panel, wherein a conventional elongated opening is corrected while maintaining the periodicity centers of the pixels constant.

Figure 92:
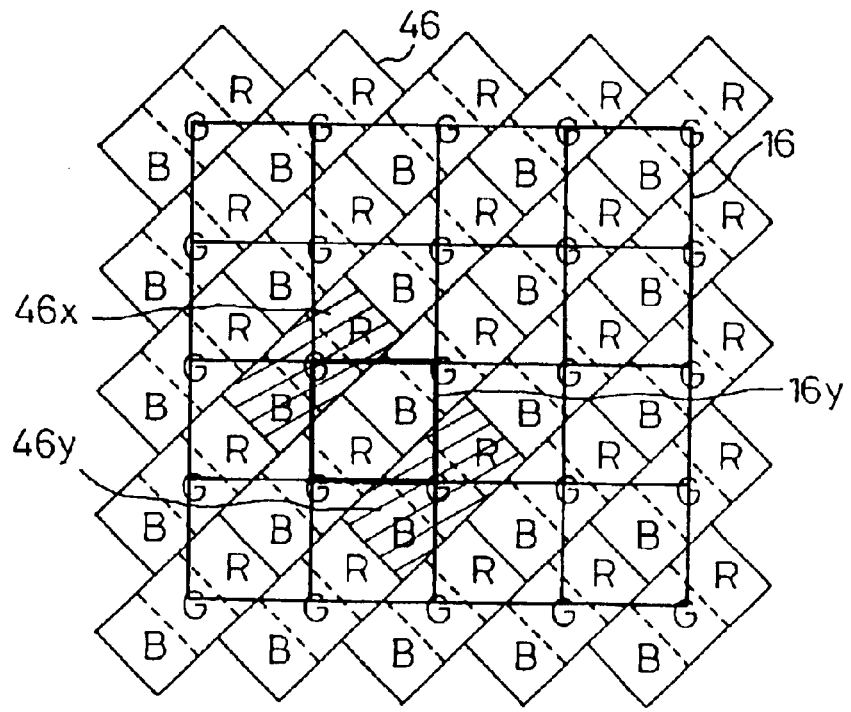
FIG. 92 is a view of a further example of the pixel arrangement and that of condenser elements used in the device shown in FIG. 78.
Figure 93:
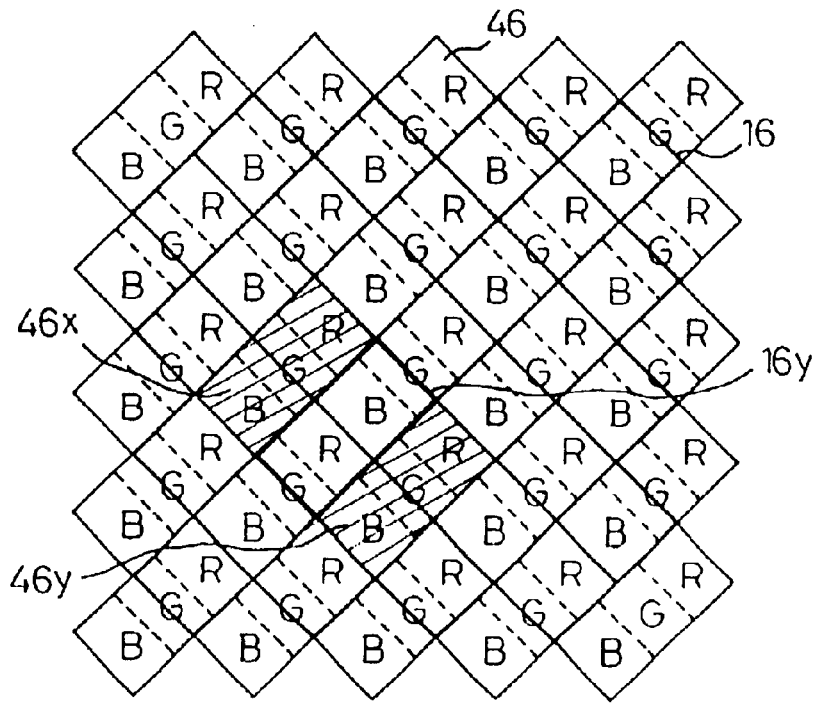
FIG. 93 is a view of a further more example of the pixel arrangement and that of condenser elements used in the device shown in FIG. 78.
Figure 94:
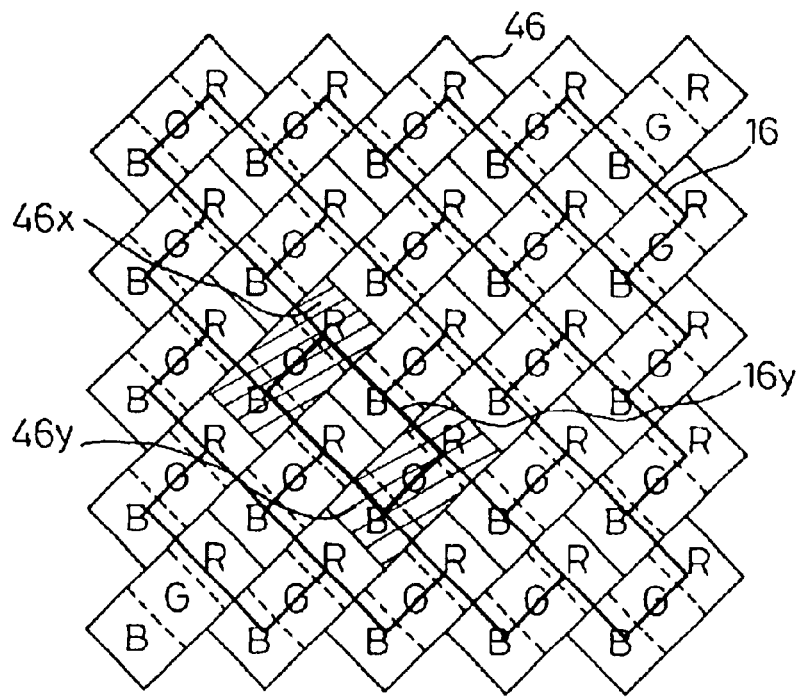
FIG. 94 is a view of a still further example of the pixel arrangement and that of condenser elements used in the device shown in FIG. 78.

FIG. 92 shows an embodiment of the condenser elements 16 of a tetragonal shape (square in the drawing) having parallel sides extending in the horizontal and vertical directions. FIGS. 93 and 94 show embodiments of the condenser elements 16 of a tetragonal shape (rectangle in the drawing) having parallel sides extending in directions different from the horizontal and vertical directions. In FIG. 93, a longer axis of the tetragon coincides with the orientation of R, G and B. In FIG. 94, a shorter axis of the tetragon coincides with the orientation of R, G and B.

Figure 95:
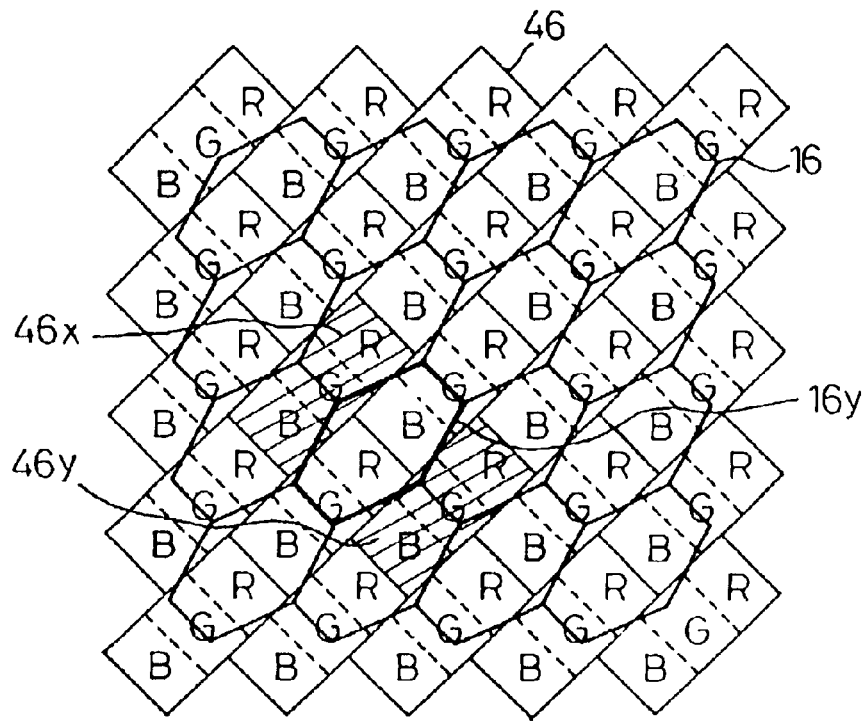
FIG. 95 is a view of another example of the pixel arrangement and that of condenser elements used in the device shown in FIG. 78.
Figure 96:
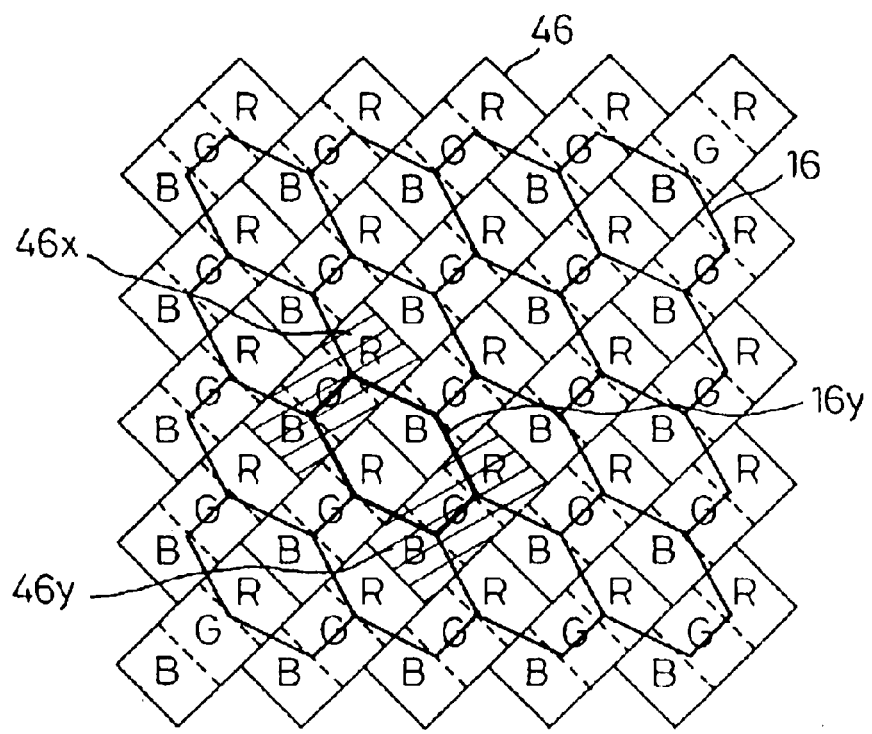
FIG. 96 is a view of a further example of the pixel arrangement and that of condenser elements used in the device shown in FIG. 78.

FIGS. 95 and 96 are embodiments wherein the condenser elements 16 are of a hexagonal shape wherein all interior angles are obtuse and the opposed ones are equal to each other. In FIG. 95, the longer axis direction of the hexagonal shape coincides with the orientation of R, G and B. In FIG. 91, the shorter axis direction of the hexagonal shape coincides with the orientation of R, G and B.

While the condenser element 16y outputs the first and second polarized rays $L_1$ and $L_2$ to pixels 46x and 46y, respectively, in FIGS. 92 to 96, the pixels 46x and 46y corresponding to one condenser element 16y are arranged with one group (oblique row) of pixels being interposed therebetween. A center of the condenser element is located between these two groups of pixels 46x and 46y at a position equally distant from the centers of pixels. Since two light beams are combined to each other, each of the RGB pixels becomes brighter.

In FIGS. 92 to 96, rays from the light source are made obliquely incident in an upper righthand direction (due to R and B), wherein two rays are incident upon the diffraction grating at angles of $\pm\theta/2$ relative to the axis thereof. An angle $\theta$ between two rays in the embodiments shown in FIGS. 87 to 96 is represented by the following equation if a distance is d between centers of the pixels 46x and 46y as previously described with reference to the embodiments shown in FIGS. 83 and 84:

$$\sin(\theta/2)=\sqrt{(n^2 d^{2/(4t^2+d^2)})} \qquad (4)$$

Figure 97:
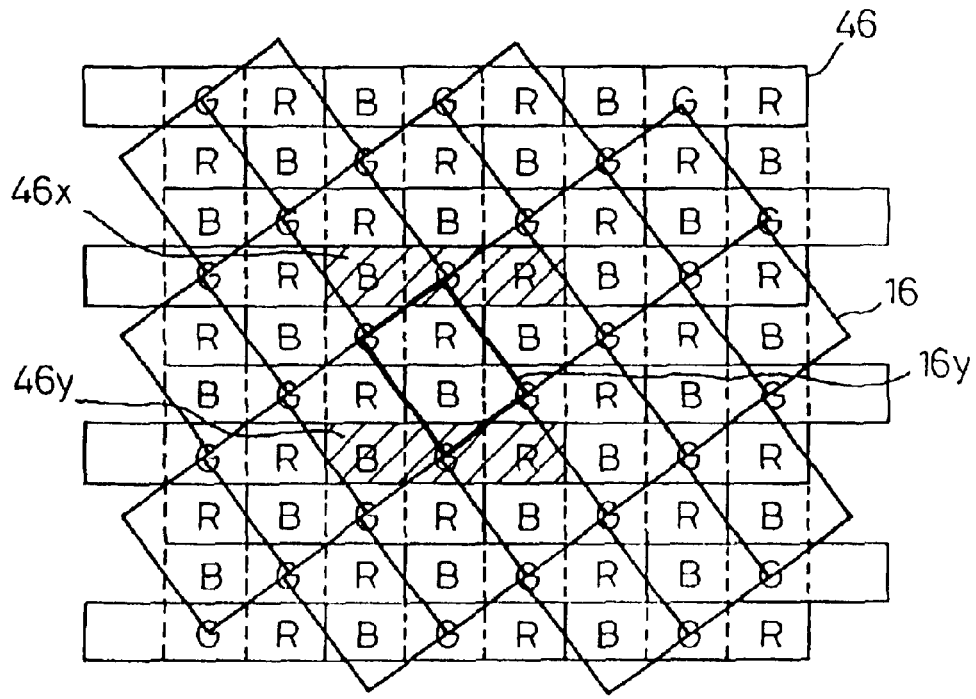
FIG. 97 is a view of a further more example of the pixel arrangement and that of condenser elements used in the device shown in FIG. 78.
Figure 98:
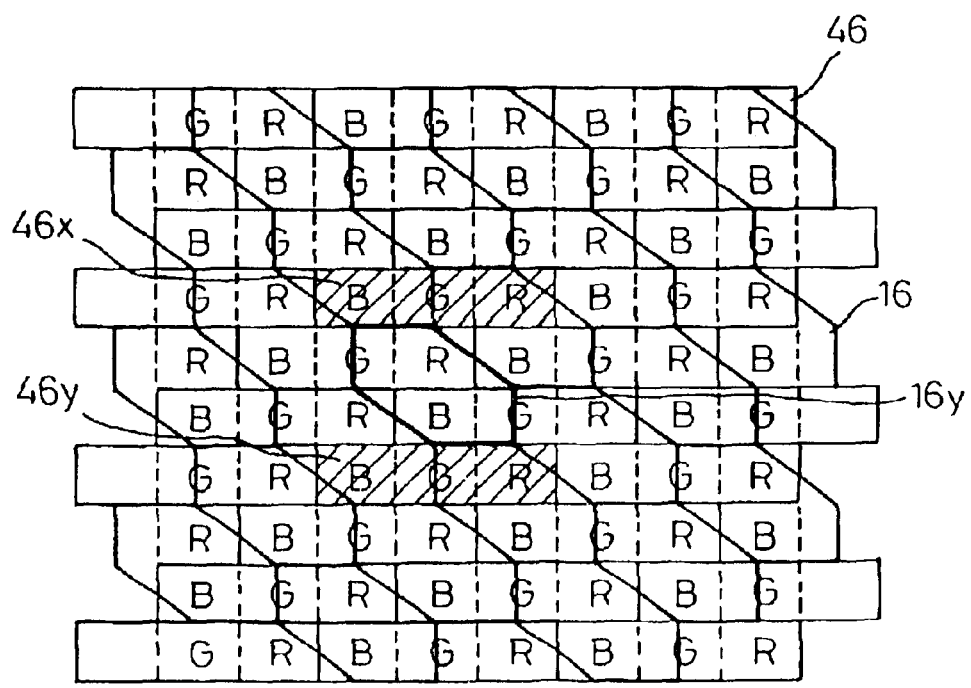
FIG. 98 is a view of a still further example of the pixel arrangement and that of condenser elements used in the device shown in FIG. 78.

FIGS. 97 and 98 shows pixels in the mosaic arrangement in the liquid crystal panel, wherein a m-th row and a (m+1)-th row are shifted by one dot (monochrome pixel) to each other. FIG. 97 shows a tetragonal shape (rectangle in the drawing) of the condenser element, having parallel sides extending in directions different from the horizontal and vertical directions. FIG. 98 shows an embodiment wherein the condenser element 16 is of a hexagonal shape wherein all interior angles are obtuse and the opposed ones are equal to each other.

While the condenser element 16y outputs the first and second polarized rays $L_1$ and $L_2$ to pixels 46x and 46y, respectively, in FIGS. 97 and 98, the pixels 46x and 46y corresponding to one condenser element 16y are arranged with one group (oblique row) of pixels being interposed therebetween. A center of the condenser element is located between these two groups of pixels 46x and 46y at a position equally distant from the centers of pixels. Since two light beams are combined with each other, each or the RGB pixels becomes brighter.

The angle $\theta$ in this case is determined by the following equations.

$$\sin(\theta/2)=n\times\sin(\theta'/2) \qquad (1)$$

$$\tan(\theta'/2)=d/2/t \qquad (2)$$

$$d=3h \qquad (8)$$

If $\theta'$ is deleted from these equations, $\theta$ satisfies the following relationship.

$$\sin(\theta/2)=\sqrt{(n^2 d^{2/(4t^2+d^2)})} \qquad (4)$$

or, $$\sin(\theta/2)=\sqrt{(9n^2 h^{2/(4t^2+9h^2)})} \qquad (7)$$

For example, assuming that the pixel pitch is 50 $\mu$m, the distance between panels is 1.1 mm and the refractive index of the medium is 1.5, $\theta$ becomes 11.7°.

FIGS. 99 to 103 show the pixels in the modified tetragonal arrangement in the liquid crystal panel, wherein a conventional elongated opening is corrected while maintaining a periodicity of centers of the pixels constant.

Figure 99:
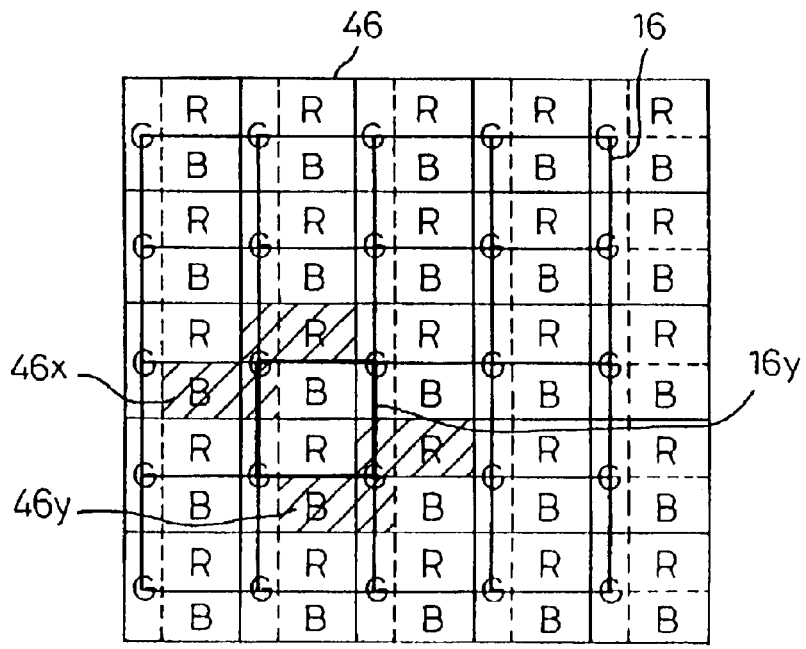
FIG. 99 is a view of another example of the pixel arrangement and that of condenser elements used in the device shown in FIG. 78.
Figure 100:
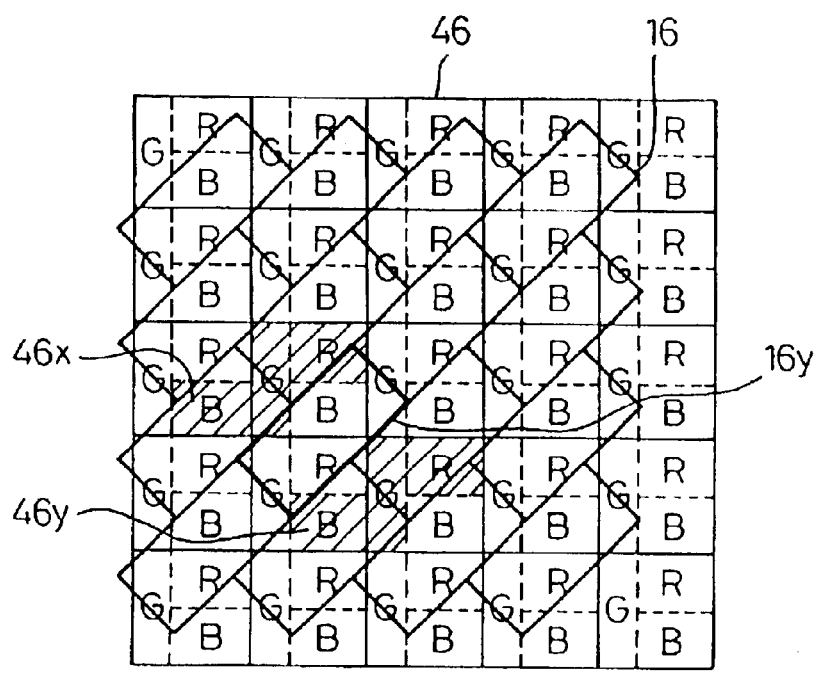
FIG. 100 is a view of a further example of the pixel arrangement and that of condenser elements used in the device shown in FIG. 78.
Figure 101:
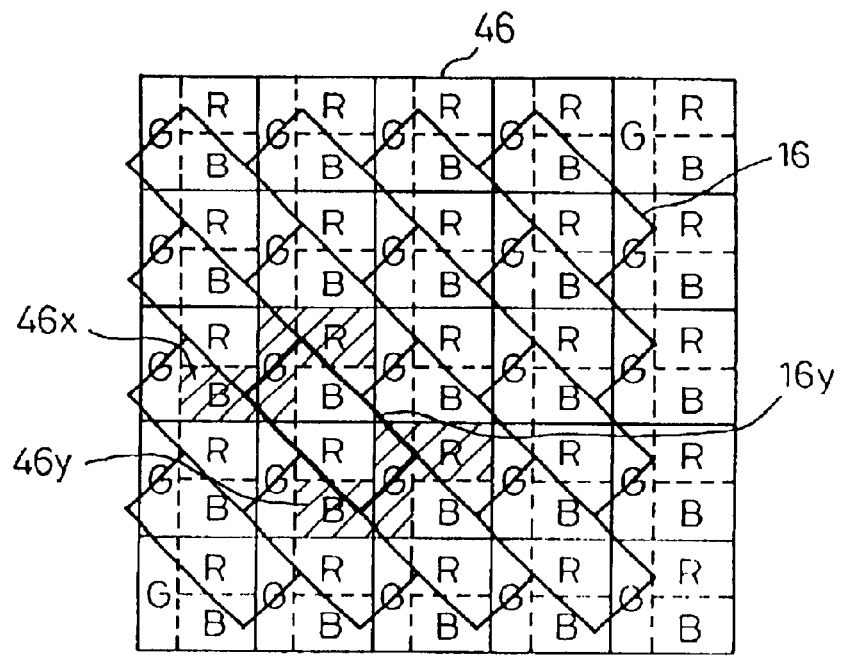
FIG. 101 is a view of a further more example of the pixel arrangement and that of condenser elements used in the device shown in FIG. 78.

FIG. 99 is an embodiment wherein the condenser elements 16 are of a tetragonal shape (square in the drawing) having parallel sides extending in the horizontal and vertical directions. FIGS. 100 and 101 are embodiments wherein the condenser element 16 is a tetragonal shape (rectangle in the drawing) having parallel sides extending in directions different from the horizontal and vertical directions. In FIG. 100, a longer axis of the tetragon coincides with the orientation of R, G and B. In FIG. 101, a shorter axis of the tetragon coincides with the orientation of R, G and B.

Figure 102:
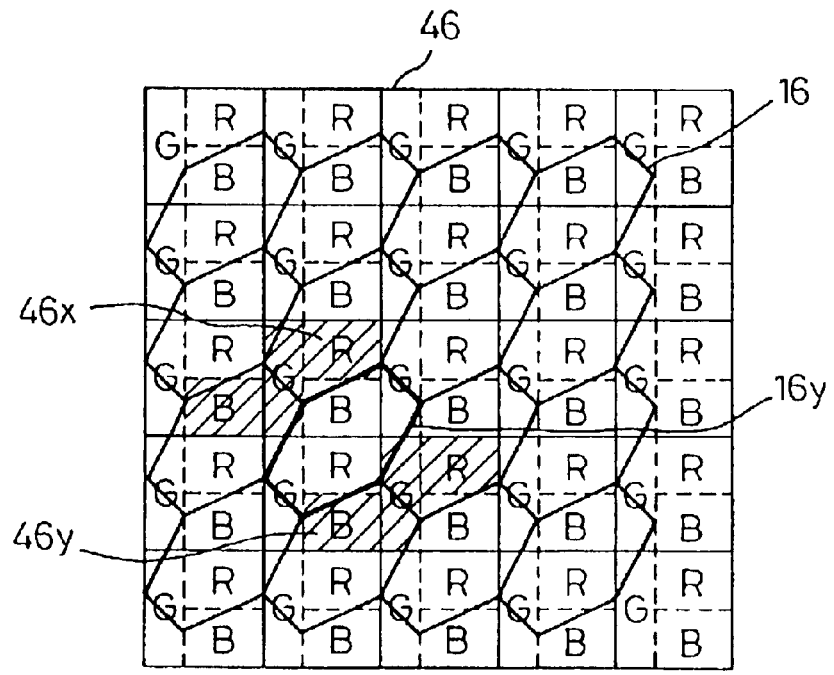
FIG. 102 is a view of a still further example of the pixel arrangement and that of condenser elements used in the device shown in FIG. 78.
Figure 103:
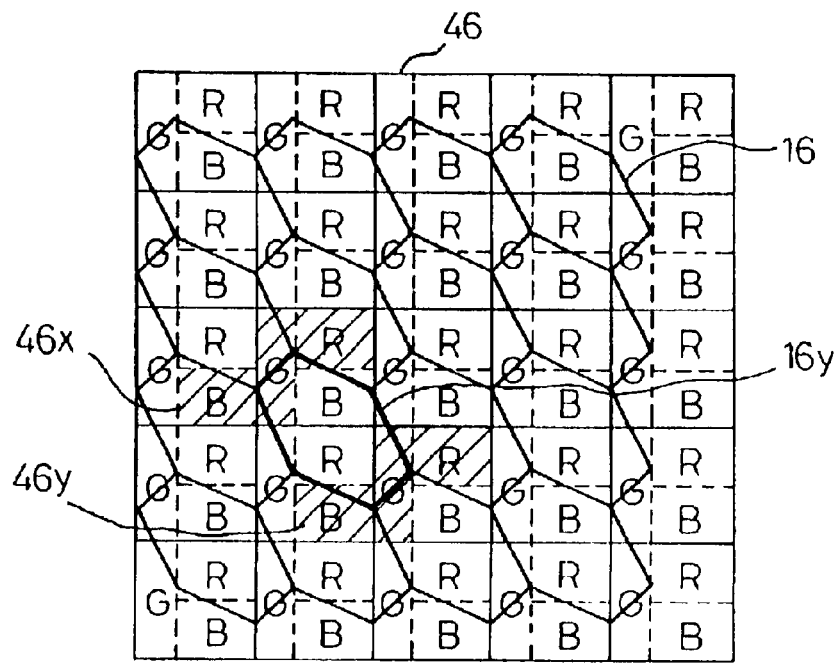
FIG. 103 is a view of another example of the pixel arrangement and that of condenser elements used in the device shown in FIG. 78.

FIGS. 102 and 103 are embodiments wherein the condenser elements 16 are of a hexagonal shape wherein all interior angles are obtuse and the opposed ones are equal to each other. In FIG. 102, the longer axis direction of the hexagonal shape coincides with the orientation of R, G and B. In FIG. 103, the shorter axis direction of the hexagonal shape coincides with the orientation of R, G, B.

While the condenser element 16y outputs the first and second polarized rays $L_1$ and $L_2$ to pixels 46x and 46y, respectively, in FIGS. 99 to 103, the pixels 46x and 46y corresponding to one condenser element 17y are arranged with one group (oblique row) of pixels being interposed therebetween. A center of the condenser element 17y is located between these two groups of pixels 46x, 46y at a position equally distant from the centers of pixels. Since two light beams are combined to each other, each of the RGB pixels becomes brighter.

In FIGS. 99 to 103, rays from the light source is obliquely incident in an upper righthand direction (due to R, B), wherein two rays are incident upon the diffraction grating at angles of ±θ/2 relative to the axis thereof, for the same reason as described with reference to the embodiments shown in FIGS. 83 and 84.

An angle θ between two rays is represented by the following equation if a distance between centers of the pixels 46x and 46y is "d" as previously described with reference to the embodiments shown in FIGS. 83 and 84:

$$\sin(\theta/2) = \sqrt{(n^2 d^{2/(4t^2+d^2)}}$$ (4)

Figure 104:
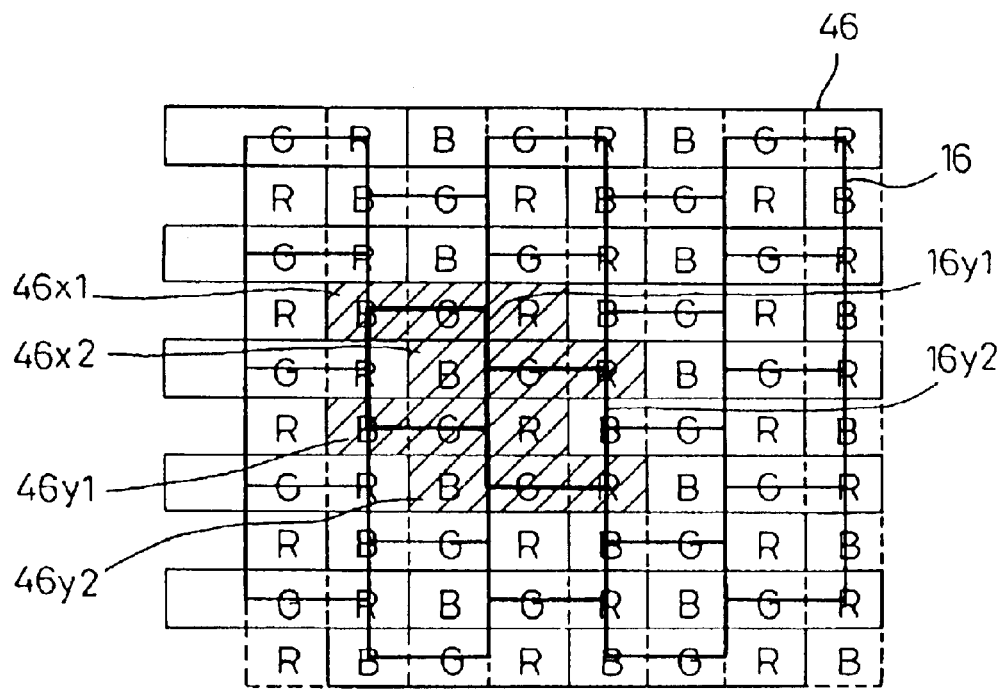
FIG. 104 is a view of a further example of the pixel arrangement and that of condenser elements used in the device shown in FIG. 78.
Figure 105:
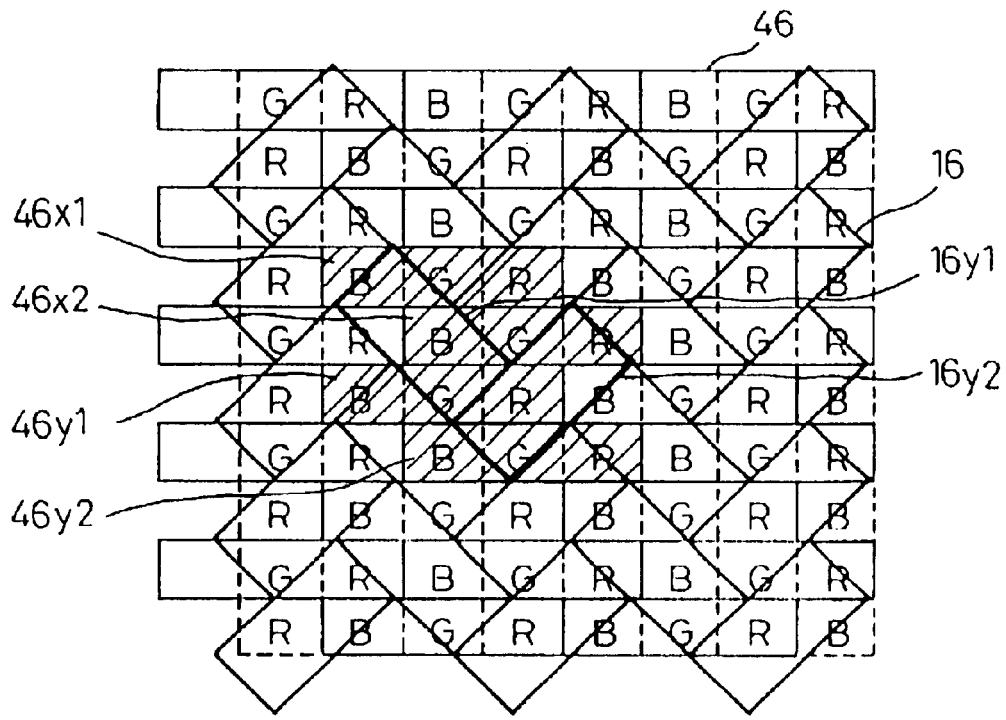
FIG. 105 is a view of a further more example of the pixel arrangement and that of condenser elements used in the device shown in FIG. 78.
Figure 106:
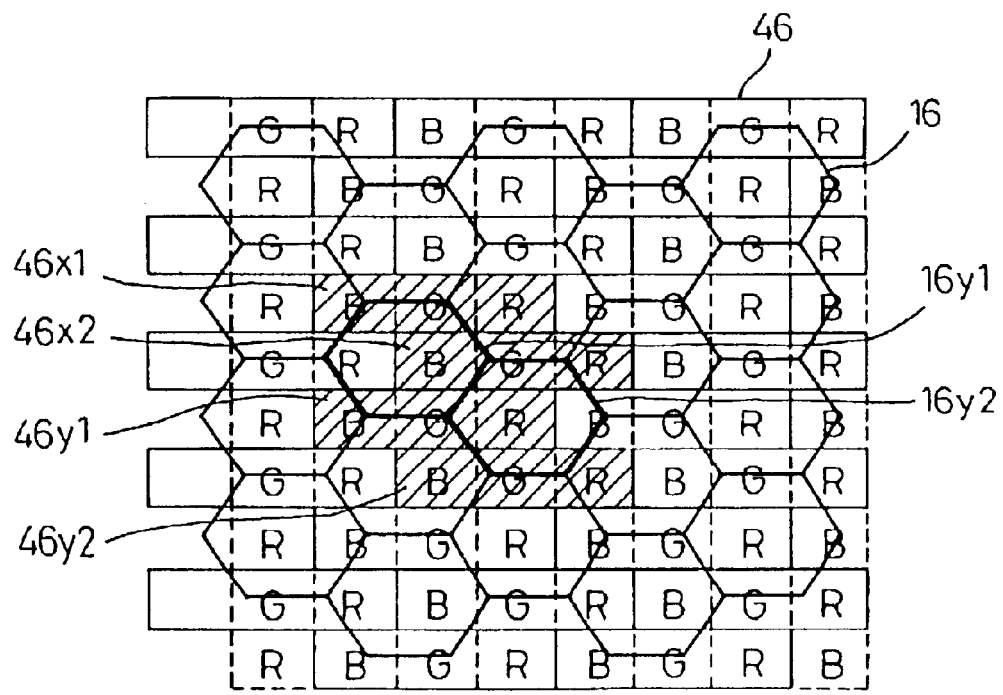
FIG. 106 is a view of a still further example of the pixel arrangement and that of condenser elements used in the device shown in FIG. 78.

FIGS. 104, 105 and 106 show pixels in the mosaic arrangement in the liquid crystal panel, wherein an m-th row and an (m+1)-th row are shifted by one dot (monochrome pixel) to each other. FIG. 104 is an embodiment wherein the condenser elements 16 are of a tetragonal shape (square in the drawing) having parallel sides extending in the horizontal and vertical directions. FIG. 105 is an embodiments wherein the condenser elements 16 are of a tetragonal shape (rectangle in the drawing) having parallel sides extending in directions different from the horizontal and vertical directions. FIG. 106 shows an embodiment wherein the condenser elements 16 are of a hexagonal shape wherein all interior angles are obtuse and the opposed ones are equal to each other.

Figure 107:
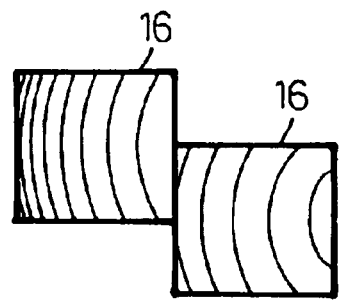
FIG. 107 is a view of a feature of the condenser element used in FIG. 104.

In FIG. 104, the condenser element 16y1 outputs the first and second polarized rays $L_1$ and $L_2$ to pixels 46x1 and 46y1, while the condenser element 16y2 outputs the first and second polarized rays $L_1$ and $L_2$ to pixels 46x2 and 46y2. Although the relative positions of the condenser elements 16y1 and 16y2 are different from those of the pixels, the same display as in the preceding embodiments is obtainable by using two kinds of condenser elements 16 as shown in FIG. 107.

Figure 108:
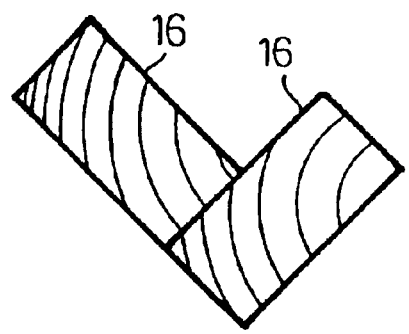
FIG. 108 is a view of a feature of the condenser element used in FIG. 104.
Figure 109:
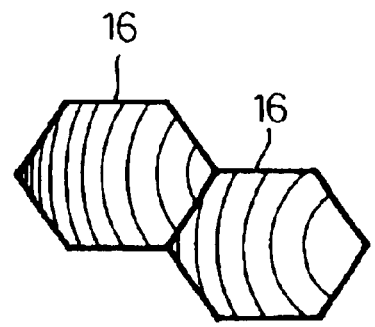
FIG. 109 is a view of a feature of the condenser element used in FIG. 104.

In FIGS. 105 and 106, it is possible to obtain the relative arrangement of pixels by using two kinds of condenser elements as shown in FIGS. 108 and 109.

The condenser elements 16 shown in FIGS. 104 to 106 are arranged so that one kind of condenser element is arranged in every column and another kind in alternate columns. The pixels 46x and 46y corresponding to the condenser elements 16y1 and 16y2 are arranged via a group (series) of pixels. A center of the condenser elements is located at a position between two groups of pixels equally distant from centers of the pixels. Since two light beams are combined to each other, each of the pixels becomes brighter.

The angle θ in this case is represented by the following equations:

$$\sin(\theta/2) = n \times \sin(\theta'/2) \quad (1)$$

$$\tan(\theta'/2) = d/2/t \quad (2)$$

$$d = 2h \quad (8)$$

If θ' is deleted from these equations, θ satisfies the following relationship.

$$\sin(\theta/2) = \sqrt{(n^2 d^{2/(4t^2+d^2)}} \quad (4)$$

or, $$\sin(\theta/2) = \sqrt{(n^2 h^{2/(4t^2+9h^2)}} \quad (5)$$

For example, assuming that the pixel pitch is 50 μm, the distance between panels is 1.1 mm and the refractive index of the medium is 1.5, θ becomes 7.8°.

Figure 110:
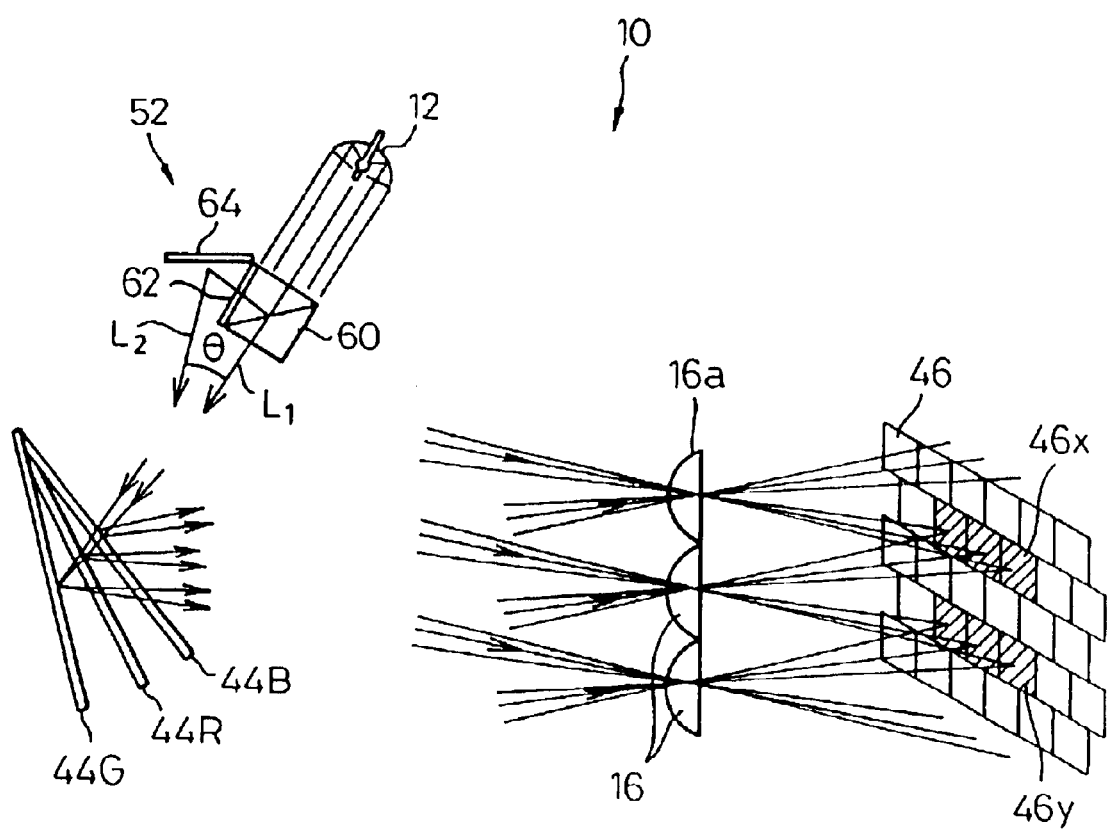
FIG. 110 is a view of a modification of the display device shown in FIG. 78.

FIG. 110 shows an embodiment wherein the condenser elements 16 are formed by a micro lens array 16a. The color separation mechanism is the same as in the embodiment shown in FIG. 6 using the dichroic mirrors. Features shown in FIGS. 79 to 109 are also applicable to the optical device 10 in FIG. 110.

Wavelength Cut Filter

Figure 111:
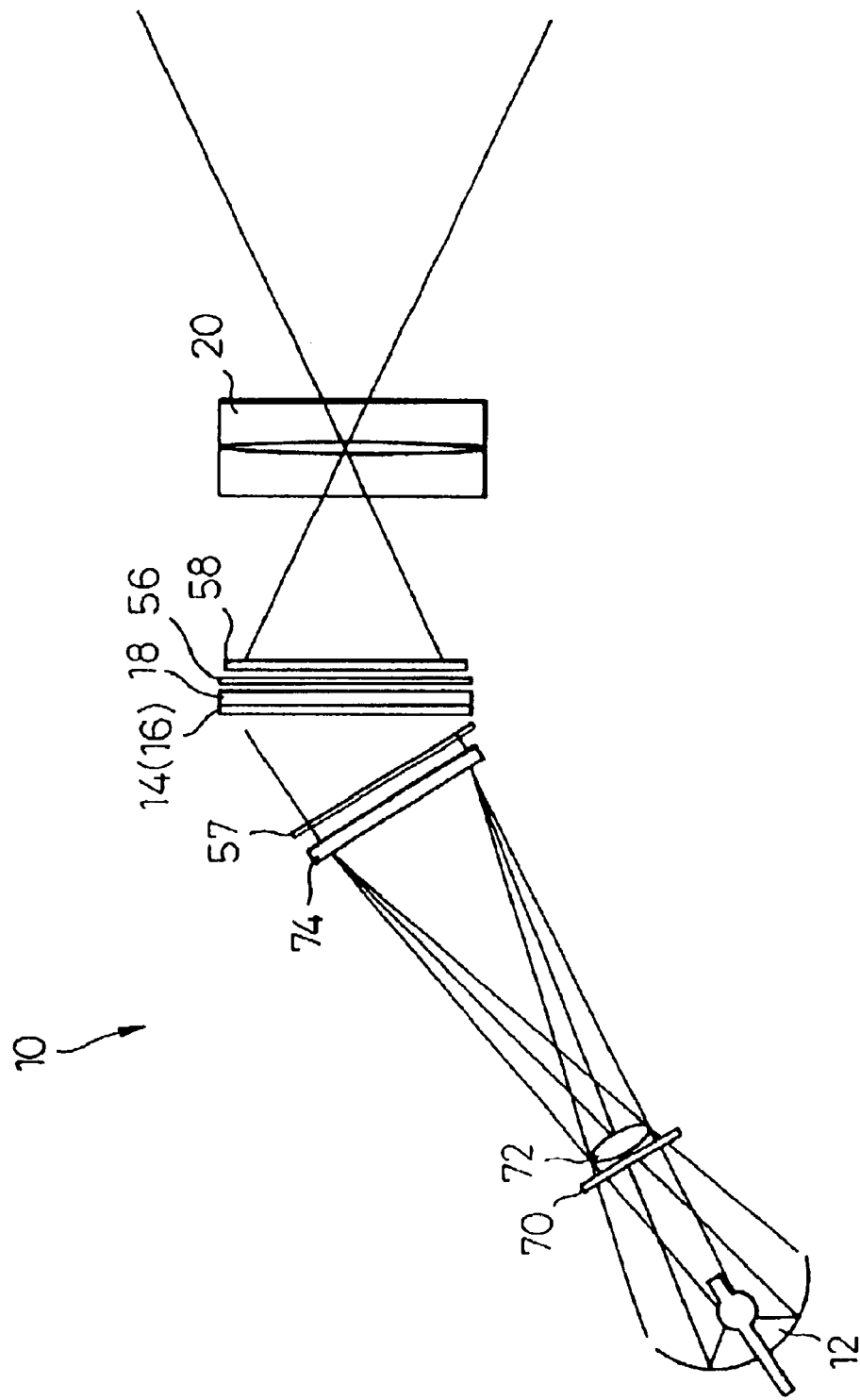
FIG. 111 is a view of a display device according to a fourth embodiment of the present invention.

Another embodiment of the present invention will be described with reference to FIG. 111. The display device 10 shown in FIG. 111 comprises a light source 12, a wavelength cut filter 70, a light source image canceller 72, a collimator lens 74, a polarizer 57, a diffraction grating 14 including condenser elements 16, a liquid crystal panel 18, an analyzer 56, a field lens 58 and a projection lens 20. The polarizer 57 corresponds to the polarizer 38 shown in FIG. 3.

The wavelength cut filter 70 has a red cut function adapted for a spectrum band on the longer wavelength side of a red spectrum band and a blue cut function adapted for a on the spectrum band on the shorter wavelength side of a blue spectrum band. That is, it is constructed as a UV-IR cut filter. The wavelength cut filter 70 is disposed between the light source 12 and the light source image canceller 72. The light source image canceller 72 causes rays coming from the light source 12 to be converted to one point from which divergent rays are irradiated. The light source image canceller 72 is disposed at a focal point of the collimater lens 74 which converts the divergent rays from the light source image canceller 72 into parallel rays and outputs to the diffraction grating 14.

Figure 112:
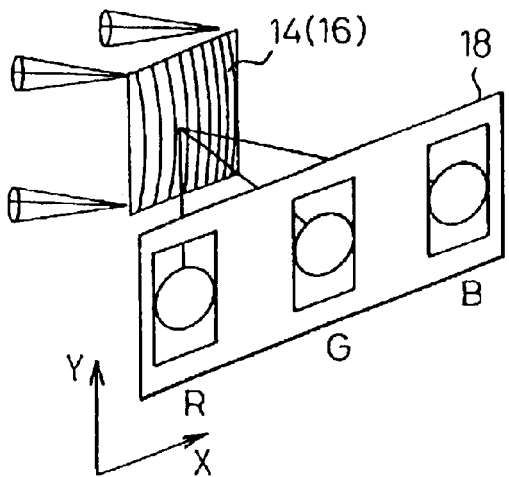
FIG. 112 is a view of condenser elements in a diffraction grating and pixels.

FIG. 112 illustrates a color separation using the diffraction grating 14. The diffraction grating 14 separates a white light into red, green and blue rays. In practice, however, a beam having a continuous wavelength is output from the diffraction grating 14 and red, green, blue and other color rays are made incident to the liquid crystal panel 18. Color dots R, G and B (32R, 32G, 32B) of a pixel in the liquid crystal panel 18 are formed as openings in a black matrix at positions at which separated red, green and blue rays arrive, respectively. Therefore, color rays other than red, green and blue rays are shaded by the black matrix.

Figure 113:
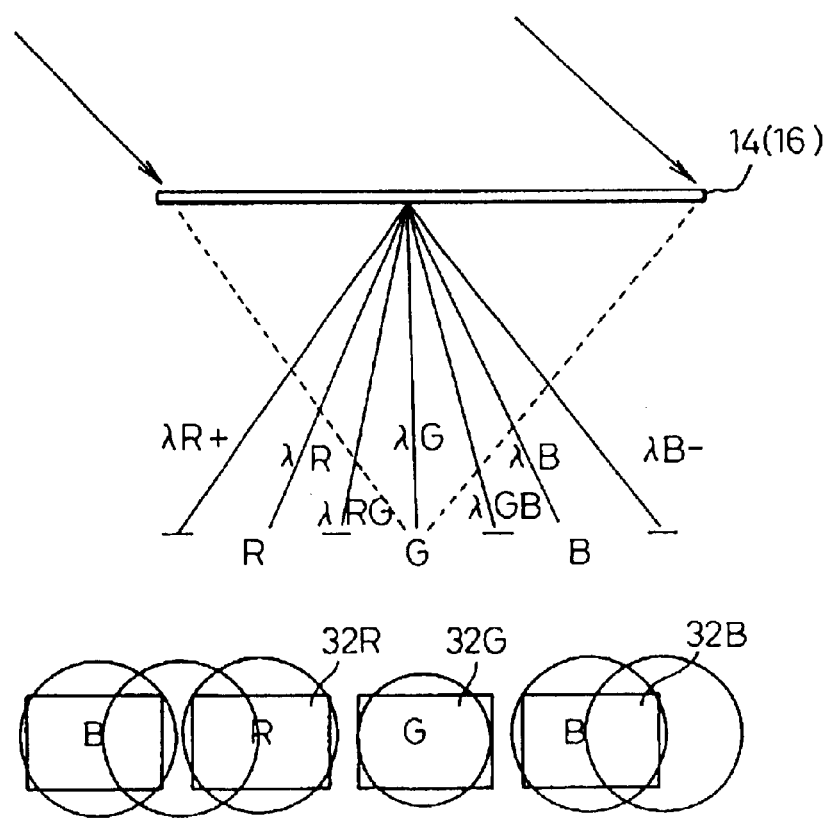
FIG. 113 is a view illustrating the relationship between the condenser element in the diffraction grating and the pixels, wherein beam spots incident upon color dots are shown.

FIG. 113 shows the diffraction grating 14 (condenser elements 16) and openings (R, G and B) on the black matrix. Beam spots made incident to the openings (R, G and B) are indicated by circles in FIG. 113. Wavelengths of rays passing through centers of the respective color dots are λR, λG and λB. A wavelength on the longer wavelength side of the red spectrum band is indicated by λR+ and a wavelength on the longer wavelength side of the blue spectrum band is indicated by λB−. Also, a wavelength between red and green is indicated by λRG, and a wavelength between green and blue is indicated by λGB. When the degree of parallelism in the illumination system is low or a color dot pitch of the pixel is small, a beam diameter becomes larger than the opening to output rays having undesirable an wavelength to be shaded.

Figure 114A:
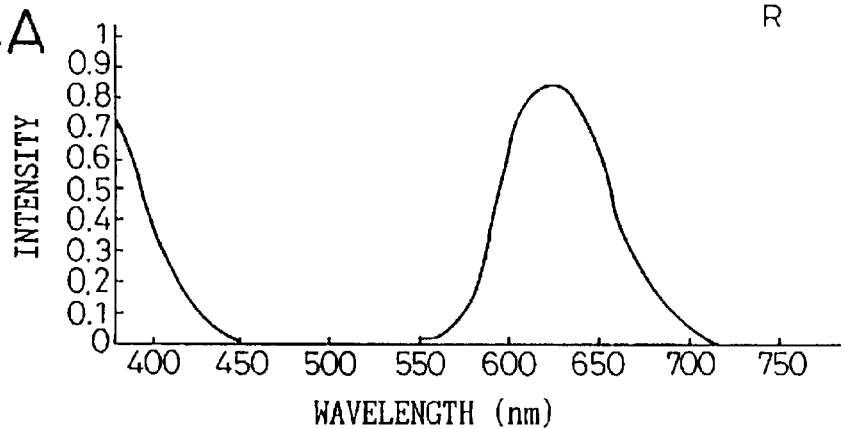
FIGS. 114A to 114C are views illustrating rays incident to the pixel under the influence of the adjacent condenser elements.
Figure 114B:
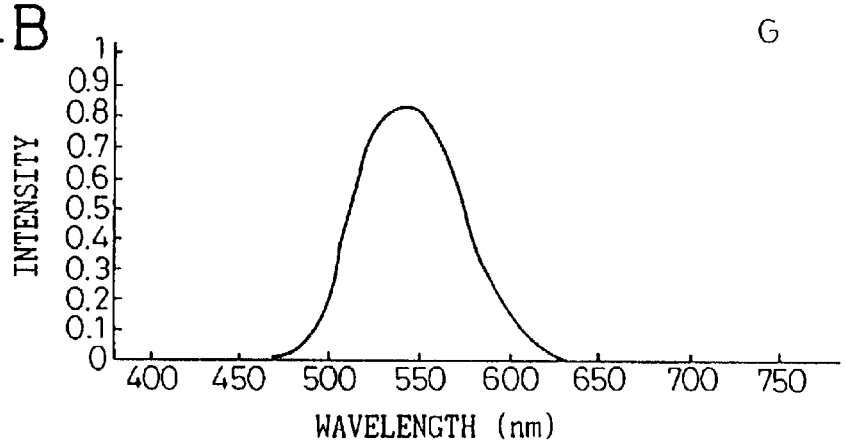
Figure 114C:
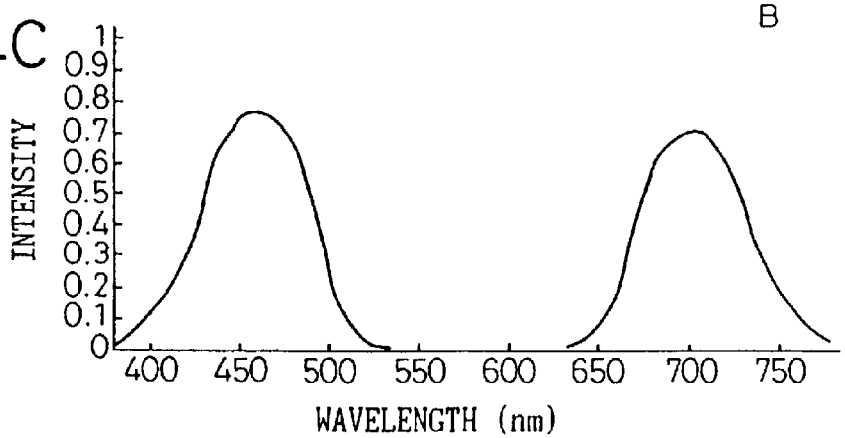

FIGS. 114A to 114C show spectrum characteristics of rays passing through the respective color dots of red, green and blue. Since the condenser elements 16 of the diffraction grating 14 and color dots R, G and B of pixels in the liquid crystal panel 18 are arranged with a periodicity, unnecessary rays other than those to be made incident from a certain condenser element 16 are made incident to a certain pixel from adjacent condenser elements 16. That is, regarding red and blue, two peaks exist as shown in FIG. 114; one being a necessary peak (λR, λB) having a red or blue spectrum band, but another being an unnecessary ray (λR+, λB-) degrading the color purity.

Figure 115:
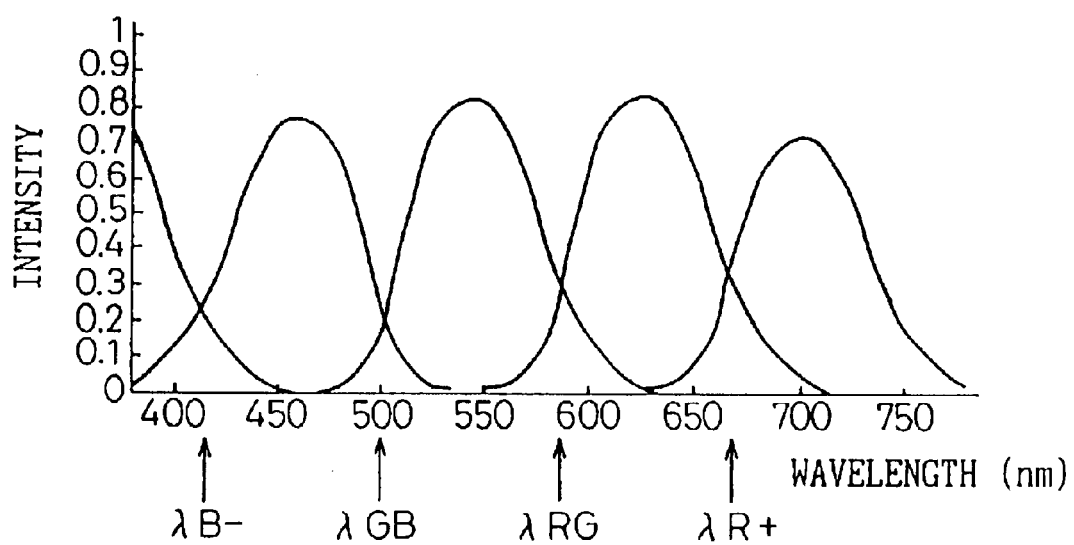
FIG. 115 is a view combining the features of FIGS. 114A to 114C together.

Spectrums passing through the color dots of red, green and blue are shown together in FIG. 115. There are not only necessary spectrum bands of red, green and blue, but also unnecessary spectrum bands of red, green and blue which are overlapped with each other to degrade the respectively color purity.

Figure 116:
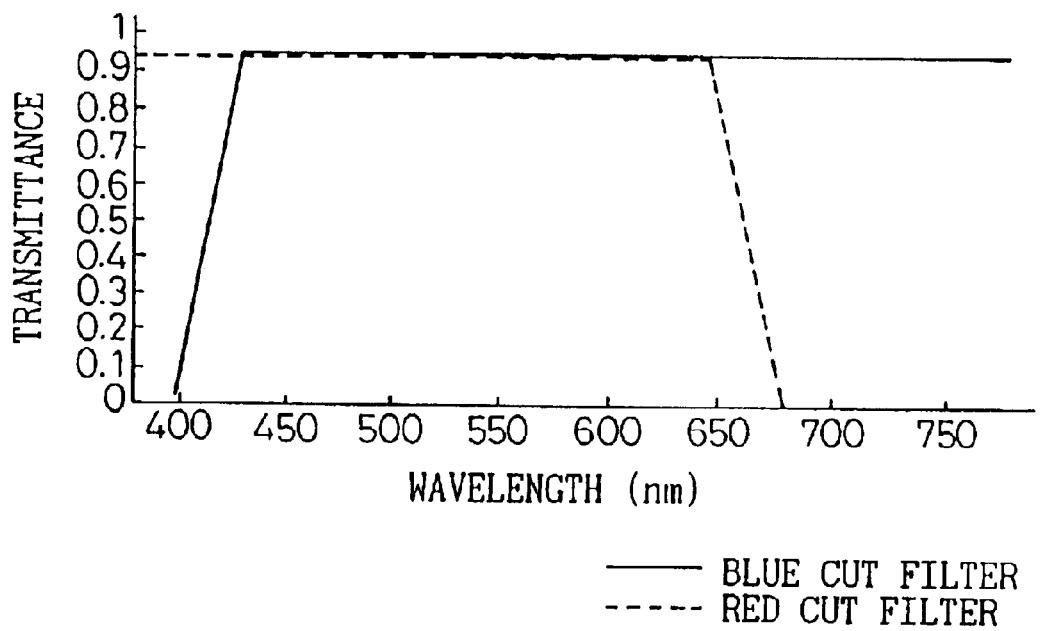
FIG. 116 is a view illustrating characteristics of red and blue cut filters.

FIG. 116 shows a wavelength cut characteristic of the wavelength cut filter 70, wherein a solid line indicates a characteristic of a red cut filter and a dotted line indicates that of a blue cut filter. A cut wavelength of the blue cut filter is approximately a medium wavelength (390 to 450 nm) between a shorter wavelength side peak appearing by a ray passing through the red color dot and a longer wavelength side peak appearing by a ray passing through the blue color dot. A cut wavelength of the red cut filter is approximately a medium wavelength (620 to 680 nm) between a longer wavelength side peak produced by a ray passing through the blue color dot and a longer wavelength side peak produced by a ray passing through the red color dot.

Figure 117:
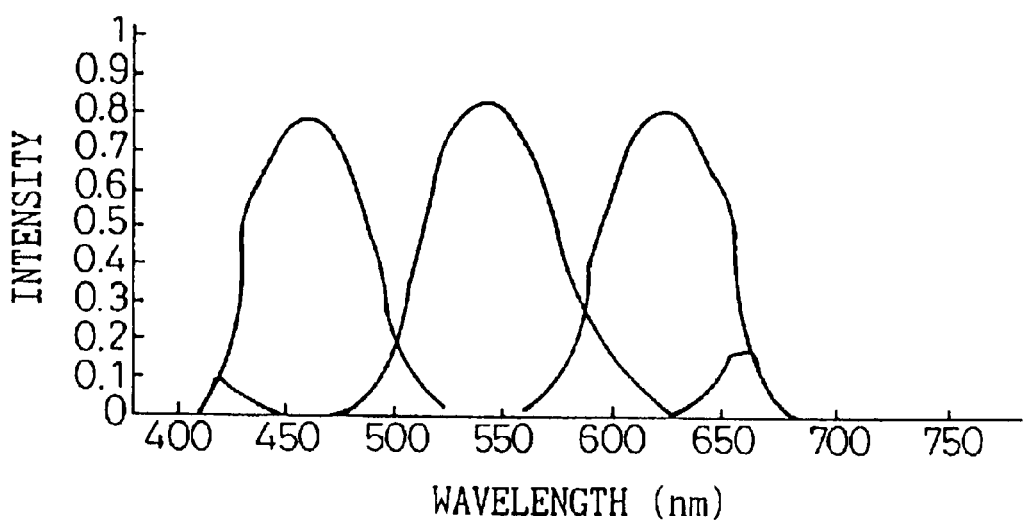
FIG. 117 is a view of spectrum of ray cut by the filter characteristic shown in FIG. 116.
Figure 118:
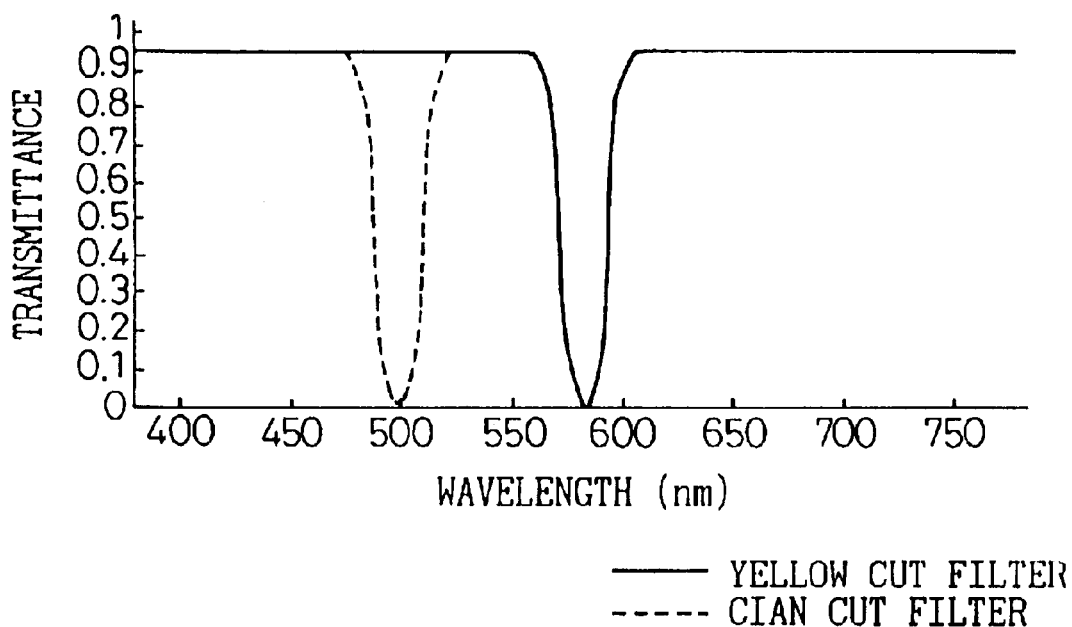
FIG. 118 is a view illustrating characteristics of yellow and cyan cut fillers.

FIG. 118 shows a spectrum after the rays having a spectrum shown in FIG. 115 are wavelength-cut by the wavelength cutting characteristic of FIG. 117. Thereby, it is possible to remove the unnecessary wavelength components of λR+ and λB- in the higher and lower wavelength zones of the red, green and blue spectrum bands.

Figure 119:
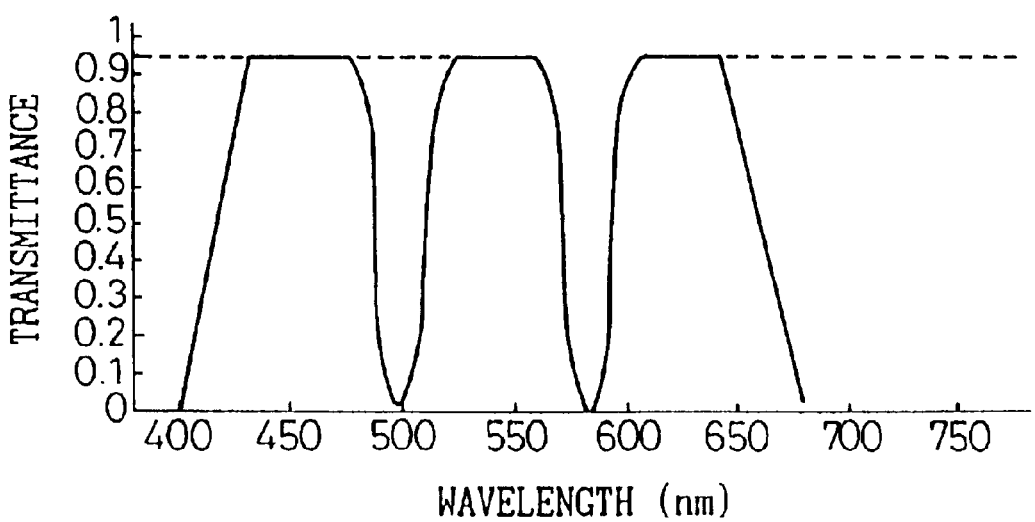

Also it is possible to improve the overlapping of the respective bands of RGB by inserting a narrow band cut filter (FIG. 118) having a center at λRG and λGB. Thereby, it is possible to realize a bright display having a proper color purity. Accordingly, preferably a filter having a wavelength cut characteristic shown in FIG. 119 is used, which is a combination of a cut characteristic shown in FIG. 116 and that shown in FIG. 118.

Figure 120:
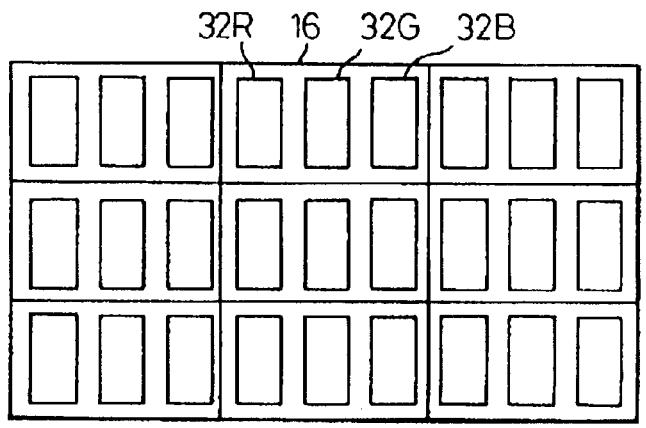
Figure 121:
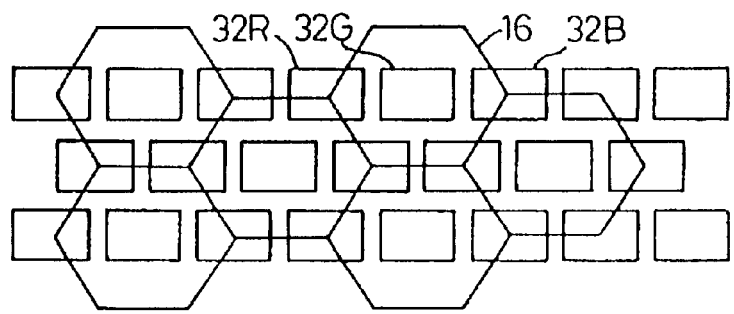
Figure 122:
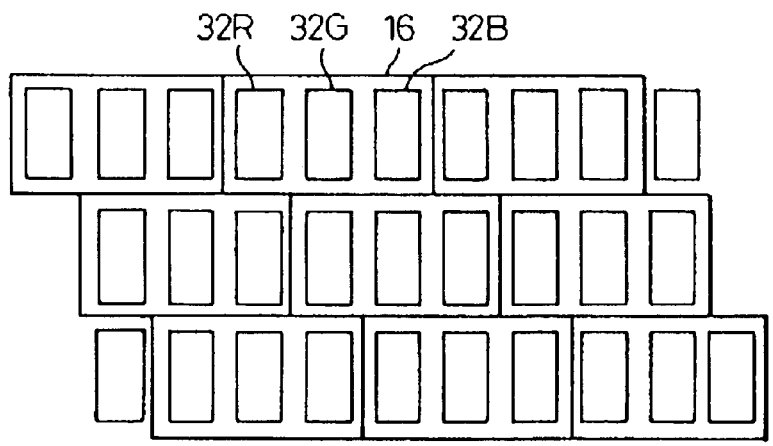

FIGS. 120 to 122 are embodiments of the arrangement of the condenser elements 16 of the diffraction grating 14 and the arrangement of the pixels. In FIG. 120, both the arrangements are the square arrangements. In FIG. 121, both the arrangements are the delta arrangements. In FIG. 122, both the arrangements are the mosaic arrangements. In these embodiments, a center of the condenser element is located on a green dot G in the respective pixel. One condenser element 16 is disposed in correspondence with three color dots arranged in the horizontal direction. The condenser element 16 corresponds to the green color dot directly beneath the same and the righthand/lefthand red and blue color dots forming one unit.

Figure 123:
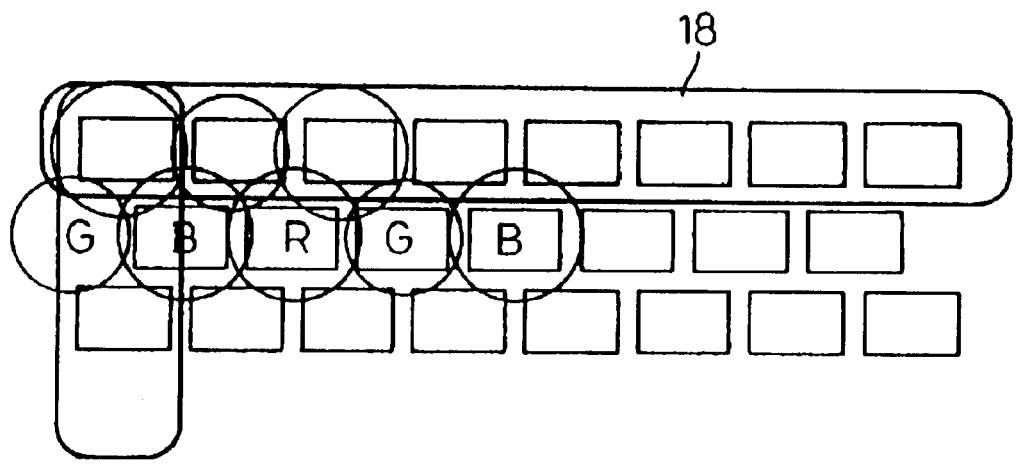
Figure 124:
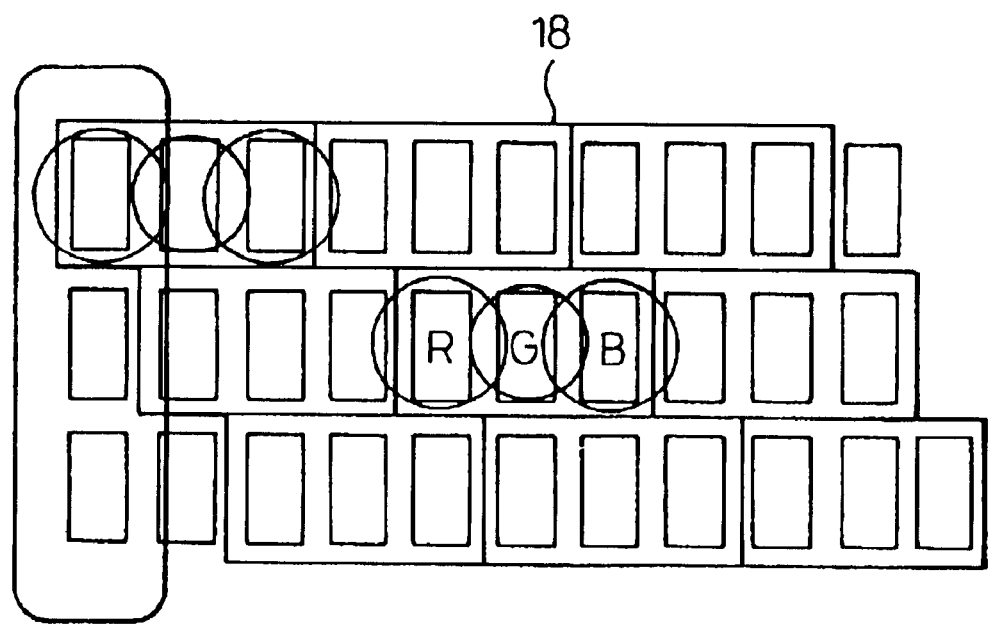

In FIG. 123, the color dot is formed as a horizontally elongate opening, while in FIG. 124, the color dot is formed as a vertically elongate opening.

Figure 125:
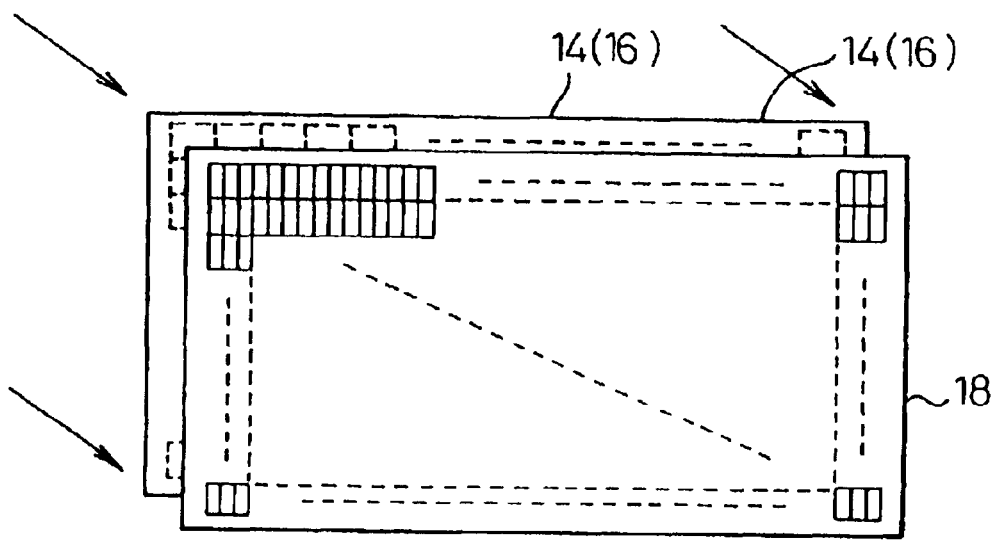
Figure 126:
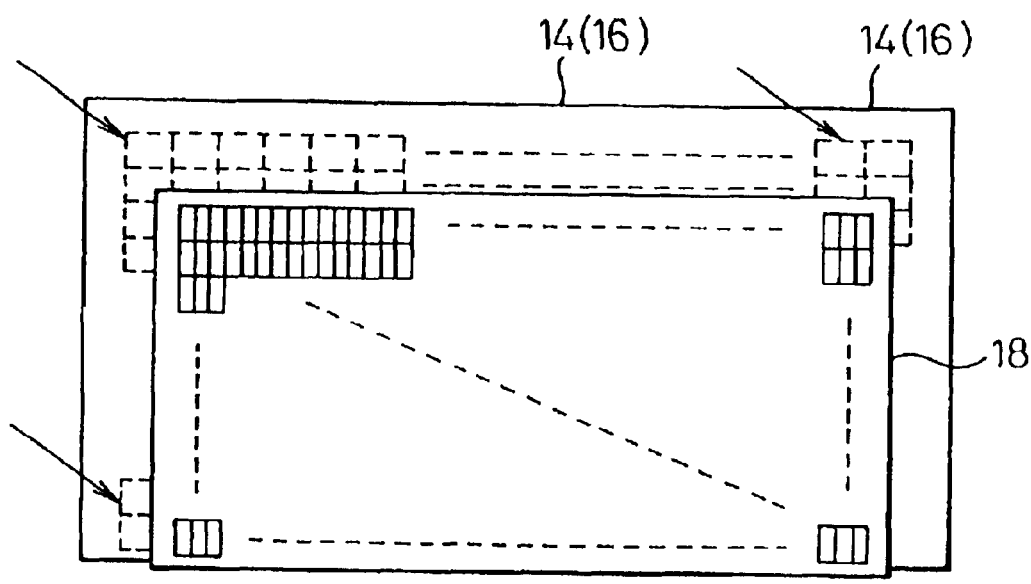

FIG. 125 shows a conventional case wherein the number of the condenser elements 16 in the diffraction grating 14 is the same as that of the pixels. FIG. 126 shows an embodiment of the present invention wherein one more condenser element is added to upper, lower, righthand and lefthand sides, respectively, of the pixels.

When the number of the condenser elements 16 in the diffraction grating 14 is the same as that of the pixels, and the parallelism of rays made incident to the diffraction grating is low, transmitting spectrums are different between a central region which is liable to be influenced by a periodical structure and a peripheral region which is not influenced by a periodical structure. That is, the rays are made incident from the respective condenser element 16 to the corresponding pixels and also to the adjacent pixels to give an influence thereto. In the central region, where the pixel is equally influenced by the adjacent pixels, there is no risk of generating the color irregularity. Contrarily, in the peripheral region, the pixel positioned at an end is influenced solely by the condenser elements located inside; i.e., there is no influence from the condenser elements located outside (in other words, there are no condenser elements). Accordingly, the influence on the end pixel is different from that on the inner side pixel to cause the color irregularity.

If the number of the condenser elements 16 is more than that of the pixels, it is possible to arrange the condenser elements 16 in one-to-one correspondence to the pixels as well as to dispose additional condenser elements outside the end pixel. According to this arrangement, in the peripheral region, the end pixel is influenced by both of the inside and outside pixels 16, which is the same as in the central pixels, whereby a cause of color irregularity is eliminated. As shown in FIG. 126, by adding one more condenser element 16 in the diffraction grating 14 to upper, lower, righthand and lefthand sides, respectively, of the pixels, it is possible to equalize the influence of the condenser elements 16 in the central and peripheral regions and to prevent the color irregularity from being generated.

The additional condenser elements 16 in the diffraction grating are not necessarily provided over all the periphery of the liquid crystal panel 18 but may be disposed solely on an incident side of the diffraction grating 14. As shown in FIG. 127, a plurality of rows of condenser elements 16 may be added to the peripheral region of the liquid crystal panel 18. Preferably, the number of the condenser elements 16 (NX, NY) are selected to satisfy the equation NX×NY=(MX+2)×(MY+2) wherein MX and MY are the number of pixels formed by a group of color dots.

As described above, according to the present invention, it is possible to improve the light-utilization efficiency as a display device. Also, it is possible to realize desirable display manners by proper combinations of the arrangement of pixels and the arrangement of condenser elements. The display has less moire, and is free from the adverse influence by unnecessary rays having shorter and longer wavelength to enhance the color purity. By using a polarizing device capable of separating/mixing polarized rays, it is possible to obtain a display device free from energy loss, excellent in color purity and having no color irregularity.

What is claimed is:

1. A display device comprising:
   a polarizing device for separating a light from a light-source into first and second polarized rays having mutually perpendicular oscillating planes and emerging the light so that the oscillating plane of one of the first and second polarized ray becomes at the same as that of the other and the first and second polarized rays emerge at an angle between them;
   a spatial modulator having a plurality of pixels;
   a periodical structural body having condenser elements corresponding to the pixels of the spatial modulator; and
   wherein regarding the first and second polarized rays emerging from the polarizing device and passing through a first condenser element, the first polarized ray is made incident to a first pixel and the second polarized ray is made incident to a second pixel; and regarding the first and second polarized rays emerging from the polarizing device and passing through a second condenser element, the first polarized ray is made incident to the second pixel and the second polarized ray is made incident to a third pixel.

2. A display device as defined by claim 1, wherein a distance between the first condenser element and the first pixel is equal to a distance between the first condenser element and the second pixel.

3. A display device as defined by claim 1, wherein an incident angle of the second polarized ray from the first condenser element to the second pixel is equal to an incident angle of the first polarized ray from the second condenser element to the second pixel.

* * * * *

UNITED STATES PATENT AND TRADEMARK OFFICE
CERTIFICATE OF CORRECTION

| | | |
|---|---|---|
| PATENT NO. | : 6,819,366 B2 | Page 1 of 1 |
| APPLICATION NO. | : 10/342036 | |
| DATED | : November 16, 2004 | |
| INVENTOR(S) | : Suzuki et al. | |

It is certified that error appears in the above-identified patent and that said Letters Patent is hereby corrected as shown below:

In the Claims:

Col. 30, line 58, delete "ray becomes at" and insert --ray becomes--.

Add claims 48-50:

Col. 34 lines 1-5 should read

48. A display device as defined by claim 40, wherein each of the pixels of the spatial modulator includes a plurality of color dots arranged in a first direction, and a length of a pixel area including a peripheral region encircling the color dots, measured in the first direction, is longer than a length of the condenser element of the periodical structural body, in the first direction.

Col. 34 lines 6-8 should read

49. A display device as defined by claim 40, wherein two condenser elements of the periodical structural body arranged side by side in the first direction constitute a group with two pixels arranged side by side in the direction perpendicular to the first direction.

Col. 34 lines 9-11 should read

50. A display device as defined by claim 49, wherein two condenser elements of the periodical structural body arranged side by side in the first direction constitute a group with two pixels arranged side by side in the direction perpendicular to the first direction.

Signed and Sealed this

Twenty-sixth Day of August, 2008

JON W. DUDAS
*Director of the United States Patent and Trademark Office*